United States Patent [19]

Uchiyama

[11] Patent Number: 5,539,494
[45] Date of Patent: Jul. 23, 1996

[54] FOCUS CONDITION DETECTING DEVICE

[75] Inventor: Shigeyuki Uchiyama, Tokyo, Japan

[73] Assignee: Nikon Corporation, Tokyo, Japan

[21] Appl. No.: 232,399

[22] Filed: Apr. 25, 1994

Related U.S. Application Data

[63] Continuation of Ser. No. 113,324, Aug. 30, 1993, abandoned.

[30] Foreign Application Priority Data

Sep. 3, 1992 [JP] Japan .................................. 4-235962
Dec. 8, 1992 [JP] Japan .................................. 4-327942

[51] Int. Cl.⁶ ...................................................... G03B 13/36
[52] U.S. Cl. ............................................................. 354/402
[58] Field of Search ..................................... 354/402, 406, 354/407, 408; 250/201.2, 201.7, 201.8

[56] References Cited

U.S. PATENT DOCUMENTS

| | | | |
|---|---|---|---|
| 4,561,749 | 12/1985 | Utagawa | 354/406 |
| 4,748,321 | 5/1988 | Ishida et al. | 354/406 X |
| 4,768,052 | 8/1988 | Hamada et al. | 354/402 |
| 4,922,279 | 5/1990 | Hamada et al. | 354/400 |
| 4,974,007 | 11/1990 | Yoshida | 354/402 |
| 4,977,311 | 12/1990 | Kusaka et al. | 354/402 X |
| 5,068,682 | 11/1991 | Utagawa | 354/402 |
| 5,138,357 | 8/1992 | Utagawa | 354/402 |
| 5,138,360 | 8/1992 | Yamasaki | 354/407 |
| 5,410,383 | 4/1995 | Kusaka et al. | 354/402 |

FOREIGN PATENT DOCUMENTS 63-163418  7/1988  Japan .
4-235512  8/1992  Japan .

Primary Examiner—W. B. Perkey
Attorney, Agent, or Firm—Oliff & Berridge

[57] ABSTRACT

An image sensor having a plurality of photoelectric devices output signal trains representing an incoming image of an object. A microprocessor divides each of the output signal trains of the image sensor into a plurality of ranges. A plurality of assembly errors corresponding respectively to the plurality of ranges are pre-stored in a memory. The microprocessor calculates the gravity center position of the contrast of the object image for each of the plurality of ranges on the basis of the output signal trains, so that the compensation amount corresponding respectively to each range is calculated. Therefore the microprocessor determines a defocus amount of the photographing lens in each of the plurality of ranges on the basis of the output signal trains and the corresponding compensation amount.

9 Claims, 30 Drawing Sheets

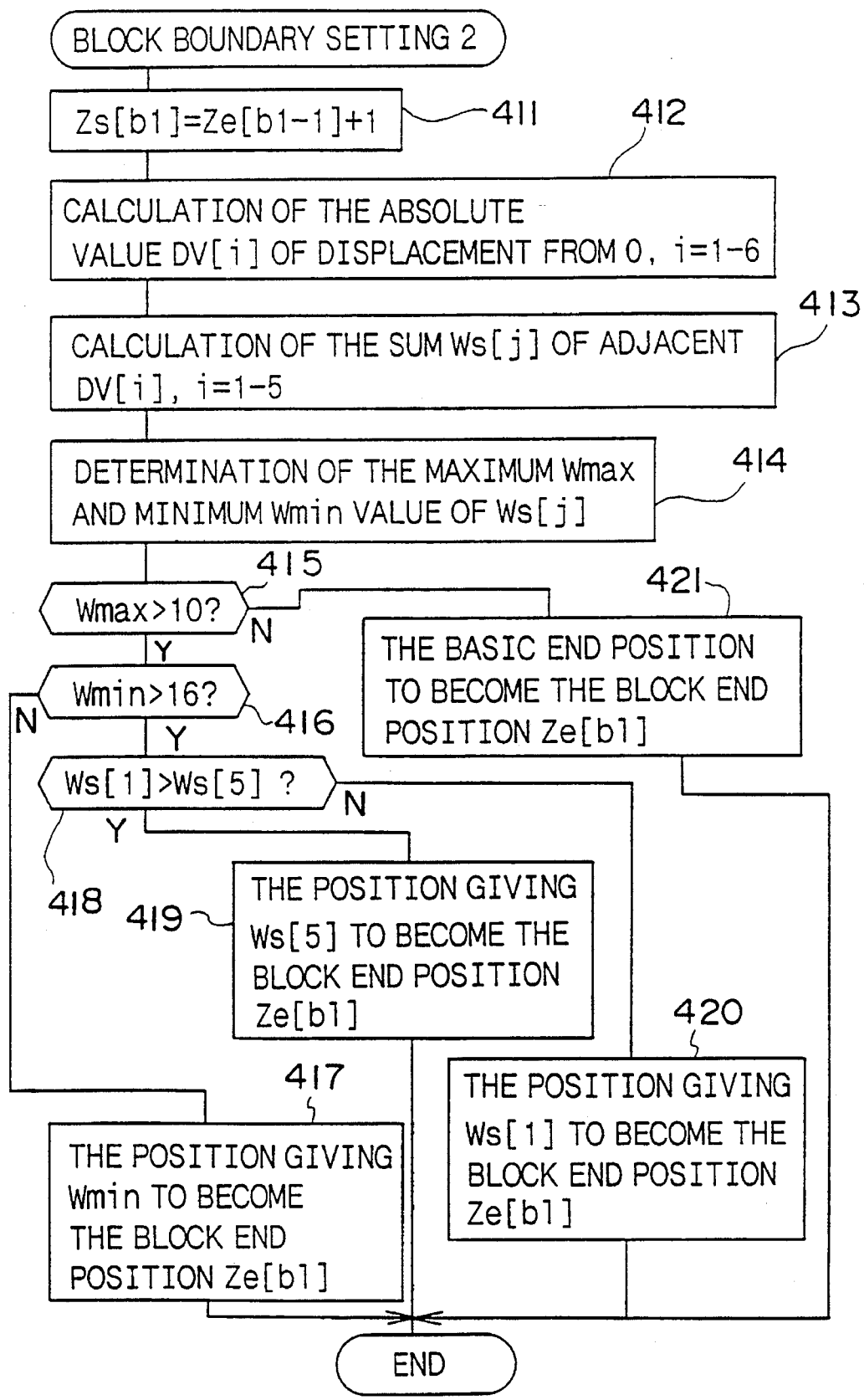

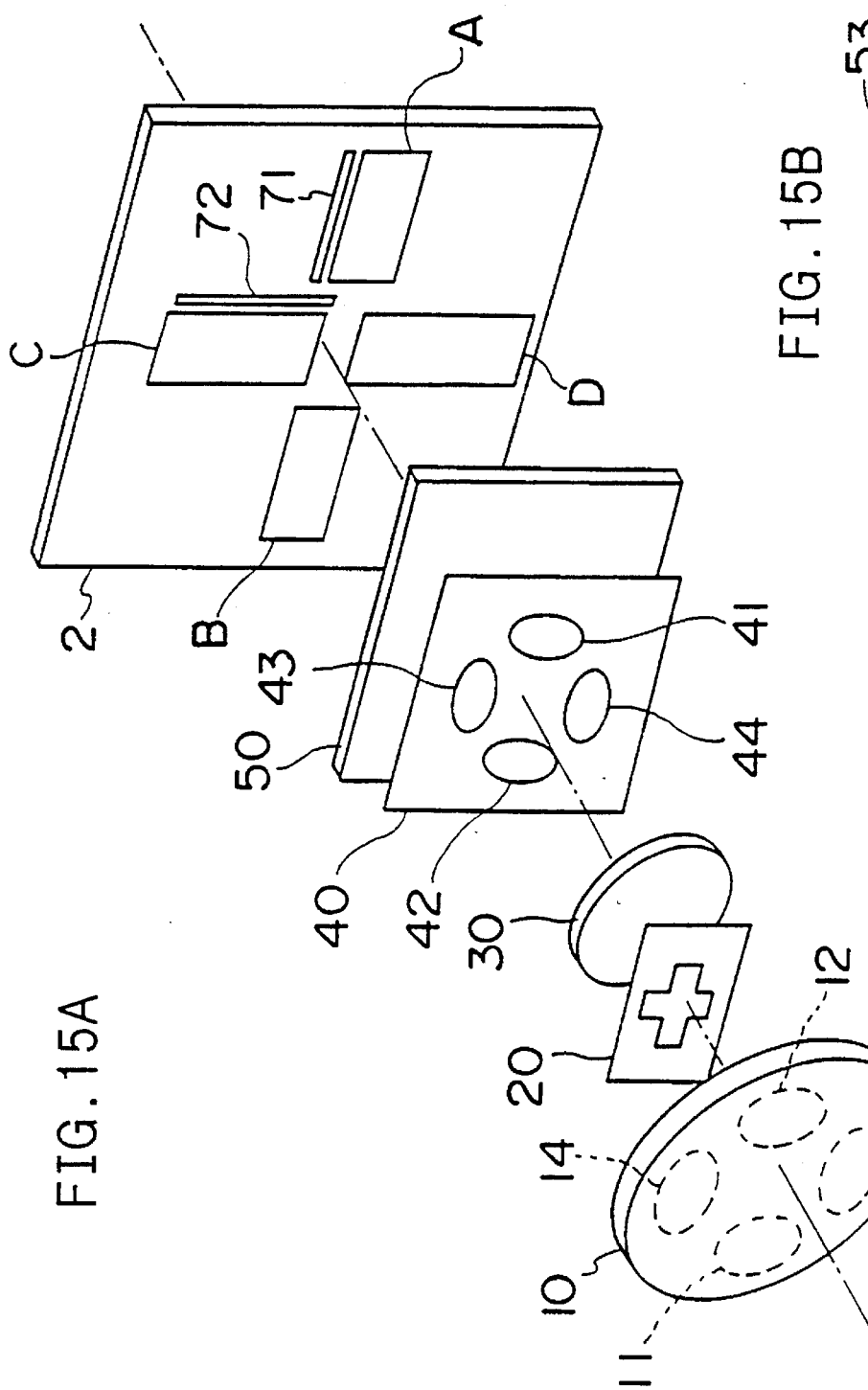

FIG. 17A  *PRIOR ART*
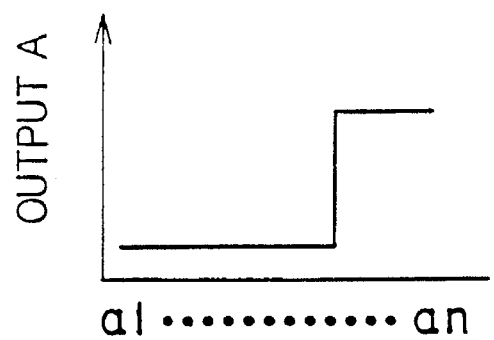
FIG. 17B  *PRIOR ART*
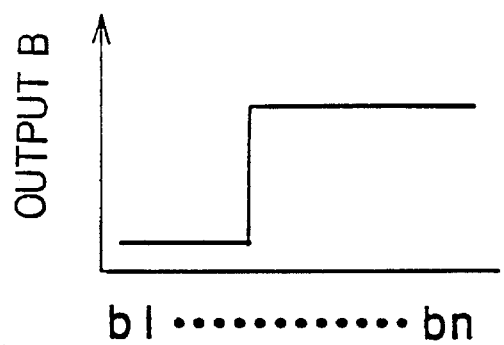
FIG. 17C  *PRIOR ART*
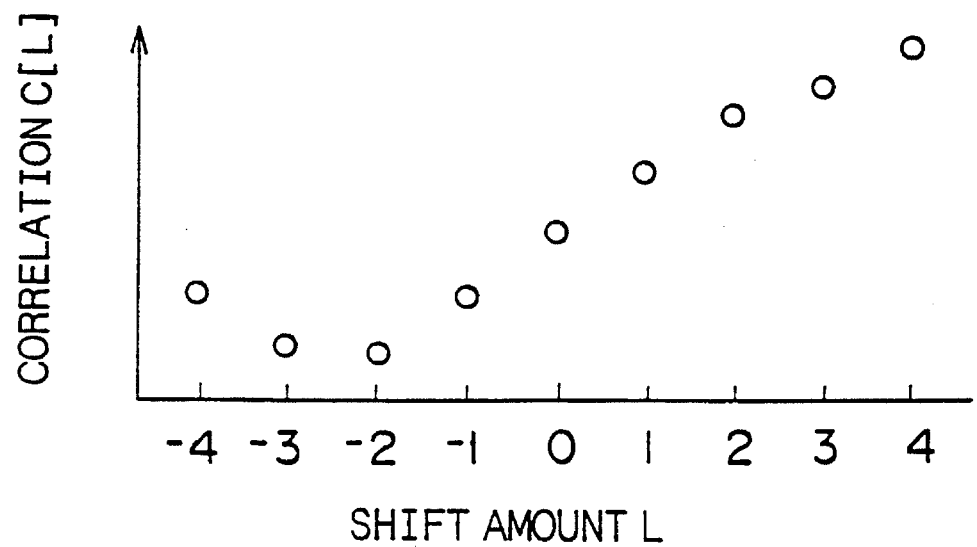

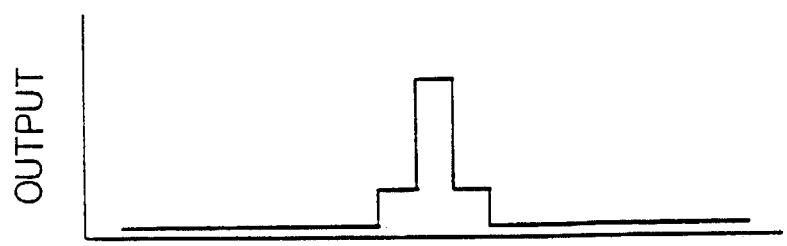
FIG. 20A  *PRIOR ART*
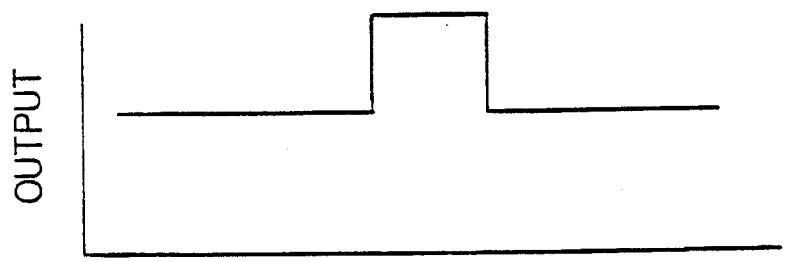
FIG. 20B  *PRIOR ART*
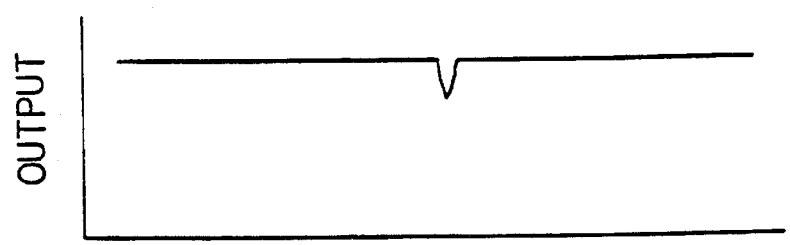
FIG. 20C  *PRIOR ART*
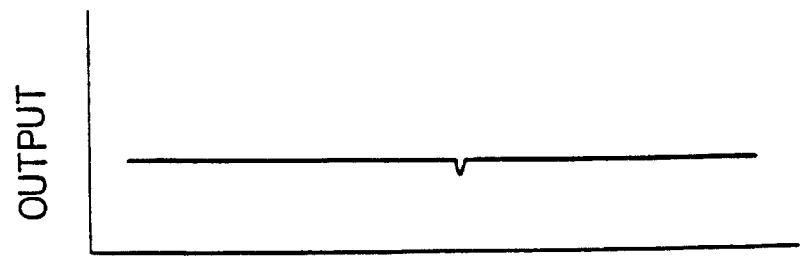
FIG. 20D  *PRIOR ART*

POSITION IN FOCUS CONDITION DETECTION REGION

FOCUS CONDITION DETECTING DEVICE

This is a Continuation of application Ser. No. 08/113,324 filed Aug. 30, 1993, now abandoned.

BACKGROUND OF THE INVENTION

1. Field of the Invention

The present invention relates to a focus condition detecting device to be used in cameras, video cameras, etc.

2. Related Background Art

The conventional focus condition detecting device for single lens reflex cameras includes a relative displacement detection system, which is described below with reference to FIG. 25. The light rays incoming through a region 101 of a photographing lens 100 pass through a field mask 200, a field lens 300, an aperture 401, and a refocusing lens 501, to form an image on an image sensor array A wherein a number of photoelectric elements generate output in proportion to the incoming light intensity and are arrayed linearly.

Similarly, the light rays incoming through a region 102 of the photographing lens 100 pass through the field mask 200, a field lens 300, an aperture 402, and a refocusing lens 502 to form an image on an image sensor array B. A pair of images of an object to be photographed, which have been formed in this manner on these image sensor arrays A and B, are spaced away from each other when the photographing lens 100 forms a sharp object image in front of a predetermined focal plane, that is, in the front-focus state. Contrarily, these images are neared to each other when a sharp object image is formed behind the predetermined focal plane, that is, in the rear-focus state. When a sharp image of the object is formed on a predetermined focal plane, that is, in the in-focus state, the images on both image sensor arrays A and B coincide with each other.

Accordingly, the electric signal obtained through photoelectric conversion of the pair of object images by the image sensor arrays A and B is processed to determine the relative position of the images, thereby enabling understanding of the focus condition, particularly the defocus amount and direction thereof (hereinafter which are totally referred to as the defocus amount), of the photographing lens 100. A focus condition detection area is where the images on image sensor arrays A and B projected by the refocusing lenses 501 and 502 overlap in the vicinity of the predetermined focal plane.

An operation method to determine the defocus amount is described below.

The image sensor arrays A and B comprise of a number of photoelectric elements and output respectively a number of photoelectric conversion output signal trains a1 ... an and b1 ... bn (FIGS. 17A and 17B). A correlation operation is performed by shifting data trains relatively by a predetermined number of data L. When the maximum number of shifts is assumed to be Lrng, the L range is from –Lrng to Lrng. Specifically, the correlation C[L] is calculated by the equation (1):

$$C[L] = \sum_{i=k}^{r} |ai - bi + L| \quad (1)$$

$$L = -lrng, \ldots, -2, -1, 0, 1, 2, \ldots, lrng$$

In equation (1), L is an integer corresponding to the shift amount of the data trains as described above. The initial term k and final term r may be varied depending on the shift amount L.

The defocus amount is determined when the shift amount giving the minimum of the correlations C [L] is multiplied by the constant determined from the pitch width of photoelectric elements of the image sensor arrays and the optical system shown in FIG. 25. However, the correlation C[L] is a discrete value as shown in FIG. 17C and the minimum unit of the detectable defocus amount is restricted by the pitch width of photoelectric elements of both sensor arrays A and B. The minimum value Cex is therefore newly calculated from the discrete correlation C[L] through interpolating operation.

In this operation method, used are the minimum correlation amount C0 and the correlations C1 and C-1 calculated on both sides of the shift amount at which the minimum correlation C0 is calculated as shown in FIG. 18. The displacement amount Ls to give the minimum value Cex is calculated by equations (2) and (3):

$$Ls = L + DL/E \quad (2)$$

$$DL = (C-1 - C1)/2$$

$$E = Max\{C1 - C0, C-1 - C0\}$$

$$Cex = C0 - |DL| \quad (3)$$

In equation (3), Max {Ca, Cb} means selection of Ca or Cb, whichever is larger. This interpolating operation is referred to as the three-point interpolation. The defocus amount DF is calculated by equation (4) from the displacement amount Ls which gives the minimum value.

In equation (4), Kf is a constant determined by the pitch width of photoelectric elements of the image sensor arrays and optical system shown in FIG. 25.

$$DF = Kf \times Ls \quad (4)$$

The defocus amount thus obtained needs to be checked to determine if it is the true defocus amount or if it is due to fluctuations in the correlation caused by noise. The defocus amount is judged to be reliable when it satisfies the conditions expressed by equation (5).

$$E > E1 \text{ and } Cex/E < G1 \quad (5)$$

E1 and G1 in equation (5) are certain given values. E (hereinafter referred to as the slope value) is a value dependent on the object contrast, and the contrast becomes higher, with enhanced reliability, when the slope value is larger. On the other hand, Cex/E indicates the degree of coincidence of a pair of data of the image sensor arrays A and B and a Cex/E value nearer to zero indicates higher reliability of the defocus amount. Once judged reliable, the defocus amount DF is used to drive the photographing lens 100. Correlation, interpolation, and judgment on the conditions described above are generally termed as the focus condition detecting operation.

In U.S. Pat. No. 4,561,749, the correlation C[L] is not necessarily calculated for the entire shift range (–Lrng to +Lrng). Instead, the correlation C[L] is calculated by sequentially changing the shift numbers L like 0, 1, –1, 2, –2, ..., Lrng, –Lrng and the operation is terminated at the time point when the defocus amount that satisfies equation (5) is obtained. In this manner, the calculation of only three correlation amounts of C[–1], C[0], and C[1] is enough and the operation time can be reduced when the object image is formed approximately on the image sensor arrays in the in-focus state.

Note here that an object pattern, if cyclical and iterative as shown in FIGS. 21A and 21B, will cause the iterative pattern in the correlation C [L] as shown in FIG. 21C, making determination of the defocus amount impossible. Therefore, when a plurality of reliable defocus amounts are obtained, the object is judged to have a cyclic pattern.

The image sensor arrays A and B of FIG. 25 are of an electric charge accumulation type such as CCD (Charge Coupled Device), etc. This type of array accumulates, for an appropriate accumulation period, the electric charge generated by each of the photoelectric elements and converts the accumulated electric charge into the voltage to output the data. These arrays can offer adequate data even under bright outdoor conditions or in a dark room by extending the accumulation period when the object is dark and by reducing the period when the object is bright.

In other words, an improperly set accumulation period results in a failure to obtain adequate data, making calculation of the defocus amount impossible. For example, assuming that the image contrast is such that the slope value E can barely satisfy equation (5) for the output higher as a whole as shown in FIG. 20C when the object is a fine one, such as a single black thin line on a white background, then the accumulation period is set shorter. If the output is lower as a whole as shown in FIG. 20D, the contrast becomes lower and the slope value E cannot satisfy equation (5) any more. The result is a complete failure of focus detection.

On the other hand, if the accumulation time is so long that the generated electric charge exceeds the accumulation limit or the operable range, the focus condition detecting operation cannot be made correctly. It is therefore necessary to control the accumulation period if adequate data are to be obtained.

This control of the accumulation period is abbreviated hereinafter as AGC (Auto Gain Control). The AGC methods are roughly classified into two types. The first one consists of determining the accumulation period on the basis of data obtained from the previous accumulation of the electric charge. For example, the accumulation period is set so that the maximum value in the data, which is obtained though the accumulation taken place for the accumulation period, corresponds to the given value. Since the accumulation period is determined by means of the processing operation, this method is referred to as a software-based AGC.

Another method is to set the accumulation period on the basis of the output from a monitor sensor installed in the neighborhood of the image sensor arrays. Since the accumulation period is determined by the hardware, this method is referred to as a hardware-based AGC. Though allowing fine setting of the accumulation period, the software-based AGC requires prior accumulation and is inferior in terms of real-time monitoring. The hardware-based AGC, on the other hand, can perform real-time monitoring of the object luminance, but its monitoring is limited to the average luminance of the image sensor arrays, making fine setting impossible.

The operation described above uses the photoelectric conversion outputs themselves from the arrays for the focus condition detecting operation. To eliminate the harmful component above the Nyquist frequency and the adverse effect of the DC components, namely imbalance in the output between a pair of image sensor arrays, the output from these arrays is filtered to produce a new data, which are then used for the focus condition detecting operation instead of the original data.

For example, when the output signal train of the image sensor is assumed to be D[i], a filtering operation is first made to eliminate the high frequency components to create the following data train H[i].

$$H[i]=D[i]+2D[i+1]+D[i+2]+tm \qquad (6)$$

In equation (6), the right side may be divided by 4. For this data train H[i], a differential filtering operation expressed by equation (7) is made to remove the DC component, thereby creating the following data train F[i].

$$F[i]=-H[i]+2H[i+N]-H[i+2N] \qquad (7)$$

In equation (7), a predetermined value may be added to the right side to prevent the F[i] value from becoming a negative value. N is a natural number of around 1 to 10 and the frequency component extracted from such an N value becomes variable. As the N value becomes larger, the lower frequency component is extracted. Therefore, two kinds of N value, such as 3 and 6, may be set up for selection of the appropriate N value according to the object to be photographed. Otherwise, the data train F[i] may be created initially by setting N=3 to be used for correlation of equation (1) and interpolation of equations (2) and (3). If the setting with N=3 proves unsatisfactory for equation (5), then the N value may be reset to N=6 to create the data train F[i] for renewed operation. If the data from which the DC component has been removed to extract the specific frequency components through a filtering operation are used, the focus detection capacity can be improved so as to enable detection of even the finest object such as a single black thin line on a white background.

This type of focus condition detecting device has often suffered troubles including erroneous determination of the in-focus state in which an image of an object between closer and more distant objects is sharply formed on the image sensor or complete failure of focus detection when a plurality of objects differing in distance form an image on the image sensor arrays. To overcome such problems, a pair of image sensor arrays are respectively divided into a plurality of blocks, thereby dividing the focus condition detecting range into smaller areas, and the focus condition detecting operation is made for each block. Then the displacement amount Ls[i] and defocus amount D[i], which give the minimum value for each block, are determined. Among a plurality of blocks, the block whose defocus amount indicates the nearest point or the one whose contrast is highest is selected and the photographing lens is driven on the basis of the defocus amount of the selected block corresponding to the focus condition of the photographing lens.

Division of the block is made in such a manner that, for example, a plurality of groups of the initial term k and final term r at the shift amount L=0 are formed for correlation of equation (1). For example, to divide each light receiving region of a pair of image sensor arrays, each comprising 40 photoelectric elements, i.e. each outputting 40 data, into six blocks, each comprising 6 photoelectric elements, i.e. each outputting 6 data, as shown in FIG. 19A, k=3 and r=8 are set at the shift amount L=0 for block 1 and the correlation C[L] is calculated by equation (1). Then the shift amount Ls giving the minimum value is calculated on the basis of the calculated amount of correlation by equations (2) and (3), from which the defocus amount DF is calculated by equation (4). Similarly, the focus condition detecting operation is made for blocks 2, 3, 4, 5, and 6 respectively by setting k=9 and r=14, k=15 and r=20, k=21 and r=26, k=27 and r=32, and k=33 and r=38 for the shift amount L=0.

As shown in FIG. 19B, a pair of image sensor arrays can be divided into three blocks, each comprising 12 photoelectric elements, i.e. each outputting 12 data, by setting k=3 and r=14 for block 1, k=15 and r=26 for block 2, and k=27 and r=38 for block 3. The blocks thus formed are wider than those shown in FIG. 19A.

The data newly created through the filtering operation as described above can also be divided into a plurality of blocks.

Also available are filtering operations for the extraction of the higher frequency components to form a large number of narrow blocks by decreasing a number of the photoelectric elements consisting of each block and for extraction of lower frequency components to form a small number of wide blocks by increasing a number of the photoelectric elements consisting of each block. Another method available comprises variable block width, wherein the focus condition detecting operation is made initially for the narrow block and, if focus detection is impossible for all blocks, this operation is renewed by widening the blocks.

As there are cases when focus detection becomes impossible if the contrast of the object is located in the boundary of blocks, U.S. Pat. No. 5,068,682 and U.S. Pat. No. 5,138,357 disclose a method, comprising calculation of the absolute value of the difference between adjacent data for the area in the vicinity of the block boundary and shifting of the boundary position so that the block boundary becomes an area where the absolute difference value becomes minimal.

As explained in the above description concerning the focus condition detecting operation, the object images on the image sensor arrays A and B coincide with each other in the in-focus state, that is, when the sharp image of the object is formed on a predetermined focal plane. In practice, however, the images do not coincide with each other completely in the in-focus state and errors occur because the relative position of the image sensor arrays A and B to the predetermined focal plane, is displaced when the optical system (excluding the photographing lens 100) shown in FIG. 25 is assembled into a camera. This error amount is referred to as hereinafter the assembly error.

Accordingly, the assembly error must be stored in the memory to be compensated for after completion of the operation of equation (2). For example, compensation is made as shown by equation (8) when Z expressed in data pitch is used as a compensation value for the assembly error:

$$Ls = Ls - Z \quad (8)$$

The compensation value Z differs individually for each camera main body and must therefore be measured for each camera main body to be stored, for example, in EEPROM of the body. Ideally, the assembly error should be uniform within the focus condition detecting range. However, because of aberrations in the focus condition detecting optical system and relative inclination of refocusing lenses 501 and 502 and image sensor arrays A and B during assembly of the optical system shown in FIG. 25, the assembly error does not become uniform and varies depending on the position within the focus condition detecting range, as shown in. FIG. 24.

Consequently, the compensation value Z needs to be set for each block when the focus condition detecting range is to be divided into a plurality of blocks.

The compensation value $Z[i]$ must therefore be measured for each block and a plurality of measured compensation values $Z[i]$ are stored in EEPROM. Then, the compensation value $Z[i]$ for each block is reflected in each individual focus condition detecting operation. This compensation calculation is disclosed in U.S. Pat. No. 4,977,311 of the same applicant. The object to be used for measurement of the compensation value $Z[i]$ is, for example, a black-and-white lattice pattern having a sufficiently small cycle for the block width. The compensation value $Z[i]$ thus measured can indicate the assembly error in the center of the block. Note that U.S. Pat. No. 4,977,311 discloses an extremely detailed method of determining the practical compensation value, which comprises storage of the compensation value Z, not in each block, but in each photoelectric element of the image sensor arrays and weighted averaging of the compensation value Z of each photoelectric element according to the contrast distribution of the object pattern.

When a reliable defocus amount can be calculated, the photographing lens 100 is moved by a distance corresponding to the defocus amount by a motor not illustrated in the figure, thereby achieving the in-focus state wherein the sharp object image is formed in the predetermined focal plane. If the defocus amount is large, however, a single lens drive is not enough to achieve the in-focus state due to operational error and the like. It is therefore a general practice to follow a sequence of lens drive, accumulation of the electric charge, and calculation of the defocus amount as shown in the timing chart of FIG. 22A. In this way the second lens drive is made after accumulation of the electric charge for the image sensor arrays and focus condition detecting operation subsequent to the first lens drive.

This sequence for focusing of the lens is referred to as an intermittent servo method. On the other hand, there is a method in which accumulation of electric charge and calculation of the defocus amount are repeated during lens drive, as shown in the timing chart of FIG. 22B, so that lens focusing is performed without stopping the lens drive by changing a target position of the focusing lens derived from the defocus amount. This so-called overlap servo method can result in a shorter period required to reach the in-focus state than the intermittent servo method.

Since the overlap servo method performs accumulation of electric charge in the image sensor arrays while the lens is driven, the object image on the image sensor arrays may be blurred when the object is dark and the accumulation period becomes long. Degradation of the calculation accuracy and unstable lens drive may occur, and this method may require a longer time for accomplishment of in-focus state than the intermittent servo method. To overcome this problem, U.S. Pat. No. 4,922,279 proposed a changeover to the overlap servo method when the object is bright and to the intermittent servo method when the object is dark.

Failure to obtain a reliable defocus amount may be due to extreme displacement of the lens from the position at which the in-focus state is obtained. In the prior art, the so-called scanning operation is employed, so that the reliable defocus amount can be obtained though repetition of accumulation of electric charge and calculation of defocus amount while driving the lens in a predetermined direction. For example, the lens is first driven in a direction toward its nearer end, on reaching the nearer end, the drive direction is changed to drive the lens toward the more-distant end. At the most distant end, the lens drive is stopped to terminate the scanning operation. Generally, this scanning operation is made only when a reliable defocus amount cannot-be obtained by the initial focus condition detecting operation.

For example, if the moving object goes out of the focus condition detecting range during panning of an object, stopping the lens drive allows a photographer to reach the in-focus state within a short time by catching the object again within the focus condition detecting range. On the other hand, scanning always involves the driving of the lens in a predetermined direction, which in turn requires a long time to reach the in-focus state again.

When the object is too dark to obtain data for adequate output even by setting the accumulation period to the longest possible, the auxiliary light with the contrast pattern as shown in FIG. 23 is irradiated, so that the focus condition detecting operation can be carried out with such a contrast pattern to obtain the adequate output for the dark object.

In the conventional focus condition detecting device with compensation of assembly error described-above, however, even the provision of the compensation value Z for each block results in incomplete compensation for the object contrast located in the neighborhood of the block boundary when the assembly error changes too much in response to a slight position change of the object contrast within the focus condition detecting range. This drawback is described below with reference to FIGS. 29A and 29B.

FIG. 29A shows the assembly error dependent on the position within the focus condition detecting range and the compensation value for each block. The broken line indicates the assembly error which is assumed to change linearly. The compensation amount $Z[i]$ for each block indicates the assembly error in the center position of the block as shown by the solid line and is assumed to be $z1$, $z2$, $z3$, $z4$ and $z5$ for each of blocks 1, 2, 3, 4 and 5.

Now the lens is assumed to be in the in-focus condition (the defocus amount=0) and the object with one half-black half-white contrast as assumed to move from the left hand end of block 1 to the right-hand end of block 5. Ideally, the defocus amount calculated is equivalent to the assembly error at the point where the contrast is located. When the contrast is located at the left end of block 1, the calculated defocus amount becomes negative because the compensation amount $z1$ is larger than the assembly error.

As the contrast point (the boundary of the white and black) approaches the central position of block 1, the defocus amount also approaches zero. When the contrast point reaches the central position of the block, the defocus amount becomes zero. When the contrast point is displaced to the right of the central position of the block, the compensation value $z1$ becomes smaller than the assembly error so the calculated defocus amount becomes positive. This defocus amount is largest when the contrast point is located at the right end of the block. But when the contrast point is displaced further to the right to the left end of the second block, the compensation value to be used is $z2$ for the second block which is larger than the assembly error, resulting in a sudden change in the defocus amount to the smallest value.

The amount of change in this case is dependent on the difference between the compensation amount $z1$ of block 1 and $z2$ of block 2. The defocus amount changes subsequently in the same manner, and in a saw tooth pattern as shown in FIG. 29B depending on the contrast position. If there is less change in the assembly error depending on the position within the focus condition detecting range, there is no problem because the difference in the compensation amount between blocks becomes less, resulting in a smaller change in the defocus amount in the boundary of the blocks.

However, if there is a significant difference in each assembly error for each block depending on the position within the focus condition detecting range, the difference in the compensation amount between blocks is also large, so that the change of the defocus amount in the boundary between blocks becomes large. As a result, even the slightest change in the contrast position of the object in the neighborhood of the block boundary, which may be caused by unintended movement of the hands during photographing, may result in a substantial change in the calculated defocus amount. And the lens is driven each time the defocus amount changes, causing discomfort and, in certain cases, giving the misleading operation result that the in-focus state has been achieved though actually the in-focus state has not been obtained because compensation has not been made correctly. There arises therefore the possibility of taking a blurred picture.

To reduce the change in the assembly error due to the position within the focus condition detecting range, use of an optical system with less aberration and careful adjustment to prevent relative inclination between the refocusing lenses A and B and the image sensor arrays A and B may be necessary. In this case, however, the former may require an increase in the number of lenses to make up an optical system or an increase in the size of lenses. The latter may require time for adjustment or the adjustment mechanism. These defects may lead inevitably to a cost increase.

To overcome the problem, the conventional practice comprises determination of the compensation amount used in practical operation by weighted averaging of the compensation amount Z of each photoelectric element, which has been stored, not by block, but in individual photoelectric elements of the image sensor array, based on the contrast distribution of the object pattern. But this method requires storage of the compensation amount Z in all of photoelectric elements of the image sensor arrays, which means that 86 compensation values must be stored if each one of a pair of image sensor arrays includes 86 elements. In other words, this method has the disadvantage in that it requires a memory medium with a large capacity.

SUMMARY OF THE INVENTION

The object of the present invention is to provide a focus condition detecting device which is capable of detecting a correct and stable focus condition without requiring large capacity memory medium or cost increase when there is a significant difference between the assembly errors for adjacent blocks within the focus condition detecting range even if the contrast of the object crosses the block boundary.

To achieve the above-mentioned objective, the focus condition detecting device according to the present invention comprises an image sensor which includes a plurality of photoelectric elements and outputs an output signal train representing the incoming object image, an optical system to direct the object image to the image sensor, a range dividing means to divide said output signal train into a plurality of ranges, an error storage means to store a plurality of errors for said plurality of divided ranges, a compensation amount setting means to calculate a gravity center position of contrast of the object image for each of a plurality of divided ranges on the basis of said output signal train and to determine a compensation amount corresponding to each range on the basis of said gravity center position and errors, and an operation means to detect the focus adjustment condition of a photographing lens for each of said plurality of divided ranges on the basis of said output signal train and said plurality of compensation amounts.

The specific practice is described below with reference to FIGS. 30A and 30B. FIG. 30A shows the assembly error depending on the position within the focus condition detecting range and the compensation value for each block, similarly to FIG. 29A, in which the broken line indicates the assembly error. The compensation values for the Nth and (N+1)th blocks are indicated respectively by $zN$ and $zN+1$. A case wherein the contrast is located at the right end of the Nth block indicated by the solid line in FIG. 30B is considered. In this case, the gravity center position of the contrast in the Nth block is the contrast position itself. The compensation amounts of two blocks on both sides of this gravity center, zN and zN+1, are connected by a straight line, and an intersection of this line with the gravity center position is represented by the compensation value zN' which is used for the focus condition detecting operation. The compensation amounts zN and zN+1 of two blocks can also be connected by a quadratic curve, etc. If the contrast is moved to the right end of the (N+1)th block indicated by the solid line, the compensation amount zN+1' can similarly be calculated for use in the focus condition detecting operation. In this manner, the correct and stable defocus amount can be obtained because of lack of sudden change in the compensation amount even when the contrast moves in the neighborhood of the block boundary.

With the focus condition detecting device according to the present invention, comprising storage of the assembly error for each block, detection of the gravity center position of the contrast within each block, and calculation of the compensation amount corresponding to said gravity center position on the basis of the assembly error of the block concerned and that of the neighboring block, correct and stable detection of the focus condition can be made even when the contrast of the object is located in the neighborhood of the block boundary in case of the large changes between the assembly errors for the adjacent blocks. Moreover, no large-capacity memory medium is necessary because the number of the errors to be stored is sufficient for the number of blocks.

BRIEF DESCRIPTION OF THE DRAWINGS

FIG. 14 is a flow chart showing a block boundary setting operation 2 of the defocus amount calculation algorithm of the embodiment of the present invention.

FIGS. 15A and 15B are perspective views showing an optical system and the image sensor of the embodiment of the present invention.

FIGS. 17A–17C are representations each showing a conventional correlation calculation.

FIGS. 20A–20D are representations each showing a case in which a hardware-based AGC fails to operate correctly.

DETAILED DESCRIPTION OF PREFERRED EMBODIMENT

Figure 1:
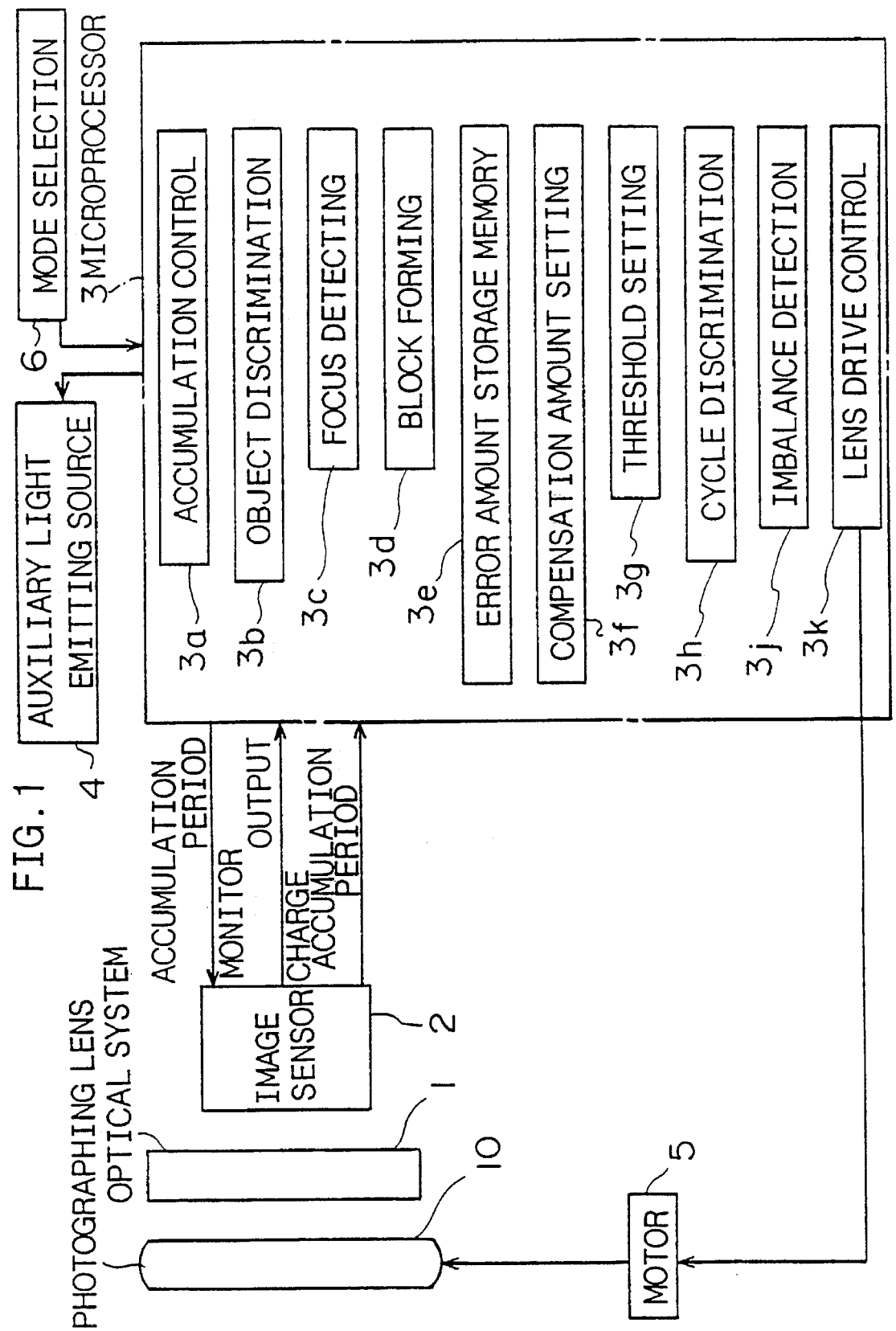
FIG. 1 is a block diagram showing the composition of an embodiment of a focus condition detecting device of the present invention.

Referring to FIG. 1, showing a focus condition detecting device of the embodiment of the present invention, 2 denotes an image sensor having at least one pair of image sensor arrays, each comprising a plurality of photoelectric elements, 1 a focus condition detecting optical system which directs the light having passed through the photographing lens 10 to the image sensor 2, 4 an auxiliary light emitting section which irradiates the auxiliary light to the object when its luminance is low, 5 a motor to drive the photographing lens 10, 6 a mode selecting section to select the width of the region for focus condition detection, and 3 a microprocessor for the focus condition detecting operation and the control of the various shown in FIG. 1.

The microprocessor 3 controls the image sensor 2 to accumulate the electric charge for the predetermined accumulation time and receives the charge accumulation signal from the image sensor 2 and the output of a monitor sensor in the neighborhood of the image sensor array. When receiving the charge accumulation signal, the microprocessor 3 turns the signal into 8-bit digital data through A/D conversion.

The microprocessor 3 includes sections to perform various operations, including 3a for an accumulation control section to control charge accumulation of the image sensor 2, 3b for an object identification section to identify the contrast state of the object on the basis of the charge accumulation signal, 3c for a focus condition detecting operation section to detect the focus condition of the photographing lens 10 on the basis of the charge accumulation signal, 3d for a block creating section to divide the focus condition detecting region of the image sensor arrays into a plurality of ranges, 3e for an error storage memory to store an assembly error arising during assembly of the focus condition detecting optical system 1, 3f for a compensation value setting section to calculate a compensation amount from the stored assembly error in the memory for use in the focus condition detecting operation section 3c, 3g for a threshold setting section to set a threshold to judge the reliability of the operation result of the focus condition detecting operation section 3c, 3h for a cycle judgment section to judge whether or not the object pattern is cyclic, 3j for an imbalance detecting section to detect any imbalanced output level from a pair of image sensor arrays, and 3k for a lens drive control section to control the motor 5 on the basis of the calculated result of the focus condition detecting operation section 3c and to drive the photographing lens 10.

As shown in FIGS. 15A and 15B, the focus condition detecting optical system 1 includes a field mask 20, a field lens 30, an aperture plate 40, a refocusing lens 50, and an image sensor 2 arranged in this order along the optical axis of the photographing lens 10. Field mask 20 has a cross aperture and is provided in the neighborhood of the predetermined focal plane of the photographing lens 10 to regulate the aerial image of an object formed by the photographing lens 10. The aperture plate 40 has four apertures 41, 42, 43, and 44 each aperture projected by the field lens 30 is formed as 11, 12, 13, and 14 on the photographing lens. As shown in FIG. 15B, the refocusing lens 50 comprises four lenses 51, 52, 53, and 54 respectively corresponding to apertures 41, 42, 43, and 44 of the aperture plate 4 and forms an image of the field mask 20 on the image sensor 2.

The light rays incoming through region 11 of the photographing lens 10 pass through field mask 20, field lens 30, the aperture 41 of the aperture plate 40, and lens 51 of the refocusing lens 50, forming an image on the image sensor array A. Similarly, the light rays incoming through regions 12, 13, and 14 of the photographing lens 10 form an image respectively on the image sensor arrays B, C, and D. The object images formed on the image sensor arrays A and B move away from each other when the photographing lens is in the front-focus state and move toward each other when the photographing lens is in the rear-focus state or are lined up at a given interval when the photographing lens is in the in-focus state.

Processing the charge accumulation signals Da[i] and Db[i] of the image sensor arrays A and B allows determination of the above-mentioned defocus amount as a horizontal focus condition of the photographing lens 10.

Similarly, the object images formed on the image sensor arrays C and D move away from each other when the photographing lens is in the front-focus state and move toward each other when the photographing lens is in the rear-focus state or are lined up in a given interval when the photographing lens is in the in-focus state. Accordingly, processing the charge accumulation signals Dc[i] and Dd[i] of the image sensor arrays C and D allows determination of the above-mentioned defocus amount as a vertical focus condition of the photographing lens 10.

Monitor sensors 71 and 82 are provided on the image sensor 2, which output the signals MH and MV corresponding to the average luminance of the light rays coming into the image sensor arrays A and C.

Figure 16A:
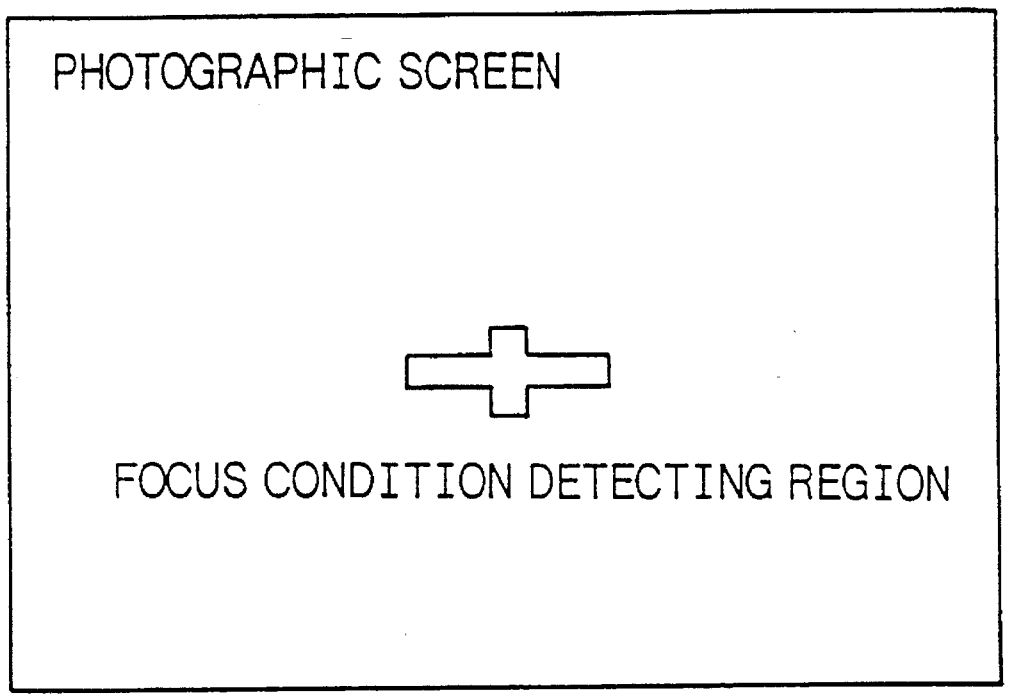
FIGS. 16A and 16B are representations each showing a focus detecting range of the embodiment of the present invention.
Figure 16B:
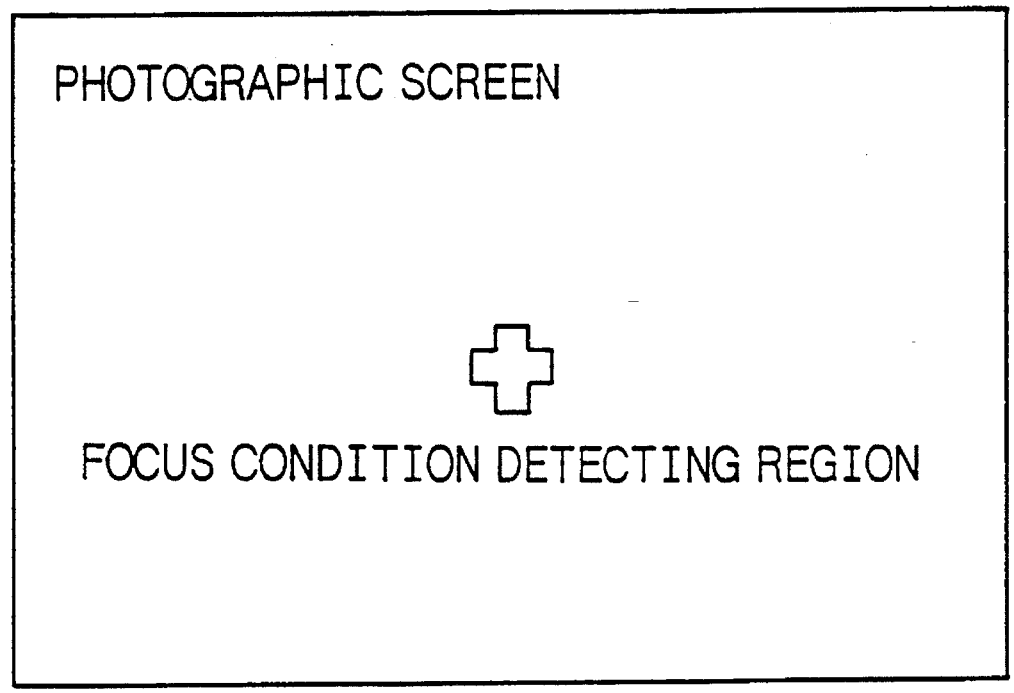
Figure 18:
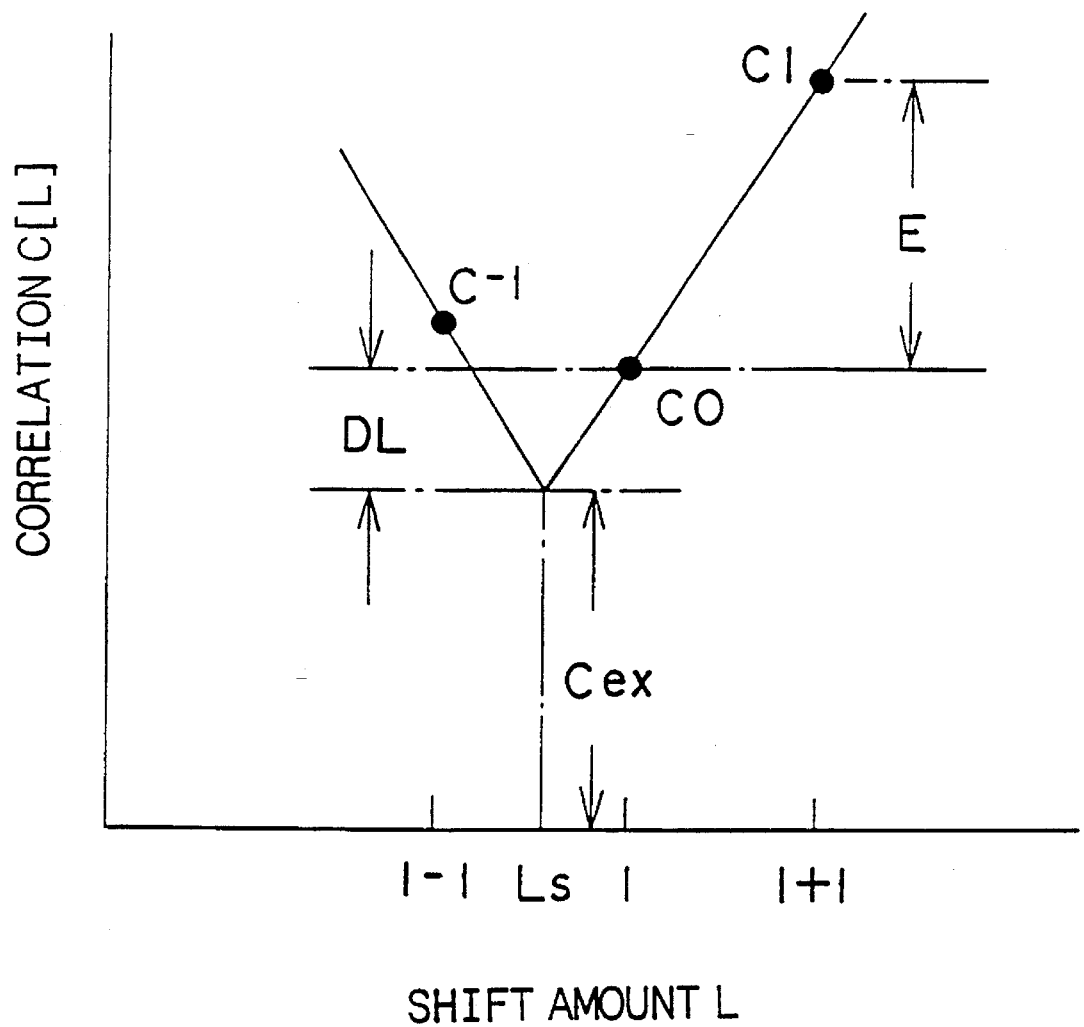
FIG. 18 is a representation showing a conventional three-point interpolating operation.
Figure 19A:
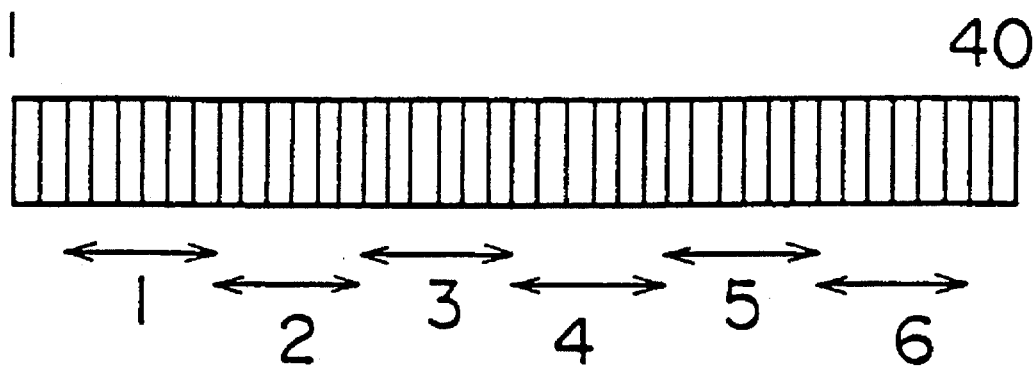
FIGS. 19A and 19B are representations each showing a conventional block division.
Figure 19B:
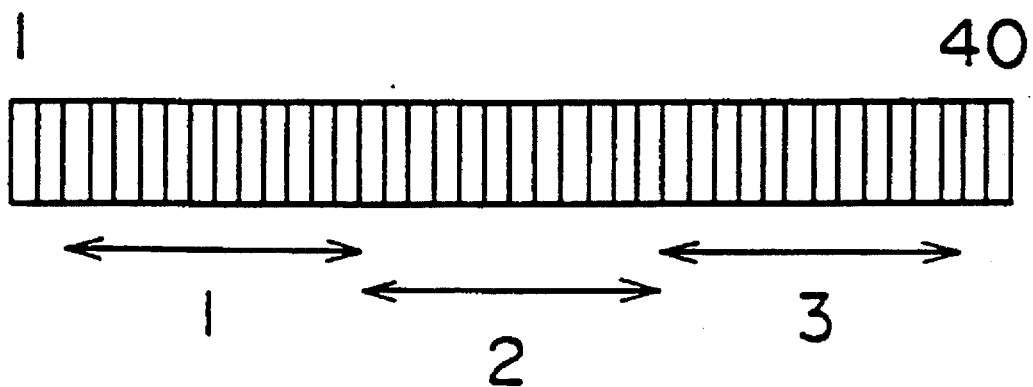
Figure 21A:
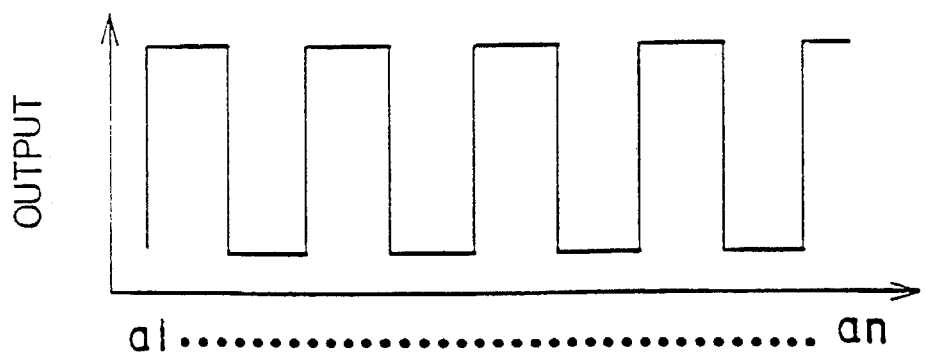
FIGS. 21A–21C are representations each showing a phenomenon when the object pattern is cyclic.
Figure 21B:
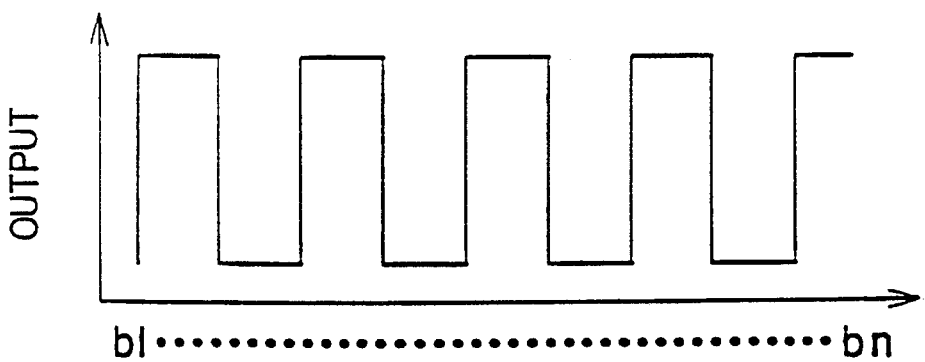
Figure 21C:
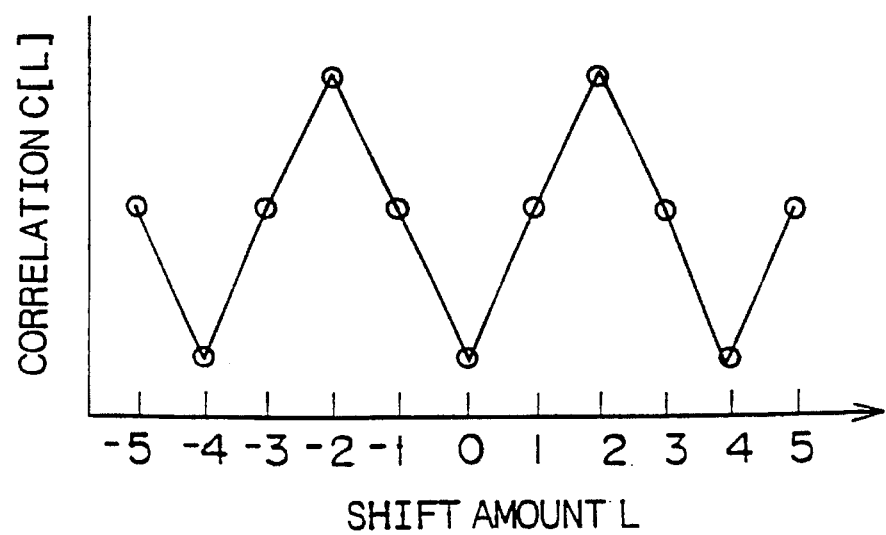

The use of the above-mentioned optical system and image sensors results in a focus detecting region shaped in a cross which is long sideways for the photograhic screen, as shown in FIG. 16A. A mode selection section 6 is provided to facilitate selection of two modes; one is to use the entire focus condition detection region for calculation and the other to use only the central portion for the sideway region as shown in FIG. 16B. The former is referred to hereinafter as a wide mode and the latter a spot mode.

Figure 12:
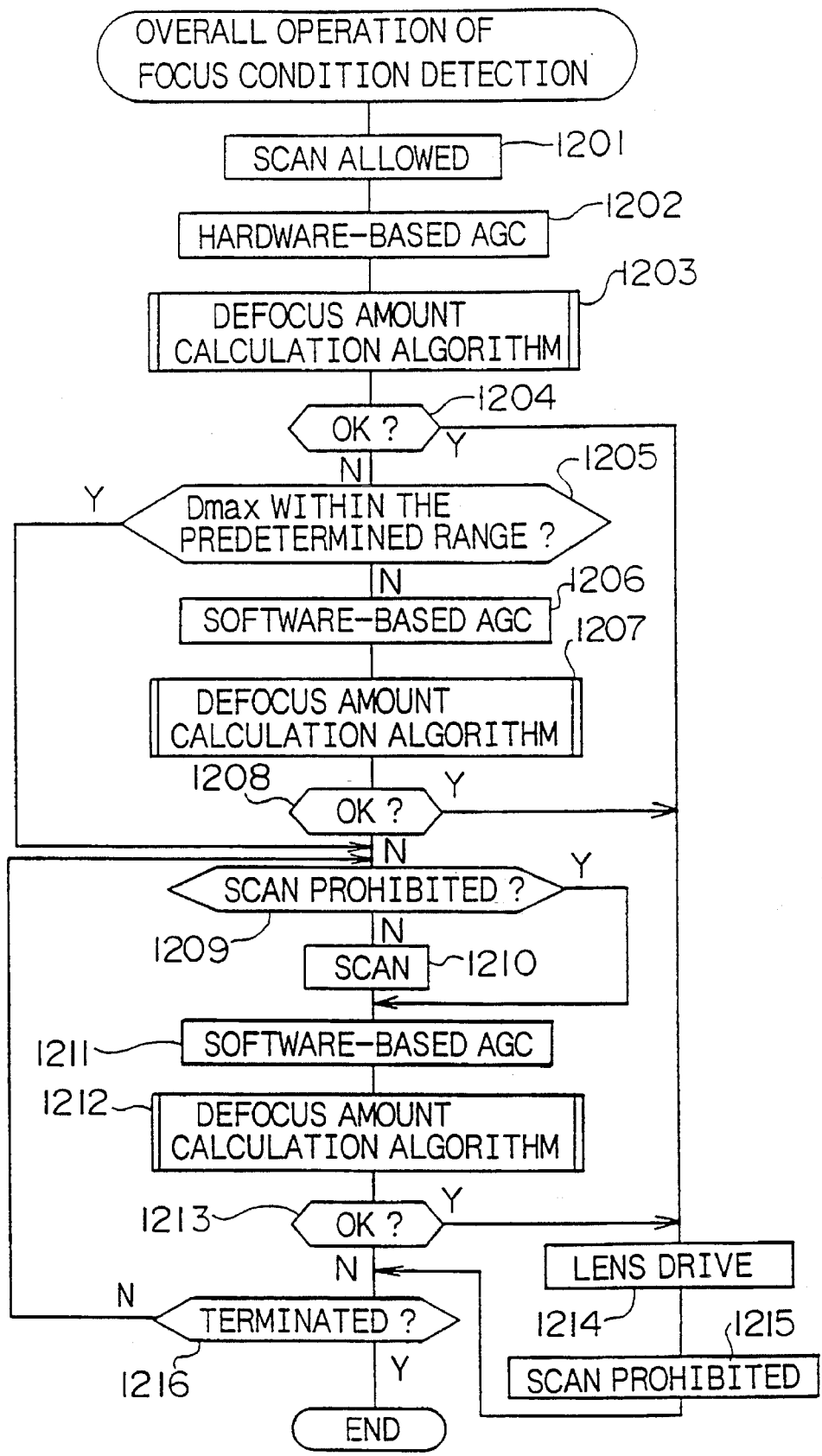
FIG. 12 is a flow chart showing an overall operation of the embodiment of the present invention.

FIG. 12 is a flow chart showing the operation of the focus condition detecting device as a whole. Before describing this figure, the hardware-based AGC and the software-based AGC are described.

AGC stands for Auto Gain Control which consists of control of the accumulation time of an accumulation type image sensor to obtain an adequate level of the charge accumulation signal. The software-based AGC is a method to determine the subsequent accumulation time by using the data obtained from the previous accumulation as described above. For example, when the maximum value of the charge accumulation signal obtained from the previous accumulation for the accumulation time of Itr is assumed to be DMax and the maximum value of the target charge accumulation signal WMax, the accumulation time It is determined from equation (9):

$$It = Itr \times WMax/DMax \qquad (9)$$

It is now possible to determine from this accumulation the charge accumulation signal which allows the maximum value DMax to become nearly equal to the target value WMax. It is desirable that the WMax value is the median of the range which the charge accumulation signal can take. For example, in this embodiment of the present invention, the charge accumulation signal is the 8-bit data, namely the value between 0–255, so WMax is 128. In the spot mode, it is preferable that the maximum value existing within the range applicable to the focus condition detecting operation is selected as DMax. Note that the accumulation time covers a certain range from the shortest setting Itmin to the longest Itmax.

The software-based AGC can offer the charge accumulation signal of a stable level, but cannot be used when the first accumulation has not been made, that is, this method cannot be used for the first accumulation. In the case of the first accumulation, the accumulation time is determined on the basis of the output of monitor sensors 71 and 72 provided in the neighborhood of the image sensor arrays in FIGS. 15A and B. In other words, the so-called hardware-based AGC is used. As monitor sensors 71 and 72 output the signals MH and MV corresponding to the average luminance of light rays incident upon image sensor arrays A and C, the maximum value DMax cannot be controlled.

For example, the monitor signal output varies between a case where the image sensor array as a whole is irradiated with approximately uniform luminance and a case where bright patterns exist locally in the dark background, even when the maximum value DMax is the same.

If the accumulation time is determined on the basis of an assumption that the image sensor array as a whole is irradiated with approximately uniform luminance, the data with which the maximum value DMax becomes nearly equal to the predetermined value can be obtained for an object with a single thin black line on a white background as shown in FIG. 20C because this is similar to irradiation of the image sensor array as a whole with approximately uniform luminance. However, in the case of an object with localized bright patterns in a dark background as shown in FIG. 20A, the accumulation time may be set longer than is needed for the normal object, resulting in a failure to obtain the proper level of data because the generated charge amount exceeds the limit of accumulation or the range available for processing. To overcome the above problem, the accumulation time is set for the normal case in which the contrast is distributed over the entire image sensor array.

The operation of the focus condition detecting device as a whole will be now described with reference to FIG. 12.

The scan operation described in Related Background Art is allowed when the focus condition detecting operation starts in Step 1201.

In Step 1202, accumulation in image sensor arrays A, 44, C, and D is made through hardware-based AGC to obtain the charge accumulation signals Da[i], Db[i], Dc[i], and Dd[i] for each array.

In step 1203, the defocus amount calculation algorithm is processed using the charge accumulation signals Da[i], Db[i], Dc[i], and Dd[i]. The algorithm will be detailed later while referring to FIGS. 2A, 2B and 3.

In step 1204, judgement is made whether or not the defocus amount can be obtained through the defocus amount calculation algorithm. If obtained, the defocus amount is used to start driving the lens (Step 1214), prohibiting the subsequent scan operation (Step 1215). If an operator of a camera has to interrupt the operation of photography or the operation of the focus condition detection has to be stopped because the photographing lens has entered the in-focus state, etc., the lens movement has to be stopped. Thus in Step 1216, judgement is made whether the program is terminated. If an affirmative answer is obtained, the program is terminated. If the program is not to be terminated, the program proceeds to Step 1209 to repeat accumulation of electric charge and execution of the defocus amount calculation algorithm.

Figure 22A:
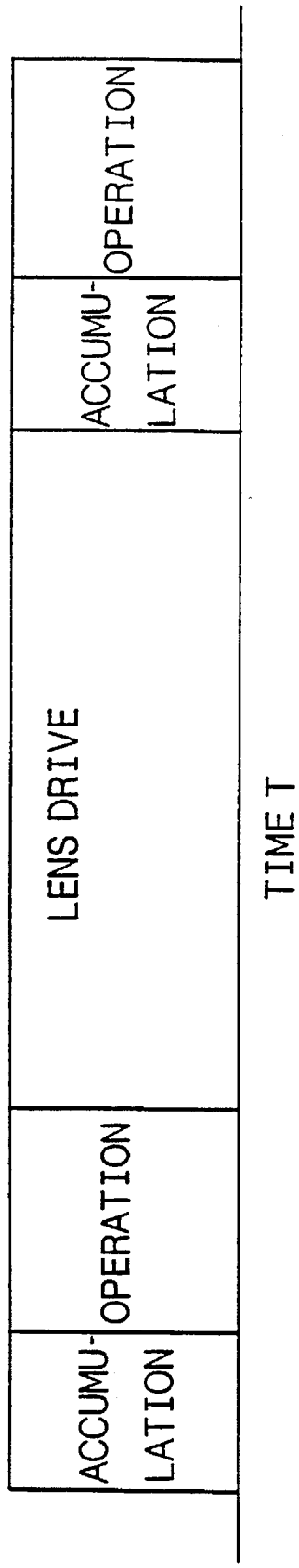
FIGS. 22A and 22B are timing charts each showing intermittent and overlap servos.
Figure 22B:
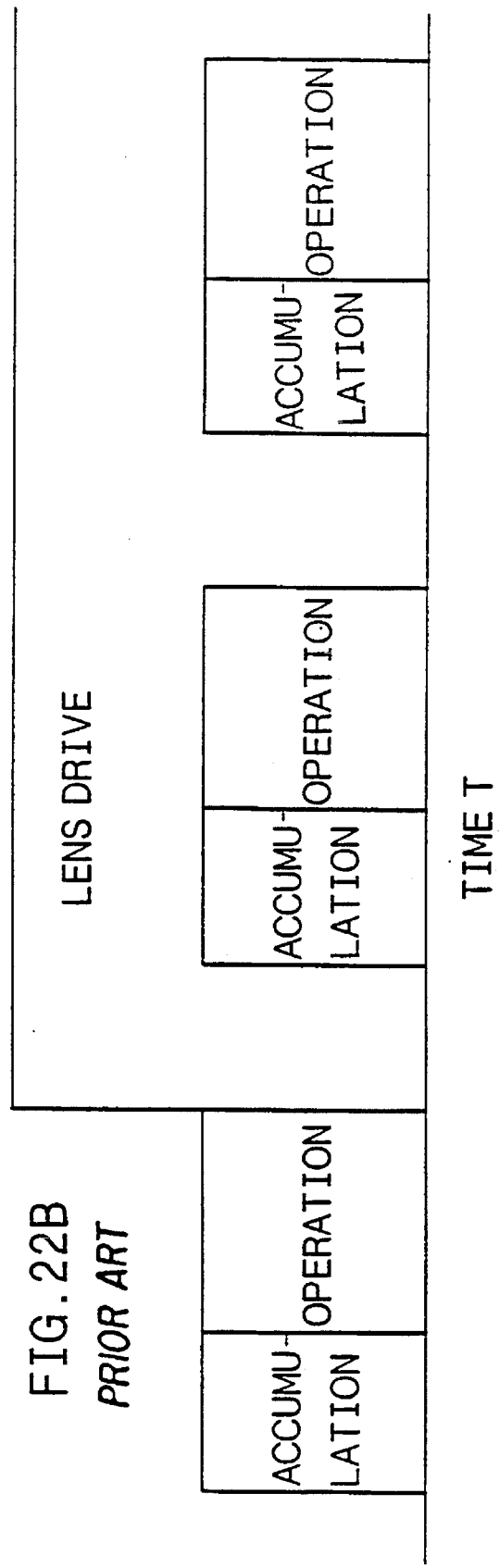

By repeating accumulation of electric charge and calculation of the defocus amount during lens drive as shown in the timing chart of FIG. 22B and by changing the target defocus amount of the lens drive each time the repetition is made, the overlap servo described in Related Background Art can be achieved. The program proceeds to Step 1205 when the defocus amount is not obtained because the focus condition detecting algorithm determines that the focus condition cannot be detected.

In Step 1205, the maximum value DMax of the charge accumulation signals is judged whether or not it is within the specified range. If it is found to be within the specified range, the charge accumulation signal obtained through the hardware-based AGC of Step 1202 can be judged to be the appropriate level of data. Accordingly, the reason why the focus condition is judged not to be detectable is considered that the photographing lens 10 is extremely out of the in-focus state and the program proceeds to Step 1209. In this step 1209, judgement is made whether or not an prohibition of the scan operation is set. If the Step 1209 is negated, the program proceeds to Step 1210 in which the scan operation is made, that is, the accumulation of electric charge and calculation of the defocus amount are repeated, with the photographing lens 10 driven in the specified direction, to search for the lens position where the in-focus state can be obtained.

If the maximum value DMax is not within the specified range, an object may be, for example, a single thin black line in a white background as shown in FIG. 20C. In such a case, it is considered that the hardware-based AGC of Step 1202 cannot offer the charge accumulation signal of an adequate level and it is impossible to detect the focus condition. Therefore, the program proceeds to Step 1206 without starting scan operation, where the software-based AGC is made for renewed accumulation of electric charge. The above-mentioned specified range may for example be 96–250 in the 8-bit data.

In Step 1206, the software-based AGC to determine the accumulation time by equation (9) is used for accumulation of electric charge and the charge accumulation signals Da[i], Db[i], Dc[i], and Dd[i] are obtained. In this case, the maximum value DMax should be equal to the target WMax.

In Step 1207, the defocus amount calculation algorithm is executed using the charge accumulation signals Da[i], Db[i], Dc[ i], and Dd[i].

In Step 1208, judgement is made whether or not the defocus amount can be obtained though the defocus amount calculation algorithm. If obtained, the defocus amount thus obtained is used to start driving the lens (Step 1214), prohibiting the subsequent scan operation (Step 1215). If an operator of a camera has to interrupt the operation of the photography or the operation of the focus condition detection has to be stopped because the photographing lens has entered the in-focus state, etc., the lens movement has to be stopped. Thus in Step 1216, judgement is made whether the program is terminated. An affirmative answer is obtained, the program is terminated. If the program is not to be terminated, the program proceeds to Step 1209 to repeat accumulation of electric charge and execution of the defocus amount calculation algorithm.

In the case that in the defocus amount calculation algorithm, it is judged that the focus condition cannot be detected and the defocus amount cannot be obtained though an adequate level of data could be obtained by the software-based AGC of Step 1206, it is considered that the photographing lens 10 is extremely distanced far from the in-focus position. Accordingly, the program proceeds to Step 1209. In this Step 1209, when no inhibition of the scan operation is judged, the program goes to Step 1210 in which the scan operation is made. That is, the accumulation of electric charge and calculation of the defocus amount are repeated, with the photographing lens 10 driven in the specified direction, to search for the lens position where the in-focus state can be obtained.

In Step 1209, judgement is made whether or not the scan operation is prohibited. In the case that the scan operation is prohibited or when the defocus amount has been obtained beforehand and the program has passed Steps 1214 and 1215, the program proceeds to Step 1211 to perform the overlap servo (not the scan operation) or the normal operation of the focus condition detection with the lens stopped. If it is not prohibited, the scan operation is made (Step 1210), followed by Step 1211.

In Step 1211, the software-based AGC to determine the accumulation time by equation (9) is used for accumulation of electric charge and the charge accumulation signals Da[i], Db[i], Dc[i], and Dd[i] are obtained. In this case, the maximum value DMax should be equal to the target WMax.

In Step 1212, the defocus amount calculation algorithm is executed using the charge accumulation signals Da[i], Db[i], Dc[i], and Dd[i].

In Step 1213, the judgement is made whether or not the defocus amount can be obtained though the defocus amount calculation algorithm. If obtained, the defocus amount thus obtained is used to start driving the lens (Step 1214), prohibiting the subsequent scan operation (Step 1215). If an operator of a camera has to interrupt the operation of photography or the operation of the focus condition detection has to be terminated because the photographing lens has entered the in-focus state, etc., the lens movement has to be stopped. Thus in Step 1216, judgement is made whether the program is terminated. An affirmative answer is obtained, the program is terminated. If the program is not to be terminated, the program proceeds to Step 1209 to repeat accumulation of electric charge and execution of the defocus amount calculation algorithm. If through the defocus amount calculation algorithm, the focus condition cannot be detected and the defocus amount not can be obtained, the program proceeds to Step 1216.

The defocus amount calculation algorithm of Steps 1203, 1207, and 1212 in FIG. 12 will be now described. This algorithm is used to calculate the defocus amount on the basis of the charge accumulation signals Da[i], Db[i], Dc[i], and Dd[i] of the image sensor 2. In this embodiment of the present invention, a total of five types (1st, 2nd, 3rd, 4th, and 5th) of filtered data are used individually.

Figure 2A:
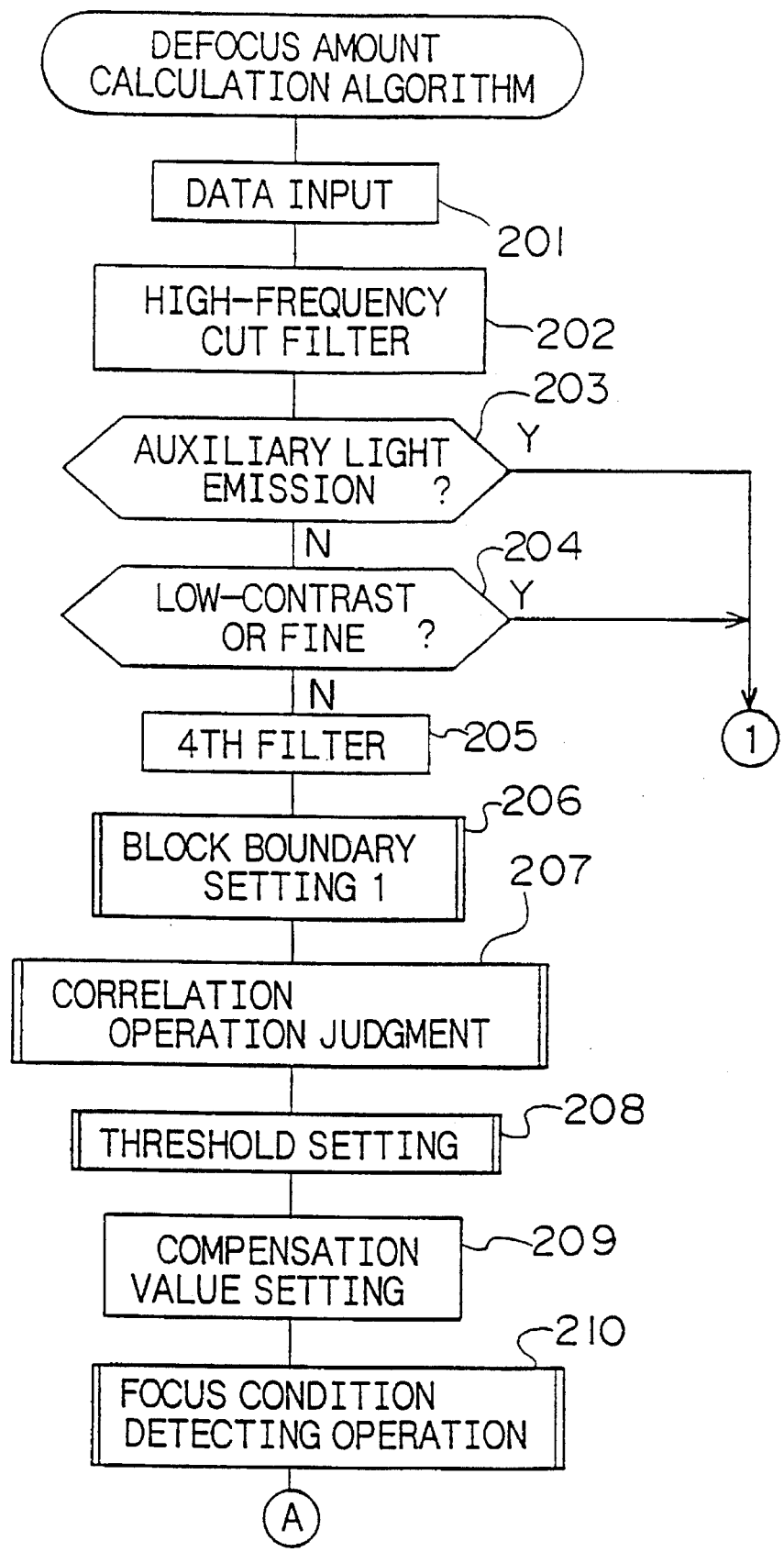
FIGS. 2A and 2B are flow charts each showing a defocus amount calculation algorithm of the embodiment of the present invention.
Figure 2B:
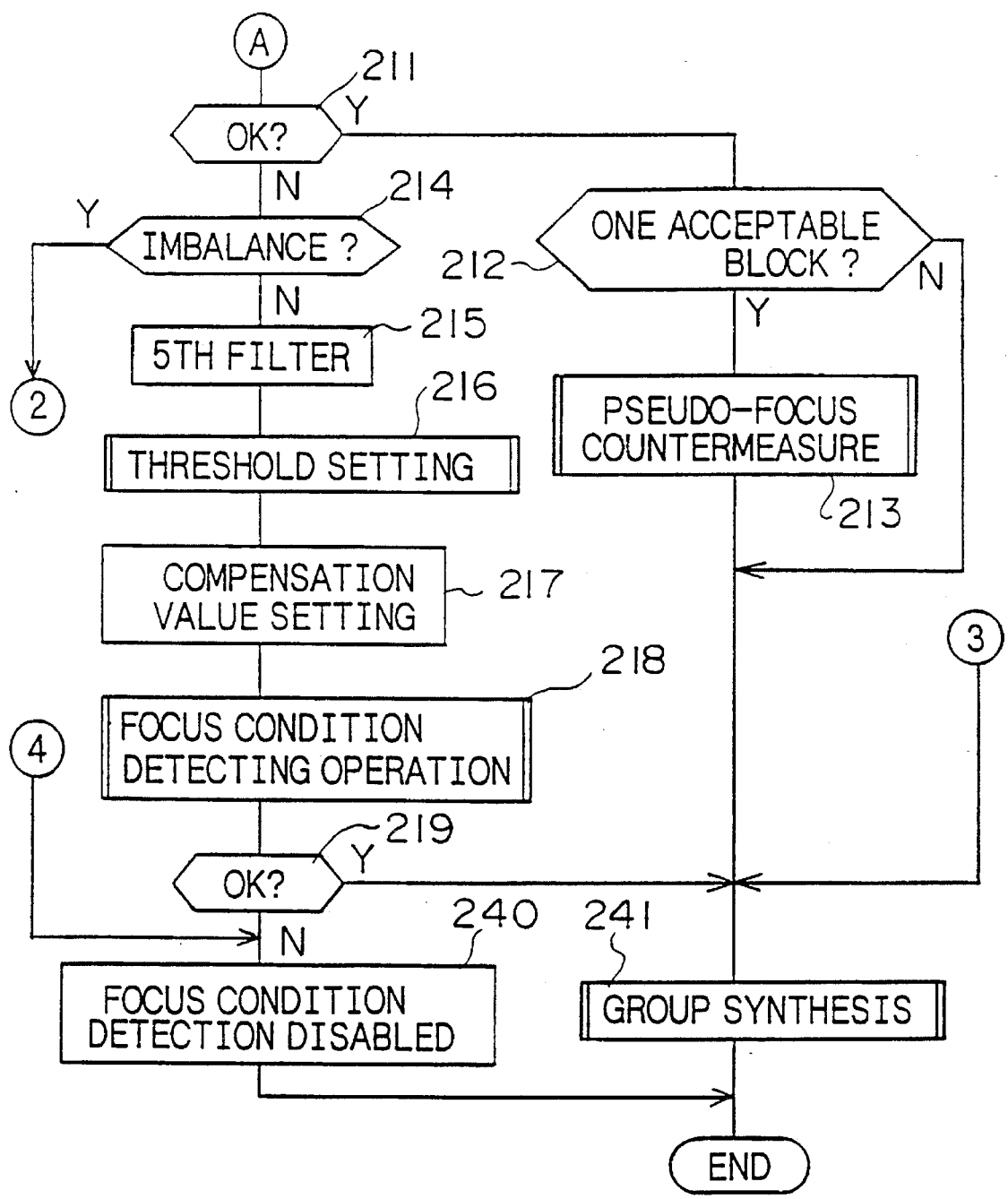
Figure 3:
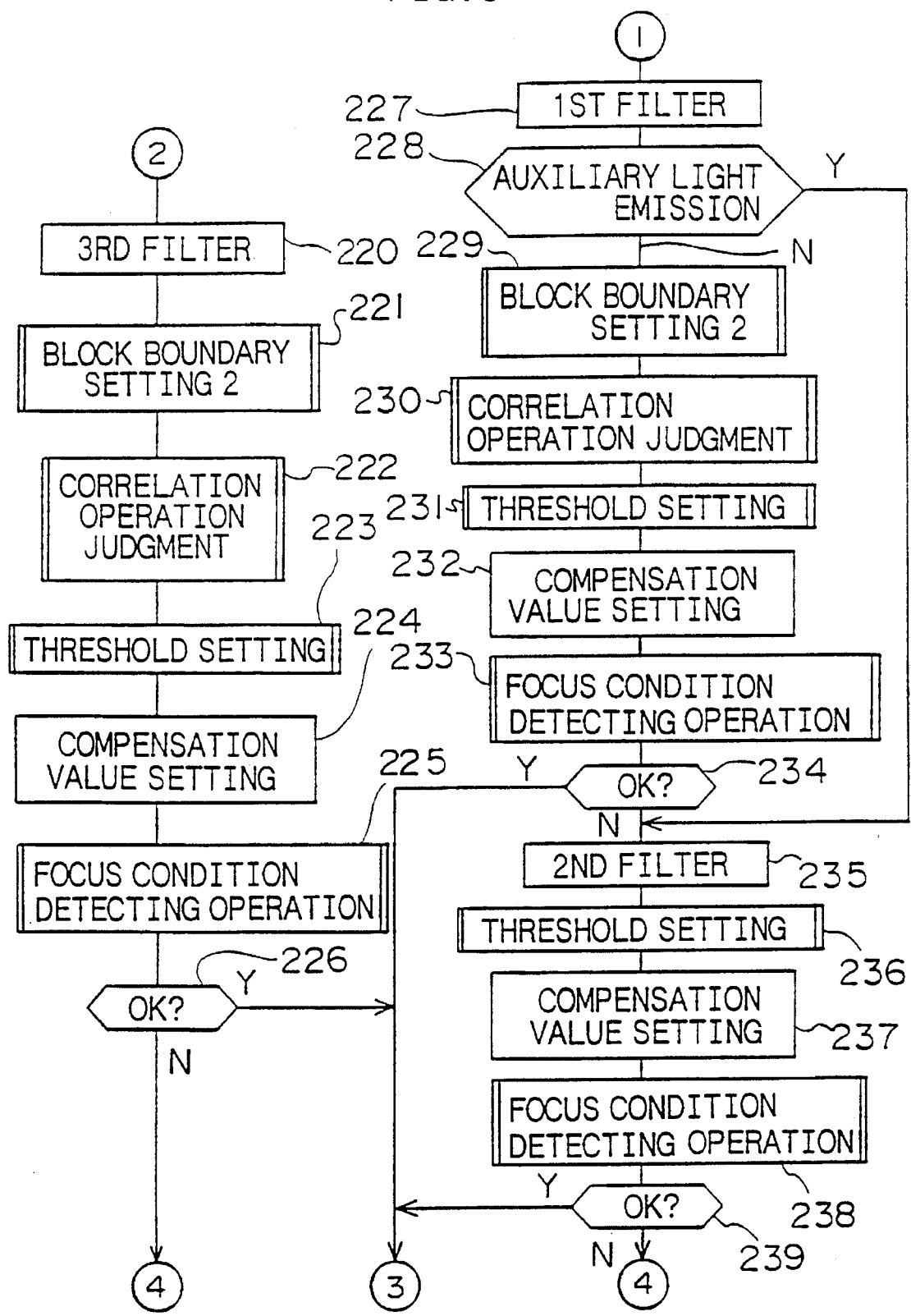
FIG. 3 is a flow chart showing a defocus amount calculation algorithm of the embodiment of the present invention, which is a continuation from FIGS. 2A and 2b.

Each of the first, third, and fourth filtered data is divided into a total of twelve blocks, including nine blocks in a horizontal direction and three blocks in a vertical direction with respect to the focus condition detecting region of FIG. 16A. Each of the second and fifth filtered data is divided into a total of four blocks, including three in the horizontal direction and one in the vertical direction with respect to the focus condition detecting region of FIG. 16A. The blocks of the second and fifth filtered data are larger than is the case with the first, third, and fourth filtered data. Referring to FIGS. 2A, 2B and 3, the operation of the defocus amount calculation algorithm will be now described.

In Step 201, the accumulated charge signal D@[i] is entered. The indication of the signal D@[i] represents all the signals Da[i], Db[i], Dc[i] and Dd[i]. The indication of the signals Da[i], Db[i], Dc[i] and Dd[i] indicates the charge accumulation signal of the train "a", "b", "c" and "d". This representation method applies to other subsequent data. The accumulated charge signal D@[i] is the 8-bit data comprising of 86 pairs of horizontal trains a and b and 37 pairs of vertical trains c and d.

In Step 202, the filtering operation to remove the high-frequency component from the object pattern as expressed by equation (10) is made for the entered accumulated charge signal D@[i] to obtain the data H@[i] from which the high frequency component has been removed. This H@[i] is the data comprising 84 pairs of horizontal trains a and b and 35 pairs of vertical trains c and d. The data H@[i] represents all the data Ha[i], Hb[i], Hc[i] and Hd[i].

$$H@[i]=(D@[i]+2D@[i+1]+D@[i+2])/4 \qquad (10)$$

Figure 23:
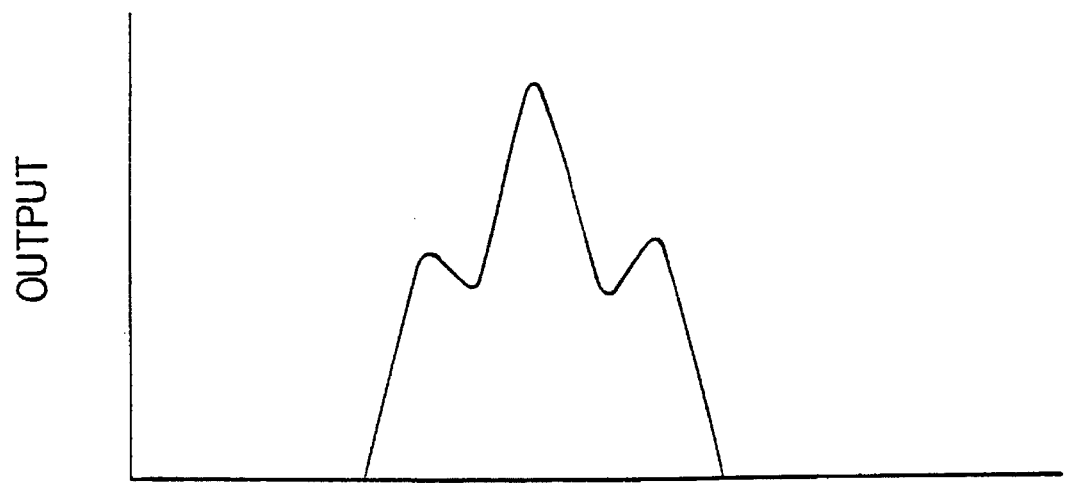
FIG. 23 is a representation showing an irradiation pattern of an auxiliary light.
Figure 24:
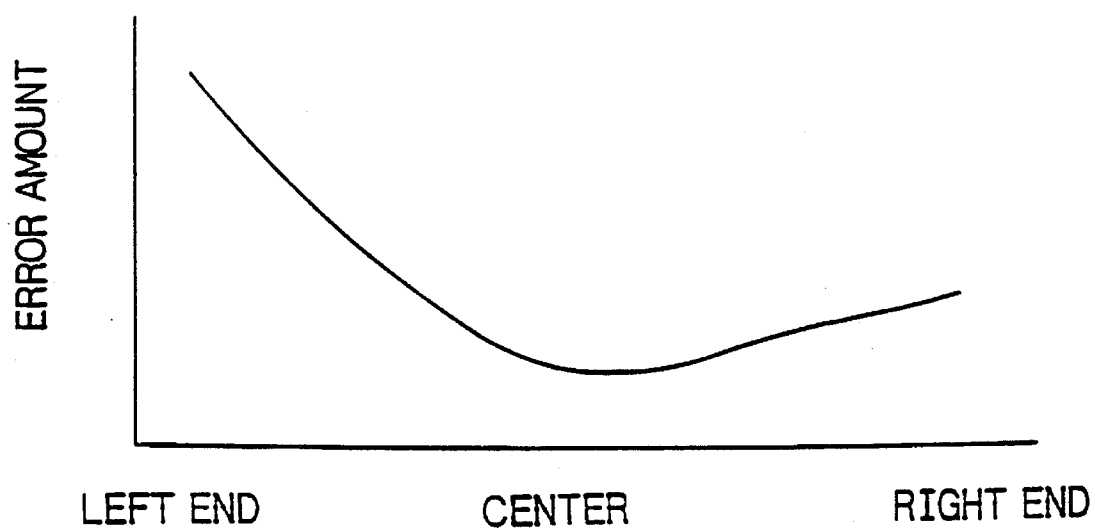
FIG. 24 is a representation showing a case in which the assembly error is not uniform within the focus condition detecting range.
Figure 25:
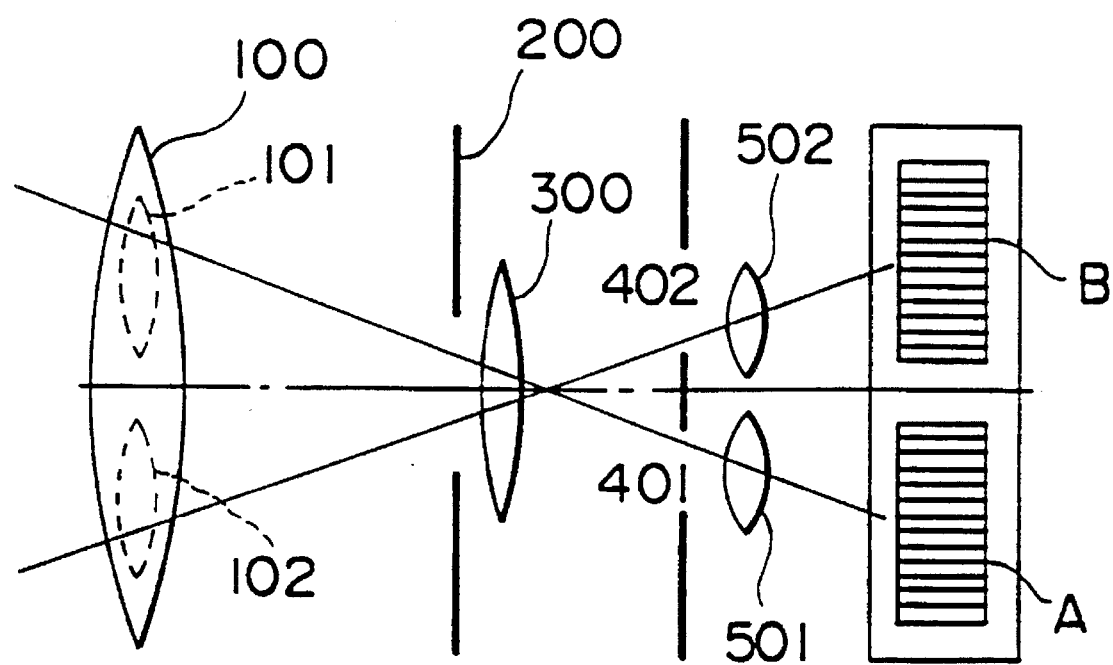
FIG. 25 is a representation showing a relative displacement detection method.

In Step 203, the auxiliary light with a light intensity pattern shown in FIG. 23 is emitted toward an object because an adequate charge accumulation signal cannot be obtained with a dark object even when the accumulation period is set to the maximum Itmax. The program proceeds to Step 227 in this case or Step 204 in a normal situation without emission of auxiliary light.

In Step 204, judgment is made whether the object pattern is of a low contrast type. (hereinafter referred to as low-contrast object), or the object is a minute one like a single line (hereinafter referred to as minute or fine object), for example. The program proceeds to Step 227 in the case of the low-contrast object or the minute object because it is preferable for this kind of object pattern to remove the DC component through a filtering operation. On the other hand, when Step 204 is negated, it is preferable for the data to be subjected to a filtering operation without complete removal of the DC component and therefore the program proceeds to Step 205.

The above judgment is referred to as a fine pattern discrimination whose method will be described later with reference to FIG. 13.

In Step 205, the fourth filtering operation to remove the low-frequency component as expressed by equation (14) is made for the high-frequency cut data H@[i] to obtain the data F4@[i] (hereinafter referred to as fourth filtered data) filtered by the fourth filtering operation. The data F4@[i] comprises of 80 pairs of horizontal trains and 31 pairs of vertical trains. The data F4@[i] represents all the data F4a[i], F4b[i], F4c[i] and F4d[i]. Since the DC component is not completely removed in this filtering operation, the possibility of pseudo-focus is low. As F4@[i] of equation (14) can have a negative value, an adequate predetermined value may be added to prevent the data F4@[i] from becoming negative.

$$F4@[i]=(-H@[i]+4H@[i+2]-H@[i+4])/2 \qquad (14)$$

As shown below, the data F4@[i] is divided into a total of nine basic blocks including the first through ninth blocks with respect to the horizontal train and into a total of three basic blocks including the 10th to 12th blocks with respect to the vertical train. Among these basic blocks, the 4th through 6th and the 10th through 12th blocks are used in the spot mode. Since the block boundary setting 1 (described later) of Step 206 is made using these basic blocks so that new blocks can be created, these basic blocks are not necessarily used in calculation of the defocus amount.

Horizontal train

Block 1 i=3–12

Block 2 i=13–20

Block 3 i=21–28

Block 4 i=29–36

Block 5 i=37–44

Block 6 i=45–52

Block 7 i=53–60

Block 8 i=61–68

Block 9 i=69–78

Vertical train

Block 10 i=3–11

Block 11 i=12–20

Block 12 i=21–29

In Step 206, the block boundary setting 1 is made to define a block division boundary on the basis of the contrast distribution of the fourth filtered data F4a[i] and F4c[i]. This processing is to prevent detection of the block boundary from being disabled or unstable because the pattern edge is positioned on this boundary. When the processing is over, a start data number Zs[bl] and an end data number Ze[bl] of each of the horizontal train blocks bl=1–9 and the vertical train blocks bl=10–12 are defined, respectively.

Details thereof are described with reference to FIG. 4.

This processing is made with the fourth filtered data F4@[i] in order to set the boundary at a position where the absolute value of the difference in strength of adjacent signals (hereinafter referred to as the adjacent difference) of train a for the horizontal train block and train c for the vertical train block becomes smallest. The operation of this boundary setting will be now described while taking the 2nd block of the horizontal train as an example.

In Step 401, the position determined by adding 1 to the end position Ze[bl−1] of the block [bl−1] defined previously, whose number is smaller by one, is set a start position Zs[bl].

$$Zs[bl]=Ze[bl-1]+1 \tag{15}$$

For example, if the end position Ze[1] of the first block is 12, the start position Zs[2] of the second block is 13.

In Step 402, the adjacent difference S[i] is calculated within a range of +/−2 data of the basic end position of a block (20 for the second block). Equation (16) is used for the second block.

$$S[1]=|F4a[18]-F4a[19]|$$

$$S[2]=|F4a[19]-F4a[20]|$$

$$S[3]=|F4a[20]-F4a[21]|$$

$$S[4]=|F4a[21]-F4a[22]|$$

$$S[5]=|F4a[22]-F4a[23]| \tag{16}$$

In Step 403, the maximum value Smax and the minimum value Smin are determined for S[1] through S[5].

In Step 404, the program is terminated by setting the basic end position itself to be the block end position (Step 406) when Smax−Smin is 5 or less. Otherwise, the program proceeds to Step 405.

In Step 405, the position where Stain is given is used as a block end position. For example, the block end position Ze[2] is 19 when S[2] is the minimum value and 22 when S[5] is the minimum value.

The above operation of block boundary setting is not necessary for the start position Zs of the first block of the horizontal train and the tenth block of the vertical train and for the end position Ze of the ninth block of the horizontal train and the 12th block of the vertical train because they are fixed.

Figure 5:
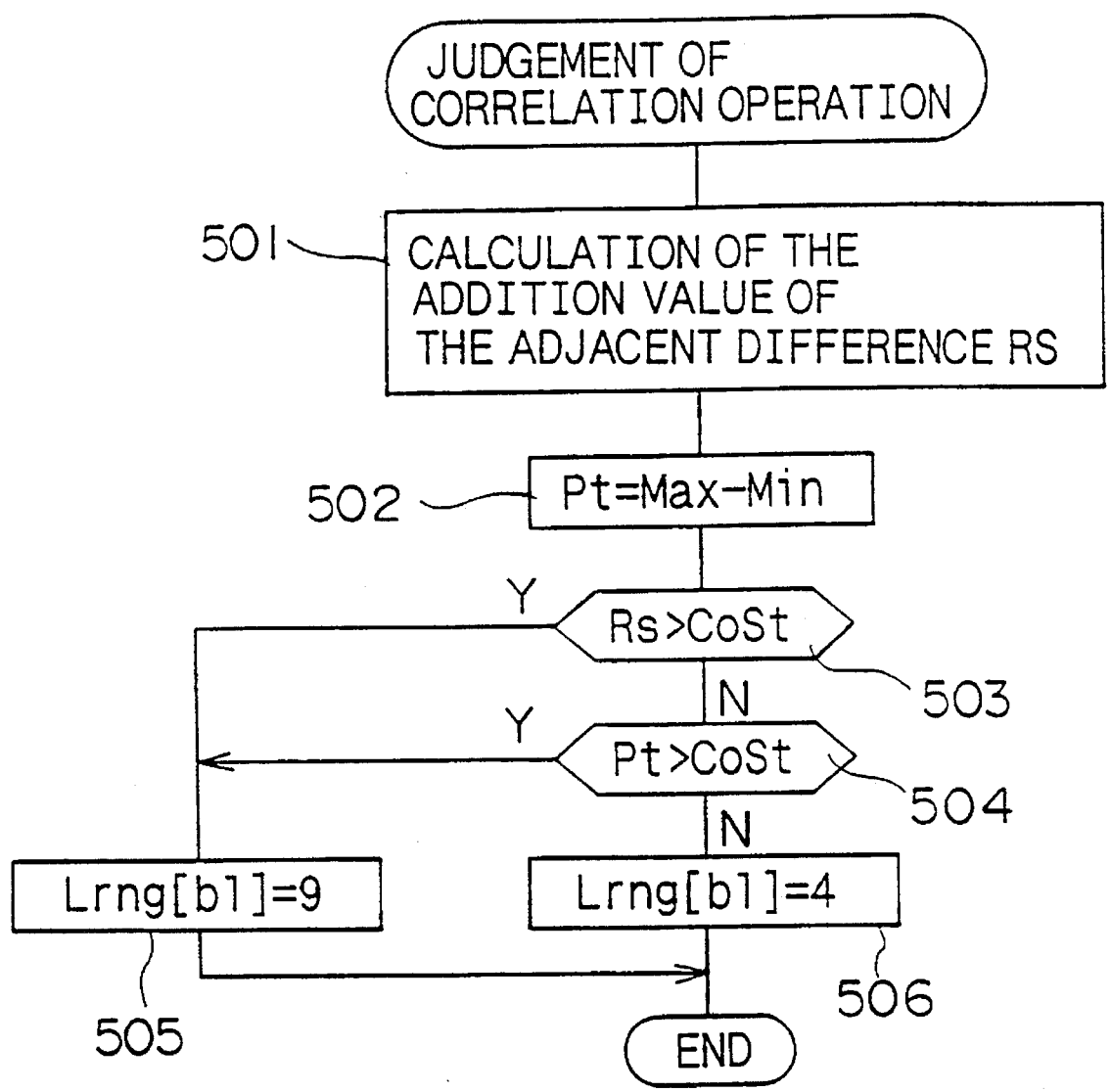
FIG. 5 is a flow chart showing a correlation operation judgment of the defocus amount calculation algorithm of the embodiment of the present invention.

In Step 207 shown in FIG. 2A, the maximum shift number Lrng[bl] of each block, which is used for calculation of the correlation of the focus condition detecting operation in Step 210, is set on the basis of the contrast within each block defined in Step 206. Since the focus condition can be detected with a high possibility when the object pattern in the block concerned has sufficient contrast, the maximum shift number Lrng[bl] is set to the larger number. When the contrast of the object pattern in the block concerned is not sufficient, detection of the focus condition may not be possible and Lrng[bl] is reduced to shorten the calculation period. This processing is referred to as a judgment of correlation operation and its operation will be now described with reference to FIG. 5.

In Step 501, an added value Rs[bl] of the adjacent difference for train a of the horizontal train and for train c of the vertical train among the fourth filtered data F4@[i] is calculated for each block by equation (17):

$$Rs[bl] = \sum_{i=Zs[bl]}^{Ze[bl]} |F4@[i] - F4@[i+1]| \tag{17}$$

In Step 502, the difference Pt[bl] between the maximum value and minimum value of each block is calculated by equation (18) for train a of the horizontal train block and for train c of the vertical train block of the fourth filtered data F4@[i]

$$Pt[bl]=Max\{F4@[Zs[bl]]-F4@[Ze[bl]]\}-Min\{F4@[Zs[bl]]-F4@[Ze[bl]]\} \tag{18}$$

In Step 503, the maximum shift number Lrng[bl] of block bl is set to 9 when Rs[bl] exceeds the predetermined value CoSt (Step 505). The program proceeds to Step 504 when Rs[bl] is less than the predetermined value.

In Step 504, the maximum shift number Lrng[bl] of the block bl is set to 9 when Pt[bl] exceeds the specified value CoSt (Step 505). The program proceeds to Step 506 when Pt[bl] is less than the specified value.

In Step 506, the maximum shift number Lrng[bl] of the block [bl] is set to 4.

In step 208 shown in FIG. 2A, a threshold of reliability used during the focus condition detecting operation of Step 201 is set. Details thereof will be given later with reference to FIG. 6.

In Step 209, an assembly error compensation amount ZL[bl] used for the focus condition detecting operation of Step 210 is calculated for each block on the basis of the assembly error Z[bl] stored in EEPROM and a gravity position of the contrast in the block defined in Step 206.

The assembly error Z[bl] is measured without block boundary setting 1 described in Step 206 by using the basic block division of Step 205 and an object such as a sufficiently fine black-and-white lattice pattern for the width of the basic block.

Since the assembly error Z[bl] is considered to represent that in the central position of the basic block, correct compensation cannot be achieved by using the assembly error Z[bl] as it is when the object pattern is at the block edge. Accordingly, the assembly error corresponding to the gravity position of the contrast within the block range defined in Step 206 is calculated by using an interpolation from the assembly error Z[bl] of block bl and that of Z[bl+1] of the neighboring block bl+1 or that of Z[bl−1] of the block bl−1 and the thus calculated assembly error is referred to as an assembly error compensation value ZL[bl].

A gravity center Mk[bl] of the contrast of train a for the horizontal train block and train c for the vertical train block is determined for each block defined by the block boundary setting 1 in Step 206 by equation (19), and the assembly error compensation value ZL[bl] is calculated from this gravity center Mk[bl] and a central element number Bm[bl] of the basic block by equation (20). The Mk[bl] is the number of the elements consisting of the defined block and the gravity center of the contrast for each defined block is positioned in the element numbered by Mk[bl]. The element of the basic block specified by the number Bm[bl] is positioned at the center of the basic block.

$$Mk[bl] = \frac{\sum_{i=Zs[bl]}^{i=Ze[bl]-1} \{i \times |F4@[i] - F4@a[i]|\}}{\sum_{i=Zs[bl]}^{i=Ze[bl]-1} |F4@[i] - F4@[i]|} \tag{19}$$

(1) For 2nd–8th horizontal and 11th vertical blocks when Mk[bl]>Bm[bl]

$$ZL[bl]=Z[bl]+\{Mk[bl]-Bm[bl]\}\times\{Z[bl+1]-Z[bl]\}/\{Bm[bl+1]-Bm$$

$\{bl\}$ when $Mk[bl] \leq Bm[bl]$ $ZL[bl]=Z[bl]+\{Mk[bl]-Bm[bl]\}\times\{Z[bl]-Z[bl-1]\}/\{Bm[bl]-Bm[bl-1]\}$ (2) For 1st horizontal block and 10th vertical blocks $ZL[bl]=Z[bl]+\{Mk[bl]-Bm[bl]\}\times\{Z[bl+1]-Z[bl]\}/\{Bm[bl+1]-Bm[bl]\}$ (3) For 9th horizontal block and 12th vertical blocks $ZL[bl]=Z[bl]+\{Mk[bl]-Bm[bl]\}\times\{Z[bl]-Z[bl-1]\}/\{Bm[bl]-Bm[bl-1]\}$ (20)

In Step 210, each of the defocus amount Df[1] through [12] is calculated for each block defined in Step 206. Details thereof will be given later with reference to FIGS. 8, 9, and 10.

In Step 211, judgment is made if the defocus amount has been determined for at least one or more blocks. If the defocus amount has been calculated, the program proceeds to Step 212. The program proceeds to Step 214 when the defocus amount could not be determined for all blocks.

When the object pattern is neither a low-contrast nor a fine, that is, if the defocus amount can be calculated for one block only though the contrast distribution of the object pattern is made over the entire range, then the so-called pseudo-focus state may occur if the sole defocus amount thus determined is not correct. Pseudo-focus means that the lens stops because of a misunderstanding that the out-of-focus state is the in-focus state though the position of the lens is extremely apart from the in-focus position. When the defocus amount has been determined for one block only, the program proceeds from Step 212 to 213 to prevent the pseudo-focus state. When the defocus amount can be determined for a plurality of blocks, no pseudo-focus countermeasure is necessary and the program proceeds from Step 212 to 240.

Figure 11:
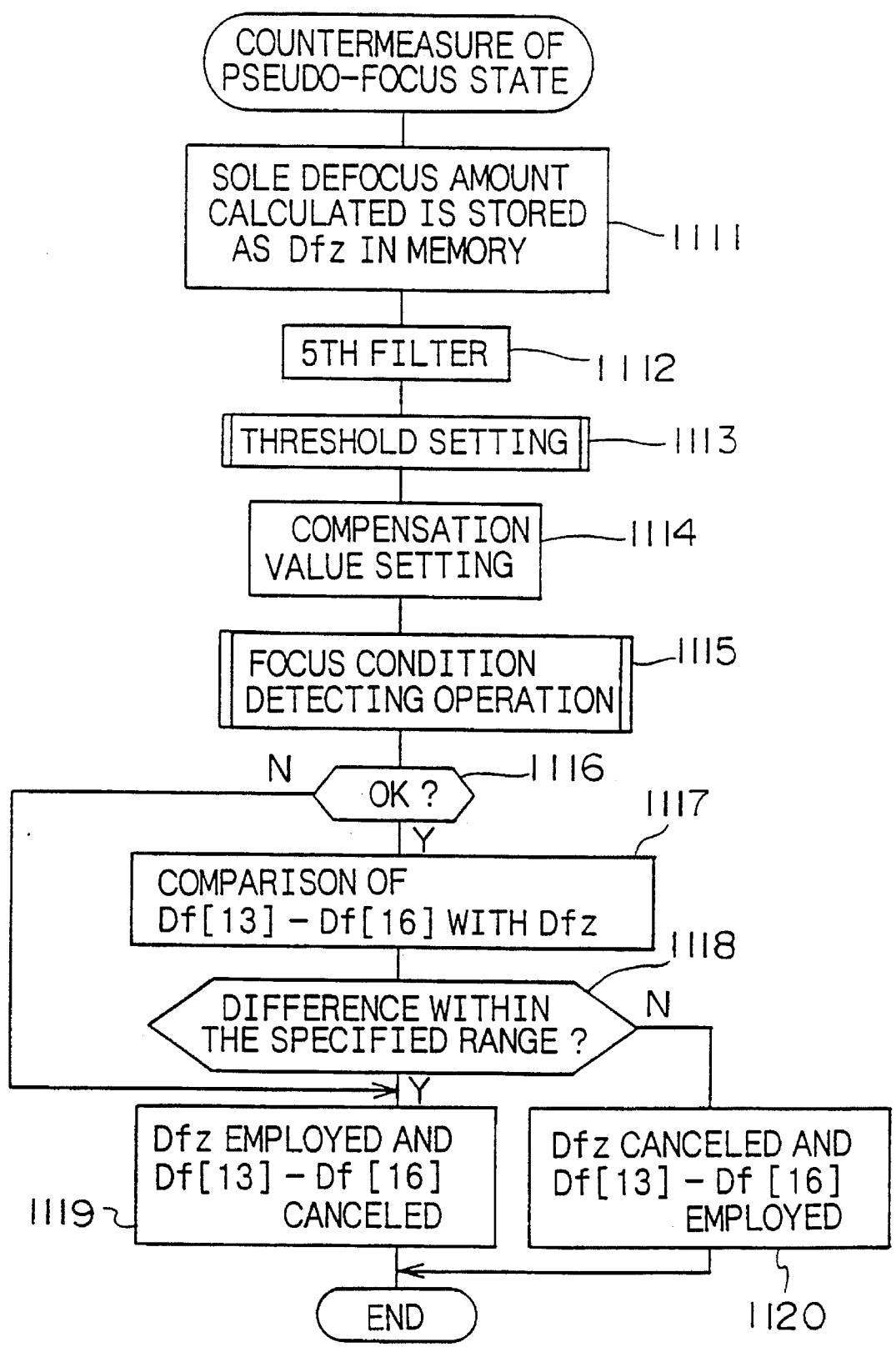
FIG. 11 is a flow chart showing a pseudo-focus preventing operation of the defocus amount calculation algorithm of the embodiment of the present invention.

In Step 213, the pseudo-focus preventive counter measure as described in Step 212 is taken. Details thereof will be given later with reference to FIG. 11.

When detection of the focus condition with the fourth filtered data has been judged to be disabled for all blocks in Step 211, judgment is made in Step 214 whether this failure is caused by DC imbalance in the charge accumulation signal of trains a and b or trains c and d. The judgment method will be described later. If an imbalance is judged responsible, the data having been subjected to a filtering operation for removal of the DC component must be used and the program proceeds to Step 220. Otherwise, the program proceeds to Step 215.

If an imbalance is judged not to be the cause for the disable operation using the fourth filtered data, it is considered that either the object pattern is lower in frequency than the frequency component extracted from the fourth filtered data or the current defocus amount is too large to be detected by the maximum shift number set in Step 207. Accordingly, in Step 215, the fifth filtering operation expressed by equation (21) is made on the fourth filtered data F4@[i] to obtain fifth filtered data F5@[i] comprising of 37 pairs of horizontal train and 13 pairs of vertical train. The data F5@[i] represents all the data F5a[i], F5b[i], F5c[i] and F5d[i].

$$F5@[i] = \{F4@[s]+2F4@[s+1]+ \\ 3F4@[s+2]+4F4@[s+3]+ \\ 3F4@[s+4]+2F4@[s+5]+ \\ F4@[s+6]\}/16 \quad (21)$$

$s = i \times 2 - 1$

The fifth filtering operation is for extraction of a lower frequency component than is the case with the fourth filtered data though the DC component remains unremoved. Besides, every other data are taken here, so that one shift for correlation calculated in the focus condition detecting operation using the fifth filtered data is equivalent to two shifts for the fourth filtered data. This in turn enables detection of a large defocus amount without increasing the maximum number of data shift.

The fifth filtered data is divided into a total of three basic blocks comprising the 13th to 15th blocks for the horizontal train and a total of one basic block comprising the 16th block for the vertical train, as shown below. Among these blocks, the 14th and 16th blocks are used in the spot mode. The block boundary setting 1 described in Step 206 is not made for the fifth filtered data and the basic blocks are used as previously fixed.

*Horizontal train

Block 13—Zs[13]=2, Ze[13]=13

Block 14—Zs[14]=14, Ze[14]=24

Block 15—Zs[15]=25, Ze[15]=36

*Vertical train

Block 16—Zs[15]=2, Ze[16]=12

The block boundary setting i of Step 206 is not made here because the object has either a gently-sloping low-frequency pattern or a blurred pattern due to a large defocus amount and shifting of the block boundary is meaningless.

The maximum number of shift Lrng[bl] for calculating the focus condition is fixed as shown below without being subjected to the correlation operation judgment of Step 207:

*Horizontal train

Block 13—Lrng[13]=12

Block 14—Lrng[14]=21

Block 15—Lrng[15]=12

*Vertical train

Block 16—Lrng[16]=7

In Step 216, the threshold for judgment of the reliability, which is used during the focus condition detecting operation in Step 218, is set. Details of setting the threshold will be given later with reference to FIG. 6.

In Step 217, the assembly error compensation value ZL[bl] used for detection of the focus condition in Step 218 is calculated for each block on the basis of the assembly error Z[bl] stored in EEPROM and the contrast gravity center position in the block defined in Step 215. The calculation method is similar to Step 209, wherein the assembly error compensation value is calculated by equation (23) from the contrast gravity center Mk[bl], which has been determined by equation (22) for the train a of the horizontal blocks and train c of the vertical blocks in the blocks defined by block boundary setting 1 of Step 215, and the central element number Bm[bl]:

$$Mk[bl] = \frac{\sum_{i=Zs[bl]}^{i=Ze[bl]-1} \{i \times |F5a[i] - F5a[i]|\}}{\sum_{i=Zs[bl]}^{i=Ze[bl]-1} |F5a[i] - F5a[i]|} \quad (22)$$

(1) For 14th horizontal block when Mk[bl]>Bm[bl]

$$ZL[bl]=Z[bl]+\{Mk[bl]-Bm[bl]\}\times\{Z[bl+1]-Z[bl]\}/\{Bm[bl+1]-Bm[bl]\}$$

when Mk[bl]≦Bm[bl]

$$ZL[bl]=Z[bl]+\{Mk[bl]-Bm[bl]\}\times\{Z[bl]-Z[bl-1]\}/\{Bm[bl]-Bm[bl-1]\}$$

(2) For 13th horizontal block $$ZL[bl]=Z[bl]+\{Mk[bl]-Bm[bl]\}\times\{Z[bl+1]-Z[bl]\}/\{Bm[bl+1]-Bm[bl]\}$$

(3) For 15th horizontal block $$ZL[bl]=Z[bl]+\{Mk[bl]-Bm[bl]\}\times\{Z[bl]-Z[bl-1]\}/\{Bm[bl]-Bm[bl-1]\} \quad (23)$$

Since the vertical train contains only one block, the assembly error Z[16] stored in EEPROM may be used as it is for the assembly error compensation value ZL[16].

$$ZL[16]=Z[16] \quad (24)$$

In the case of the fifth filtered data, the object has either a gently-sloping low-frequency pattern or a blurred pattern because of the large defocus amount, resulting in distribution of the contrast over a wide range. In this sense, the assembly error Z[bl] stored in EEPROM may be used as it does not cause problems for the assembly error compensation value ZL[bl] for horizontal 13th–15th blocks (Equation 25).

$$ZL[bl]=Z[bl] \quad (25)$$

In Step 218, each of the defocus amounts Df[13] through [16] is calculated for each block defined in Step 215. Details of calculation of the defocus amount will be given later with reference to FIGS. 8, 9, and 10.

In Step 219, judgment is made if the defocus amount has been determined for at least one or more blocks. If the defocus amount has been calculated, the program proceeds to Step 241 for group synthesis. Details thereof will be given later. When the defocus amount could not be determined for all blocks, the program proceeds to Step 240 in which a failure of focus condition detection is determined.

When imbalance is judged to be the cause for the disable operation using the fourth filtered data in Step 214, focus detection with the fifth filtered data described previously, if made subsequently, may also be disabled due to imbalance. In this case, a filtering operation to remove the DC component completely must be made for renewed operation of the focus condition. In Step 220, therefore, a third filtering operation to remove the DC component completely, as expressed by equation (26), is made on the fourth filtered data F4@[i] to obtain a third filtered data F3@[i] comprising 76 pairs of horizontal train and 27 pairs of vertical train. The data F3@[i] represents the data F3[i], F3b[i], F3c[i] and F3d[i].

$$F3@[i]=(-F4@[i]+2F4@[i+2]-F4@[i+4])/2 \quad (26)$$

As F3@[i] of equation (26) can have a negative value, an adequate predetermined value may be added to prevent the data F3@[i] from becoming negative. In the data, the horizontal train as shown below is divided into a total of nine basic blocks including the first through ninth blocks and the vertical train into a total of three basic blocks including the 10th to 12th blocks. Among these basic blocks, the 4th through 6th and 10th through 12th blocks are used in the spot mode. Since a block boundary setting 2 (described later) of Step 221 is made using these basic blocks so that new blocks can be created, the basic blocks do not necessarily use to calculate the defocus amount.

Horizontal train
Block 1 i=2–10
Block 2 i=11–18
Block 3 i=19–26
Block 4 i=27–34
Block 5 i=35–42
Block 6 i=43–50
Block 7 i=51–58
Block 8 i=59–66
Block 9 i=67–75
Vertical train
Block 10 i=2–9
Block 11 i=10–18
Block 12 i=19–26

In Step 221, the block boundary setting 2 is made to define a block division boundary on the basis of the contrast distribution of the third filtered data F3a[i] and F3c[i]. This processing is to prevent detection of the block boundary from being disabled or unstable because the pattern edge (contrast point) is positioned on this boundary. When the processing is over, a start data number Zs[bl] and an end data number Ze[bl] of each of the horizontal train blocks bl=1–9 and the vertical train blocks bl=10–12 are defined respectively.

The third filtering operation is made by a differential type filter. The third filtered data F3@[i] takes the 0 value for a data portion having no changes in the data before the third filtering operation and other values than 0 for a data portion having changes. Note however that F3@[i] takes the value of the specified value (not 0) when such a specified value has been added to prevent F3@[i] from taking a negative value.

Different from the block boundary setting 1 (Step 206) for the fourth filtered data F4@[i] which defines the boundary at a position where the absolute value of adjacent difference of data is small, the block boundary setting 2 defines the block boundary at a position nearest to the 0 value representing the unchanged data portion before the filtering operation.

This processing is made using train a for the horizontal block and train c for the vertical block. The operation of the block boundary setting 2 is described below with reference to FIG. 14 while taking the horizontal second block as an example.

In Step 411, the position determined by adding 1 to the end position Ze[bl−1] of the block [be−1] defined previously, whose number is smaller by one, becomes a start position Zs[bl] (Equation 27).

$$Zs[bl]=Ze[bl-1]+1 \quad (27)$$

For example, if the end position Ze[1] of the first block is 10, the start position Zs[2] of the second block is 11.

In Step 412, the absolute value Dv[1–6] is calculated within a range of −2–+3 data of the basic end position of a block (18 for the second block). Equation (28) is used for the second block.

$$Dv[1]=|F3a[16]-0|$$
$$Dv[2]=|F3a[17]-0|$$
$$Dv[3]=|F3a[18]-0|$$
$$Dv[4]=|F3a[19]-0|$$
$$Dv[5]=|F3a[20]-0|$$
$$Dv[6]=|F3a[20]-0| \quad (28)$$

If, in Step 220, the predetermined value has been added to F3@[i] determined by equation (26) to prevent it from becoming a negative value, the predetermined value, instead of 0, must be subtracted in equation (28).

In Step 413, the sum Ws [1–5] of the neighboring data of Dv [1–6] is calculated. For the second block, the sum is calculated by equation (29):

$$Ws[1]=Dv[1]+Dv[2]$$
$$Ws[2]=Dv[2]+Dv[3]$$
$$Ws[3]=Dv[3]+Dv[4]$$
$$Ws[4]=Dv[4]+Dv[5]$$
$$Ws[5]=Dv[5]+Dv[6] \quad (29)$$

In Step 414, the maximum value Wmax and minimum value Wmin are determined for Ws [1–5].

When it is judged in Step 415 that the maximum value Wmax is 10 or less, the basic end position itself is set as the block's end position Ze[2] in Step 421. The program proceeds to Step 416 when the maximum value exceeds 10.

When it is judged in Step 416 that the minimum value Wmin is 16 or less, the position which gives Wmin is set as the block's end position Ze[2] in Step 417. For example, 17 is set as the end position Ze[2] of the second block if Ws[2] is the minimum and 20 set when Ws[5] is the minimum. When there are a plurality of positions which give the minimum value Wmin, the position with the smaller number is selected. The program proceeds to Step 418 from Step 416 when Wmin is larger than 16.

In Step 418, Ws [1] and Ws [5] are compared with each other and the position which gives the smaller value is set as the end position Ze[2] of the block (Steps 419 and 420). For example, 16 is set as the end position Ze[2] of the second block when Ws[1] is smaller and 20 set when Ws[5] is smaller. Ws[1] is set as the smaller value if both Ws[1] and Ws [5] are equal.

The above operation of the block boundary setting 2 is not necessary for the start position Zs of the horizontal first block and vertical 10th block and for the end position Ze of the horizontal ninth block and vertical 12th block, because these positions are fixed.

In Step 222 shown in FIG. 3, the maximum shift number Lrng[bl] of each block, which is used for calculating the correlation of the focus condition detecting operation in Step 225, is set on the basis of the contrast within each block defined in Step 221. Details thereof are the same as Step 207 except that F3@[i] is used instead of F4@[i] in equations (17) and (18).

In step 223, the threshold of reliability used during focus condition detecting operation in Step 225 is set. Details thereof will be given later with reference to FIG. 6.

In Step 224, the assembly error compensation amount ZL[bl] used for focus condition detecting operation in Step 225 is calculated for each block on the basis of the assembly error Z[bl] stored in EEPROM and the gravity position of the contrast in the block defined in Step 221. Details thereof are the same as Step 209 except that F3@[i] is used instead of F4@[i] in equation (19).

In Step 225, each of the defocus amounts Df[1]–Df[12] is calculated for each block defined in Step 221. Details thereof will be given later with reference to FIGS. 8, 9 and 10.

In Step 226, judgment is made if the defocus amount has been determined for at least one or more blocks. If the defocus amount has been calculated, the program proceeds to Step 241 for group synthesis. The program proceeds to Step 240 in which a failure of focus condition detection is determined, when the defocus amount could not be determined for all blocks.

In Step 227, the first filtering operation to remove the low-frequency component as expressed by the equation (30) is made on the high-frequency cut data H@[i] to obtain the first filtered data F1@[i] comprising 80 pairs of horizontal train and 31 pairs of vertical train. The data F1@[i] represents all the data F1a[i], F1b[i], F1c[i] and F1d[i].

$$F1@[i]=-H@[i]+2H@[i+2]-H@[i+4] \quad (30)$$

Since this filtering operation removes the DC component completely, there exists a high possibility of causing pseudofocus for an object wherein the contrast is distributed over the entire range. But this filtering operation ensures high accuracy for a fine object pattern. As F1@[i] of equation (30) can have a negative value, an adequate predetermined value may be added to prevent F1@[i] from becoming the negative value.

In this data, the horizontal train as shown below is divided into a total of nine basic blocks including the first through ninth blocks and the vertical train into a total of three basic blocks including the 10th to 12th blocks. Among these basic blocks, the 4th through 6th and the 10th through 12th blocks are used in the spot mode. Since block boundary setting 2 of Step 229 is made using these basic blocks so that new blocks can be created, the basic blocks do not necessarily use to calculate the defocus amount.

Horizontal train
Block 1 i=3–12
Block 2 i=13–20
Block 3 i=21–28
Block 4 i=29–36
Block 5 i=37–44
Block 6 i=45–52
Block 7 i=53–60
Block 8 i=61–68
Block 9 i=69–78
Vertical train
Block 10 i=3–11
Block 11 i=12–20
Block 12 i=21–29

In Step 228, judgment is made whether the program proceeds to Step 227 due to the judgement in Step 203 that the auxiliary light has been irradiated or judgement in Step 204 that the object has either a low-contrast pattern or a fine pattern. The auxiliary light emission pattern is smooth as shown in FIG. 23, indicating that the high-frequency component does not exist so much while the low-frequency component is large in content. Accordingly, operation of the focus condition with the first filtered data F1@[i] appropriate to an object pattern with a large amount of high-frequency component is not made. Instead, the program proceeds to Step 235 in which the second filtering operation is carried out on the first filtered data F1@[i] to obtain the second filtered data F2@[i] appropriate for an object pattern with many low-frequency components. The program proceeds to Step 229 when the object has either a low-contrast pattern or a fine pattern.

In Step 229, the block boundary setting 2 is performed to define the block dividing boundary on the basis of the contrast distribution of the first filtered data F1a[i] and F1c[i]. Details thereof are the same as Step 221 except that F1@[i] is used instead of F3@[i] in equations (28).

In Step 230, the maximum shift number Lrng[bl] of each block, which is used for calculation of the correlation of focus detecting operation in Step 233, is set on the basis of the contrast within each block defined in Step 229. Details thereof are the same as Step 207 except that F1@[i] is used instead of F4@[i] in equations (17) and (18).

In step 231, the threshold of reliability used during focus condition detecting operation in Step 233 is set. Details thereof will be given later with reference to FIG. 6.

In Step 232, the assembly error compensation amount ZL[bl] used for focus condition detecting operation in Step 233 is calculated for each block on the basis of the assembly error Z[bl] stored in EEPROM and the gravity position of the contrast in the block defined in Step 229. Details thereof are the same as Step 209 except that F1@[i] is used instead of F4@[i] in equation (19).

In Step 233, each of the defocus amounts Df[1]–[12] is calculated for each block defined in Step 229. Details thereof will be given later with reference to FIGS. 8, 9 and 10. In Step 234, judgment is made if the defocus amount has been determined for at least one or more blocks. If the defocus amount has been calculated, the program proceeds to Step 241 for group synthesis details of which will be given later. The program proceeds to Step 235 when the defocus amount could not be determined for all blocks.

It is considered that the focus detection with the first filtered data was disabled in Step 233 because the object pattern's frequency was lower than the frequency component extracted from the first filtered data or the current defocus amount was too large to be detected with the maximum number of shift set in Step 230.

Accordingly, in Step 235, the second filtering operation expressed by equation (31) is made on the first filtered data F1@[i] to obtain the second filtered data F2@[i] comprising 37 pairs of horizontal train and 13 pairs of vertical train.

$$F2@[i] = \{F1@[s] + 2F1@[s+1] + \qquad (31)$$
$$3F1@[s+2] + 4F1@[s+3] +$$
$$3F1@[s+4] + 2F1@[s+5] +$$
$$F1@[s+6]\}/4$$

$$s = i \times 2 - 1$$

The second filtered data is for extraction of the lower frequency component in contrast to the case with the first filtered data and the DC component of the second filtered data has been removed. Besides, every other data are taken here, so that one shift for correlation calculated in the focus condition detecting operation using the second filtered data is equivalent to two shifts for the first filtered data. This in turn allows detection of a large defocus amount without increasing the maximum number of the data shift.

The second filtered data is divided into a total of three basic blocks comprising the 13th to 15th blocks for the horizontal train and a total of one basic block comprising the 16th block for the vertical train, as shown below. Among these blocks, the 14th and 16th blocks are used in the spot mode. The block boundary setting 2 described in Step 229 is not made for the second filtered data and the basic blocks are used as previously fixed.

*Horizontal train

Block 13—Zs[13]=2, Ze[13]=13

Block 14—Zs[14]=14, Ze[14]=24

Block 15—Zs[15]=25, Ze[15]=36

*Vertical train

Block 16—Zs[16]=2, Ze[16]=12

The block boundary setting 2 of Step 229 is not made here because the object has either a gently-sloping low-frequency pattern or a blurred pattern due to a large defocus amount and shifting of the block boundary is meaningless. Each of the maximum number of shift Lrng[bl] for calculation of the focus condition is fixed as shown below without being subjected to the correlation operation judgment of Step 207:

*Horizontal train

Block 13—Lrng[13]=12

Block 14—Lrng[14]=21

Block 15—Lrng[15]=12

*Vertical train

Block 16—Lrng[16]=7

In step 236, the threshold for judgment of the reliability used during focus condition detecting operation in Step 238 is set. Details thereof will be given later with reference to FIG. 6.

In Step 237, the assembly error compensation value ZL[bl] used for detection of the focus condition in Step 238 is calculated for each block on the basis of the assembly error Z[bl] stored in EEPROM and the contrast gravity center position in the block defined in Step 235. Details thereof are the same as for Step 217 except that F2@[i] is used instead of F5@[i] in equation (22).

In Step 238, each of the defocus amounts Df[13] through Df[16] is calculated for each block defined in Step 235. Details thereof will be given later with reference to FIGS. 8, 9 and 10.

In Step 239, judgment is made if the defocus amount has been determined for at least one or more blocks. If the defocus amount has been calculated, the program proceeds to Step 241 for group synthesis. Details thereof will be given later. The program proceeds to Step 240 in which a failure of focus condition is determined, when the defocus amount could not be determined for all blocks.

In Step 241, the approximately equal defocus amounts among those thus calculated are averaged to determine the new defocus amount. This processing is referred to as group synthesis. Since the group synthesis method is detailed in U.S. patent application Ser. No. 457,408 and Japanese Patent laid-open Application No. 4-235512 of the same applicant, a brief description only is made here on the above method using a simple example while referring to FIG. 7.

The block with the defocus amount indicating the shortest distance and the block with the defocus amount indicating the value within the specified range relative to said defocus amount are put together as the nearest group. By averaging the defocus amount of blocks belonging to this group, the defocus amount of the nearest group is determined.

Figure 7:
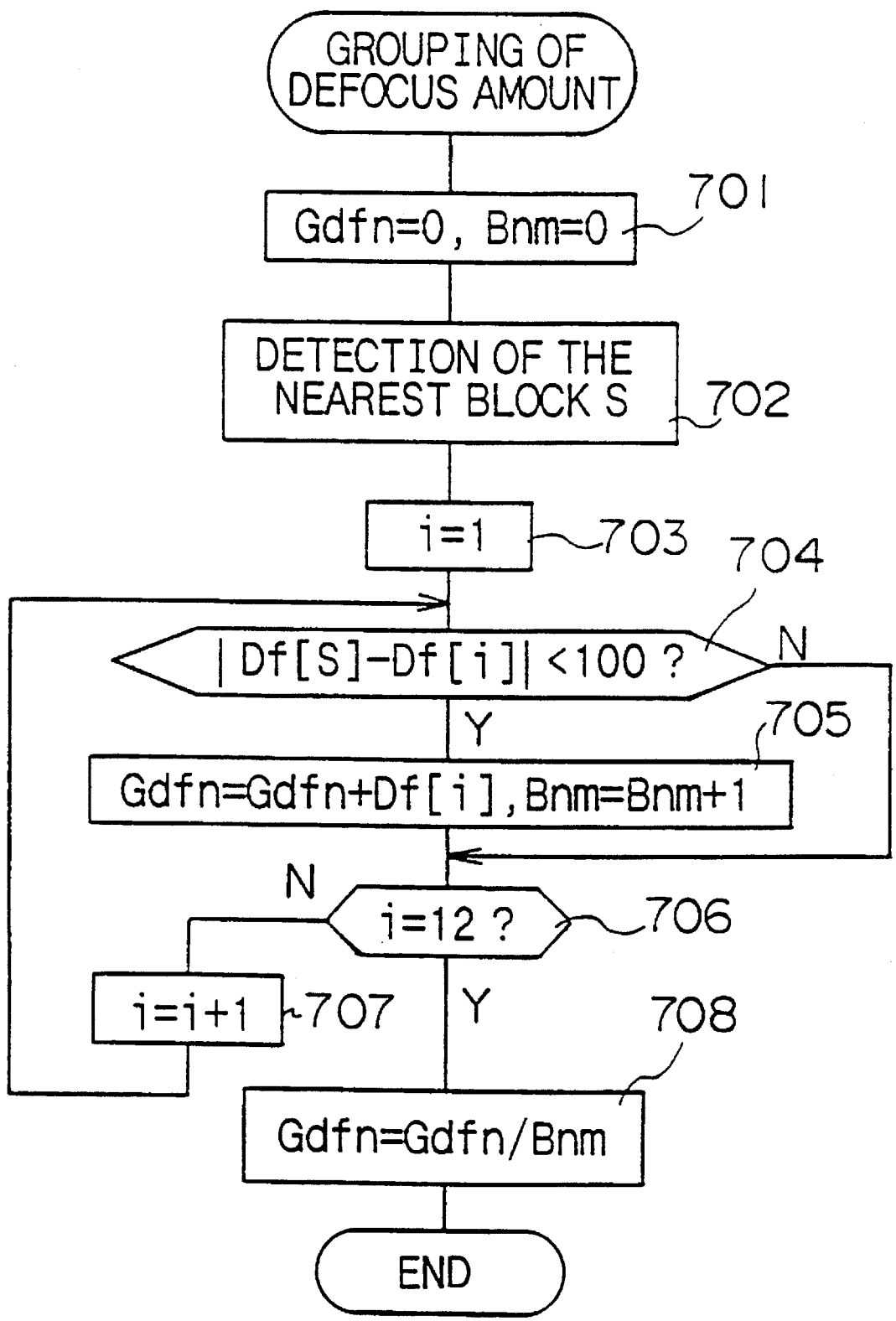
FIG. 7 is a flow chart showing a grouping operation of the defocus amount calculation algorithm of the embodiment of the present invention.

FIG. 7 shows an example in which the defocus amount is determined through an operation using the fourth, third, and first filtered data. The operation thereof is described below.

In Step 701, a defocus amount Gdfn of the nearest group is initialized to 0 and a numerical value Bnm indicating the number of blocks forming a group also initialized to 0. In Step 702, the block giving the defocus amount of the shortest distance is detected, and its block number is stored as "S" in the memory.

In Step 703, the numerical figure i indicating the block number is set to 1.

In Step 704, judgment is made on whether or not the absolute value of the difference between the defocus amount of the i-th block and that of Df[S] of the nearest block is smaller than the predetermined value (100 μm in FIG. 7, for example). If the absolute value is more than the predetermined value, the i-th block is judged not to belong to the nearest group and the program proceeds to Step 706. If the former is smaller than the latter, the i-th block is judged to belong to the nearest group and the program proceeds to Step 705.

For the block whose detection is disabled, setting a large value which the defocus amount of such a block can never have will never cause the absolute difference value to become smaller than the predetermined value, thereby avoiding the misunderstanding that such a block belongs to the shortest-distance group. For the block not used in the spot mode, the same numerical figure as that for the block whose detection is disabled may be set for the defocus amount Df[bl].

In Step 705, the defocus amount Df[i] of the i-th block is added to the defocus amount Gdfn of the nearest group to obtain the new defocus amount Gdfn. 1 is added to the numerical value Bum indicating the number of blocks included in a group.

In Step 706, judgment is made whether the block number i is 12 of the final block number. If it is 12, judgment as to whether the block concerned belongs to the nearest group is considered completed. Accordingly, the program proceeds to Step 708. Otherwise, judgment is considered not completed and 1 is added to the block number i (Step 707), and the program returns to Step 704.

The total sum of the defocus amount of blocks belonging to the nearest group has been stored in the memory. Therefore in Step 708, Gdfn is divided by Bnm, which is the total number of blocks in this group, thereby obtaining the defocus amount Gdfn of the nearest group.

When the defocus amount is obtained through an operation using the second and fifth filtered data, it is enough to reset the block number i to 13 in Step 703 and to check in Step 706 if the block number i is 16.

The lens drive is performed in Step 1214 of FIG. 12 on the basis of the defocus amount Gdfn of the nearest group thus obtained.

In Step 241 shown in FIG. 2B, the impossibility of calculation of the defocus amount is set.

Matters not dealt with in detail in the above description of the defocus amount calculation algorithm are described here.

Figure 26A:
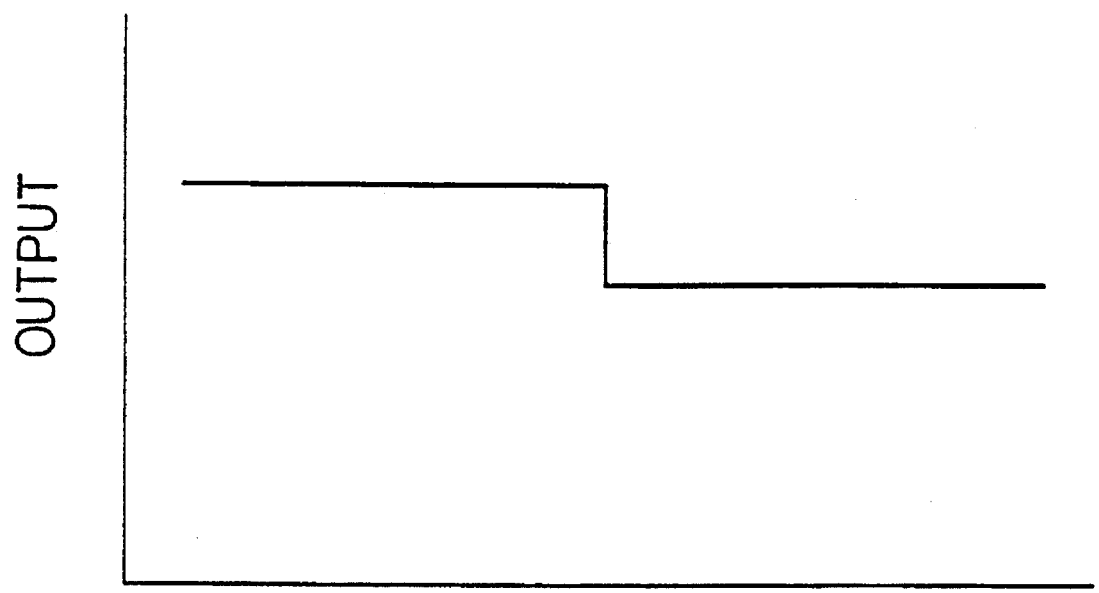
FIGS. 26A and 26B are representations each showing a case when data having been subjected to a filtering operation to remove the DC component completely are used.
Figure 26B:
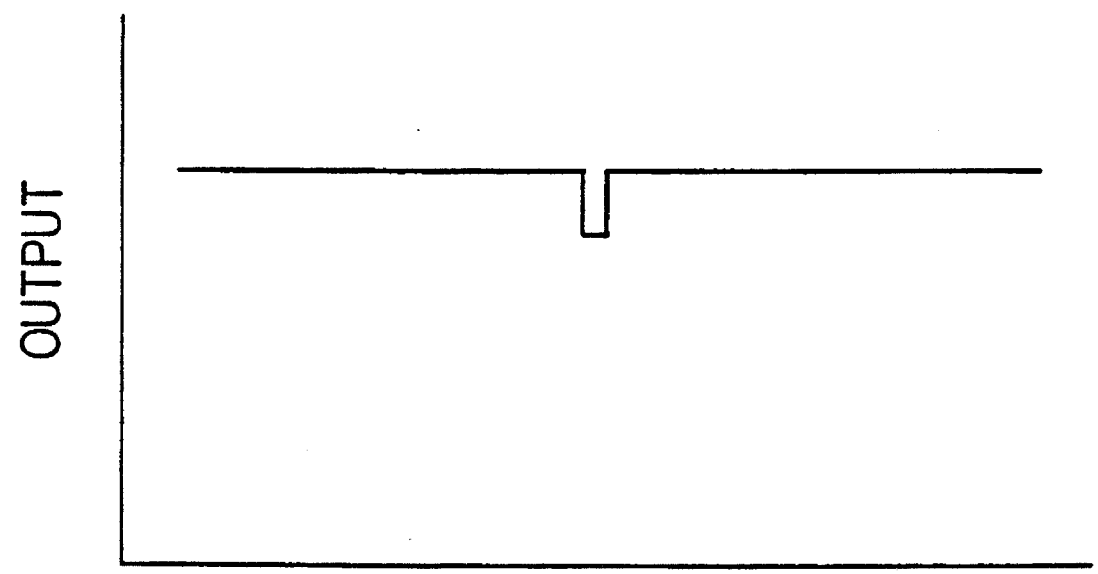

Firstly, discrimination of the fine pattern in Step 204 is described. In this discrimination, on the basis of the contrast distribution in the output from the image sensor arrays, judgement is made whether or not the object pattern to be photographed has the contrast existing only in a part of the focus condition detecting range as shown in FIGS. 26A and 26B. If the contrast exists only in a part of the focus condition detecting range, the data having been subjected to a filtering operation (first and second filtered data) for complete removal of the DC component are used. Otherwise, data having been subjected to a filtering operation (fourth and fifth filtered data) not for complete removal of the DC component are used for calculation to avoid the possibility of pseudo-focus.

Now the operation to discriminate the fine pattern is described with reference to FIG. 13.

In Step 301, the high-frequency cut data Ha[i] and Hc[i] are divided into seven and three ranges respectively.

Train a—12–20, 21–29, 30–38, 39–47, 48–56 57–65, 66–74

Train c—3–12, 13–22, 23–32

In Step 302, contrast values Cth[I] and Ctv[I] are calculated for each range by equation (11).

$$CtH[I]=\Sigma|Ha[J]-Ha[J+1]|$$

$$CtV[I]=\Sigma|Hc[J]-Hc[J+1]| \quad (11)$$

Here, each of Ha[J]–Ha[J+1] and Hc[J]–Hc[J+1] is the adjacent difference between two outputs from two photoelectric elements adjacent with each other in the same block of each of the trains a and c. CtH is a total sum of the adjacent difference of eight pairs while CtV a total sum of the adjacent difference of nine pairs. If the absolute value of the adjacent difference is less than 4, the absolute value may be added as 0 to guard against the effect of electric noise.

In Step 303, peak values Hmax and Vmax are determined for horizontal and vertical trains (equation (12)). Note that the range to determine Hmax is 30 to 56 when the spot mode has been selected.

$$Hmax=Max\{Ha[12]-Ha[74]\}$$

$$Vmax=Max\{Hc[3]-Hc[32]\} \quad (12)$$

In Step 304, judgment is made on condition 1 described below:

Condition 1—For horizontal trains 1 through 7 ranges (3–5 for the spot mode) and vertical trains 1–3 ranges, the following requirements are fulfilled:

*There is one CtH[I] exceeding α or more or there are two mutually adjacent CtH[I]s. Similarly, there is one CtV[I] exceeding α or more or there are two mutually adjacent CtV[I]s.

Here, α may be the given value, but preferably variable depending on the previous judgment result for object pattern discrimination because these results become stable without varying each time.

Initial condition—α=16

Low-contrast or fine previous pattern—α=21

Normal previous pattern—α=11

In Step 305, judgment is made on condition 2 expressed by equation (13):

$$\sum_{I=Is}^{Ie} CtH[I] < Hmax + \beta \quad (13)$$

and $$\sum_{I=1}^{3} CtV[I] < Vmax + \beta$$

Wide mode—Is=1, Ie=7

Spot mode—Is=3, Ie=5

In equation (13), β may be the given value, but preferably variable depending on the previous judgment result for object pattern discrimination because these results become stable without varying each time.

Initial condition—β=10

Low-contrast or fine previous pattern—β=20

Normal previous pattern—β=0

In Step 306, judgment is made if both conditions 1 and 2 are satisfied. If both are satisfied, the object pattern is judged to be either a low-contrast or a fine (Step 307). When at least one of them is not satisfied, the object pattern is judged to be a normal pattern, i.e., neither a low-contrast pattern nor a fine pattern (Step 308).

By changing the filtering processing depending on the discrimination result of the fine pattern, the pseudo-focus state can be avoided and high operational accuracy is ensured for the fine pattern.

Next, the operation to detect the focus condition in Steps 210, 218, 225, 233, and 238 is described with reference to FIGS. 8, 9 and 10.

The operation method is approximately similar to the method disclosed in U.S. Pat. No. 4,561,749, except that the cyclic detection to judge if the object pattern is cyclic is added in this embodiment of the present invention.

In this embodiment of the present invention, the correlation C[L] is not necessarily calculated for the entire shift range (−Lrng to +Lrng) similar to the case of U.S. Pat. No. 4,561,749, but determined by changing the shift number L in the order of 0, 1, −1, 2, −2, . . . , Lrng, −Lrng. Calculation of the correlation is interrupted at a time point when the defocus amount is calculated using the minimum correlation which satisfies the above equation (5).

In this way, when the object is caught substantially under the in-focus state, calculation of only three correlations C[−1], C[0], and C[1] is enough to determine the defocus amount, thereby reducing the operation time and proving advantageous when for example, a moving object is photographed.

The whole operation of focus condition detection will be now described with reference to FIG. 8. This operation is made for individual blocks divided within the focus condition detection range or region.

In Step 801, the shift number L is set to 0.

In Step 802, the correlation C[L] is calculated by equation (32) for the first to ninth blocks of the fourth, first, and third filtered data and the 13th to 15th blocks of the second and fifth filtered data and by equation (33) for the 10th to 12th blocks of the fourth, first, and third filtered data and the 16th block of the second and fifth filtered data. In equations (32) and (33), Fx indicates any one of the first, second, third, fourth and fifth filtered data while n and m are determined on the basis of the shift amount L by equation (34).

$$C[L] = \sum_{i=0}^{Ze[bl]-Zs[bl]} |Fxa[n] - Fxb[m]| \quad (32)$$

$$C[L] = \sum_{i=0}^{Ze[bl]-Zs[bl]} |Fxc[n] - Fxd[m]| \quad (33)$$

For $L \geq 0$ (34)

$n = Zs[bl] + Trunc\{(L+1)/2\} + i$ $m = Zs[bl] + Trunc\{-L/2\} + i$

For $L < 0$ $n = Zs[bl] + Trunc\{L/2\} + i$ $m = Zs[bl] + Trunc\{(-L+1)/2\} + i$ In equation (34), Trunc is a function to omit the places below the decimal point, and Trunc(1.5) becomes 1 and Trunc(−2.5) −2. Zs[bl] and Ze[bl] indicates respectively the start position and the end position of the blth block.

In Step 803, judgment is made whether the shift number L is 0 or 1. Since L changes in the order of 0, 1, −1, 2, −2, Lrng, and −Lrng as described above, L=0 or L=1 means that only one or two correlations were calculated, and the three-point interpolating operation using three correlations cannot be made. In the case of L=0 or L=1, the program proceeds to Step 812 to renew the shift number L. In other cases, the program proceeds to Step 804 to allow the three-point interpolating operation.

In Step 811, judgement is made whether the shift number L is equal to −Lrng[bl] or not. The shift number −Lrng[bl] means that the correlation C[L] has been calculated for the entire shift range of the corresponding block, yet the defocus could not be determined. In this case, the operation is terminated through Step 810 in which a failure of detection of the focus condition for the block bl (Step 810) is set. If L is not −Lrng[bl], the program proceeds to Step 812.

In Step 812, judgment is made whether or not the shift number L is larger than 0. If it is larger than 0, the sign of the shift number L is inverted (Step 813). If it is 0 or less, the sign of the shift number L is inverted and 1 is added (Step 814). By renewing the shift number in this manner, L changes in the order of 0, 1, −1, 2, −2, . . . , Lrng, −Lrng. Upon completion of said renewal, the program returns to Step 802.

In Step 804, the three-point interpolating operation is made to determine the displacement Ls[bl] if L<>0 or L<>1 has been judged in Step 803. Details thereof of the three-point interpolating operation will be given later with reference to FIG. 9.

In Step 805, judgment is made whether a reliable displacement Ls[bl] has been obtained by the three-point interpolating operation in Step 804. If such a displacement has not be obtained, the program proceeds to Step 811 to renew the shift number L. If a reliable displacement has been determined, the program proceeds to 806.

In Step 806, judgment is made whether the data used for the calculation of the defocus amount is the first filtered data or the second filtered data and the program proceeds to Step 807 for cycle detection to determine whether the object pattern is cyclic if neither filtered data apply. If it is the first or second filtered data, the program proceeds to Step 809 because there is no need for cycle detection.

In Step 807, cycle detection is made to judge whether the object pattern is cyclic.

In Step 808, judgement is made whether the object pattern is not cyclic. If negative answer is obtained, the program proceeds to Step 810 in which a failure of the focus detection of the block concerned is set and the program is terminated. If the object pattern is judged not cyclic, the program proceeds to Step 809.

In Step 809, the defocus amount Df[bl] is calculated by equation (35) on the basis of the displacement Ls[bl] determined by the three-point interpolating operation in Step 804, and the operation is terminated. In equation (35), ZL[bl] is the assembly error compensation amount and Kfct[bl] a proportion coefficient.

$$Df[bl]=(Ls[bl]-ZL[bl]) \times Kfct[bl] \quad (35)$$

Figure 8:
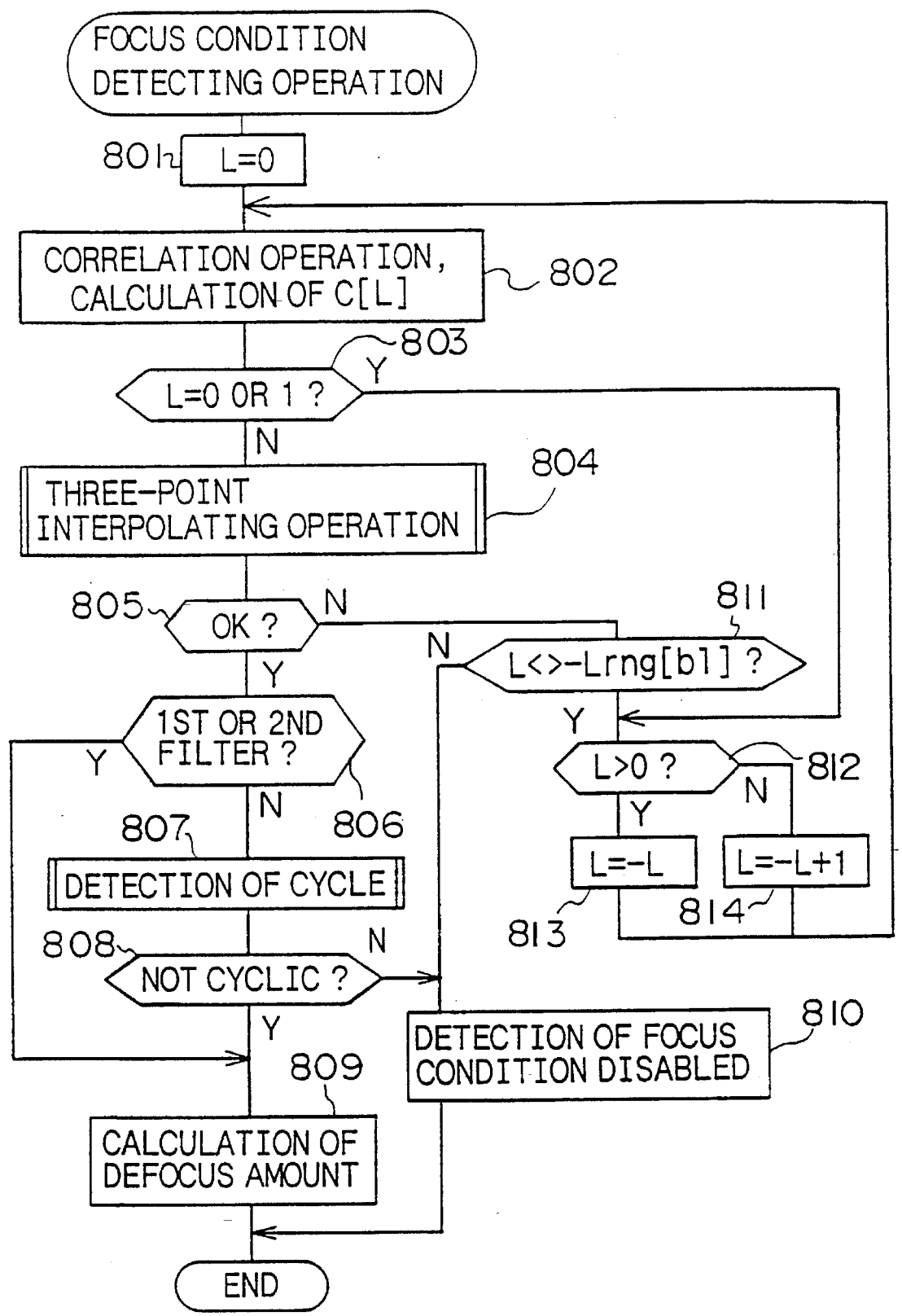
FIG. 8 is a flow chart showing a focus condition detecting operation of the defocus amount calculation algorithm of the embodiment of the present invention.

In Step 804 of FIG. 8, the three-point interpolating operation consists of the method described in the Description of Related Art and an additional judgment of the conditions used to determine the imbalance of the data. The operation of three-point interpolating of Step 804 will be now described with reference to FIG. 9.

In Step 901, judgment is made whether or not the shift number L is larger than 0. The program proceeds to Step 902 if it is larger than 0 and to Step 903 if it is 0 or less.

In Step 902, the shift number l of the central correlation of the three-point interpolating operation (hereinafter referred to as the central shift number l) is obtained from the shift number L. In case that the program has proceed to Step 902, L is larger than 0 and the correlation at the shift number smaller than L has already been calculated, and thus a three-point interpolation operation is made with three correlations C[L-2], C[L-1], and C[L]. Accordingly, the central shift number l is obtained by equation (36):

$$l=L-1 \qquad (36)$$

In Step 903, the central shift number l is obtained from the shift number L similarly to Step 902. In case that the program has proceed to Step 903, L is 0 or less and the correlation has been calculated already by the shift number larger than L, and thus a three-point interpolation is made using three correlations of C[L], C[L+1], and C[L+2]. Accordingly, the central shift number l is obtained by equation (37):

$$l=L+1 \qquad (37)$$

In Step 904, judgment is made whether C[l] is the minimum. C[l] is judged to be the minimum value when the conditions expressed by equation (38) are satisfied, and the program proceeds to Step 905. If said conditions are not satisfied, C[l] is judged not to be the minimum value and the operation disabled (NG) is set (Step 915). After Step 915 is carried out, the program is terminated.

$$\text{For} \quad C[l-1] < C[l+1] \qquad (38)$$
$$C[l] < C[l+1] \;\&\; C[l] \leq C[l-1]$$
$$\text{For} \quad C[l-1] \geq C[l+1]$$
$$C[l] \leq C[l+1] \;\& C[l] < C[l-1]$$

In Step 905, the slope value E[bl] described in the Description of Related Art is calculated by equation (39). In equation (39), Max{Ca, Cb} is Ca or Cb, whichever is larger.

$$E[bl]=Max\{C[l+1]-C[l], C[l-1]-C[l]\} \qquad (39)$$

In Step 906, judgment is made whether the slope value E[bl] is larger than the threshold SlpSth. The program proceeds to Step 907 when the former is large enough to ensure the reliability. The program goes to Step 915 in which NG is set when the former is not large enough to ensure the reliability.

Note that the threshold SlpSth is set in any one of Steps 208, 216, 223, 231, or 236 of FIGS. 2 and 3.

In Step 907, DL is calculated by equation (40), from which the true minimum value Cex is calculated to obtain the standardized minimum value Cexb.

$$DL=\{C[l-1]-C[l+1]\}/2$$
$$Cex=C[l]-|DL|$$
$$Cexb=Cex/E[bl] \qquad (40)$$

In Step 908, judgment is made whether Cexb calculated in Step 907 is smaller than the threshold CxSth. The program proceeds to Step 909 when the former is small enough to ensure the reliability and to Step 912 when the former is not so small as to ensure the reliability. Note that the threshold CxSth is set in any one of Steps 208, 216, 223, 231, or 236 of FIGS. 2 and 3.

In Step 909, OK is set which means that a reliable result is obtained by three-point interpolation around the correlation C[l].

In Step 910, the displacement Ls[bl] to give the true minimum value Cex is calculated by equation (41). Note that, for the second and fifth filtered data, one shift corresponds to displacement of two photoelectric elements and therefore Ls[bl] needs to be doubled.

$$Ls[bl]=l+DL/E[bl] \qquad (41)$$

In Step 911, Blnc[bl] indicating the imbalance is set to 0 because the reliable result obtained means that there is no possibility of imbalance.

In Step 912, judgment is made whether or not Cex calculated in Step 907 is smaller than 240 when Cexb is judged in step 908 not to be smaller than the threshold CxSth and not to be reliable. As Cexb is judged unreliable though the slope value E[bl] exceeds the threshold SlpSth, there is a high possibility that a imbalance of the data may have occurred when Cex is smaller than 240. Accordingly, Blnc[bl] indicating imbalance is set to 1 (Step 913).

When Cex is not smaller than 240, the possibility of imbalance of the data is low. Therefore, Blnc[bl] is set to 0 (Step 914).

In Step 915, NG is set because the three-point interpolation around the correlation C[l] is judged disabled.

Figure 27A:
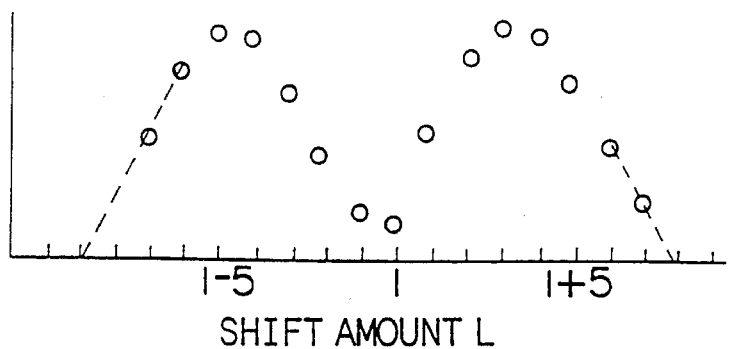
FIGS. 27A–27D are representations each showing a cycle detection method of the embodiment of the present invention.
Figure 27B:
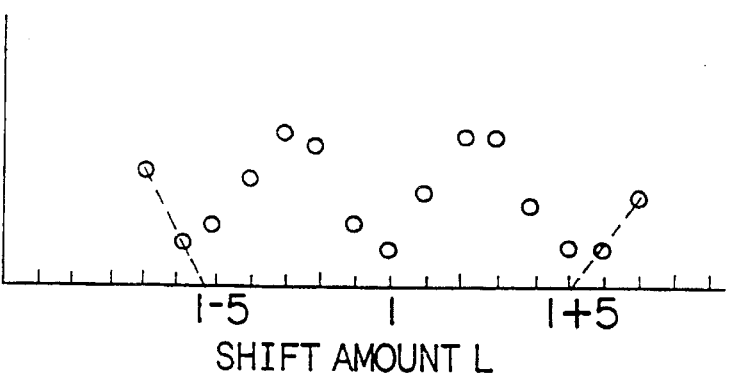

The cycle detection method in Step 807 of FIG. 8 will be now described with reference to FIGS. 27A–27D and 28. FIG. 27A shows the correlation C[L] for an object having the cyclic pattern of a relatively long cycle. FIG. 27B the correlation C[L] for an object having the cyclic pattern of a relatively short cycle, and FIGS. 27C and 27D the correlation C[L] for an object having a normal pattern without a cycle.

The shift amounts distanced by the specified number from the central shift number l, for example, l−6, l−7, l+6, and l+7 are calculated. When the cyclic object has a relatively long cycle as shown in FIG. 27A, the position where the extension line connecting C[l−6] and C[l−7] intersects the horizontal axis is relatively near the position on the outside of the shift amount l−6 in the direction from shift amount l to l−6. For the cyclic object with a relatively short cycle as shown in FIG. 27B, said position becomes a position nearer to the shift amount l−6 on the side of the shift amount l.

Figure 27C:
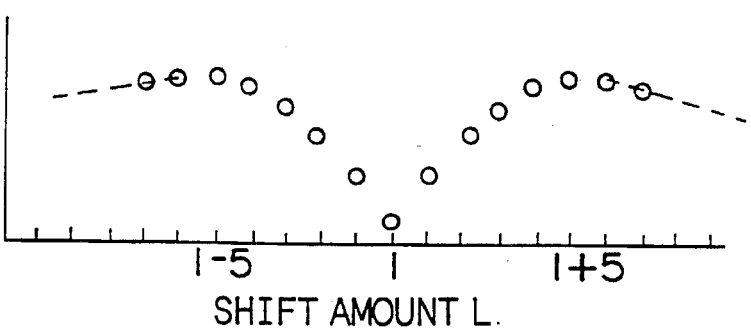
Figure 27D:
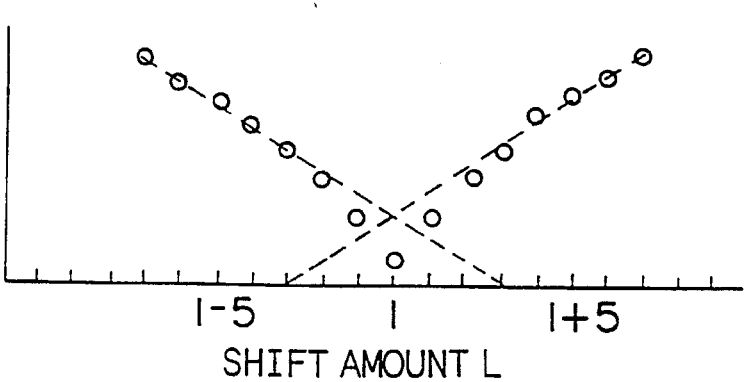

On the other hand, for the normal non-cyclic object, the intersection position with the horizontal axis becomes a position so much distant from the shift amount l−6 on the opposite side of the shift amount l as not to be illustrated in the drawing as shown in FIG. 27C or so much distant in a direction from the shift amounts l−6 to l as shown in FIG. 27D.

The absolute value of the difference between C[l−6] and C[l−7] of FIG. 27C is extremely small when compared with FIGS. 27A and 27B for the cyclic object.

Similarly, the above-noted explanation applies to the position where the extension line connecting C[l+6] and C[l+7] intersects the horizontal axis and to the absolute value of the difference between C[l+6] and C[l+7].

In short, judgment can be made whether or not an object is cyclic on the basis of following two factors. One is the absolute value of the difference between the correlation at the shift amount distanced by the predetermined number from the central shift number l used in three-point interpolation during calculation of the reliable defocus amount and the correlation at the shift amount in the vicinity of the above-noted shift amount. Another one is the position of intersection between the extension line connecting to the two shift amounts at which said absolute values are calculated and the horizontal axis, that is, the line for the correlation C[L]=0.

In this embodiment of the present invention, judgment on whether or not the object pattern is cyclic is made by using respectively the correlation at the shift amount distanced by 5, 6 and 7 shifts from the central shift number l used in three-point interpolation of Step 805 in FIG. 8 when the fourth and third filtered data are used, and the correlation at the shift amount distanced by 3, 4, and 5 shifts from said central shift number 1 used in said three-point interpolation when the fifth filtered data are used.

Figure 28:
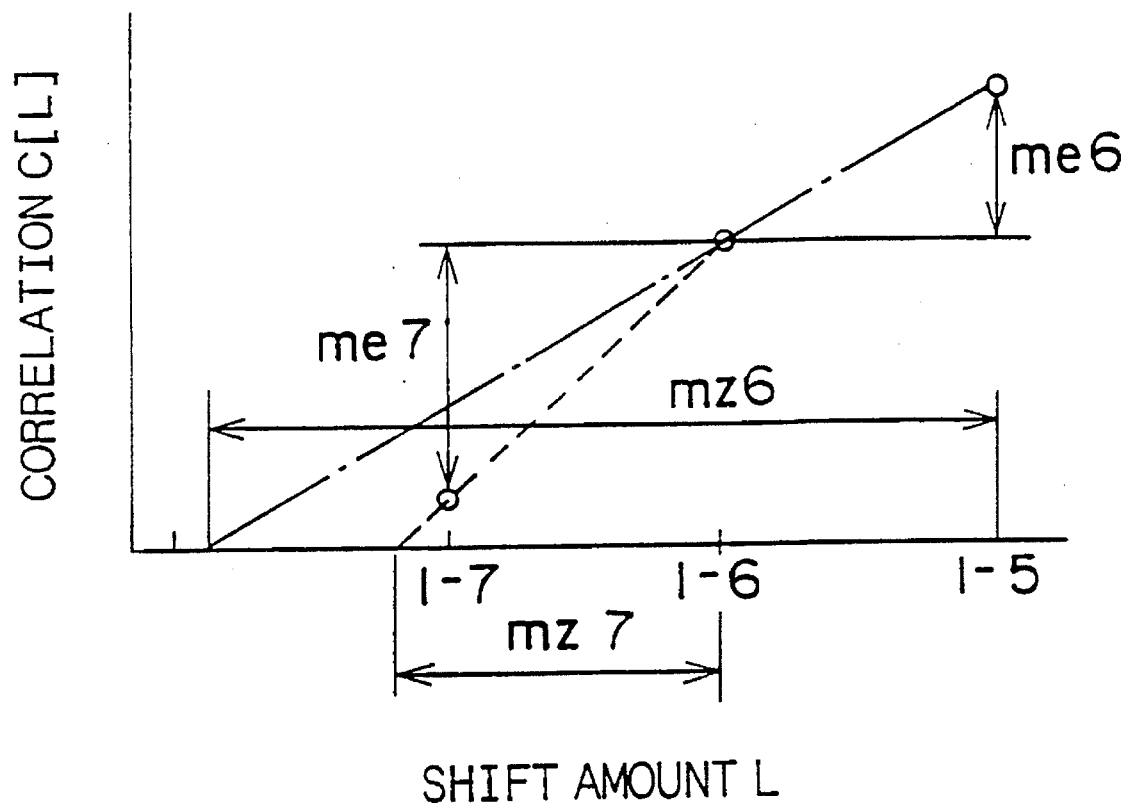
FIG. 28 is a representation showing numerical values used for cycle detection of the embodiment of the present invention.
Figure 29A:
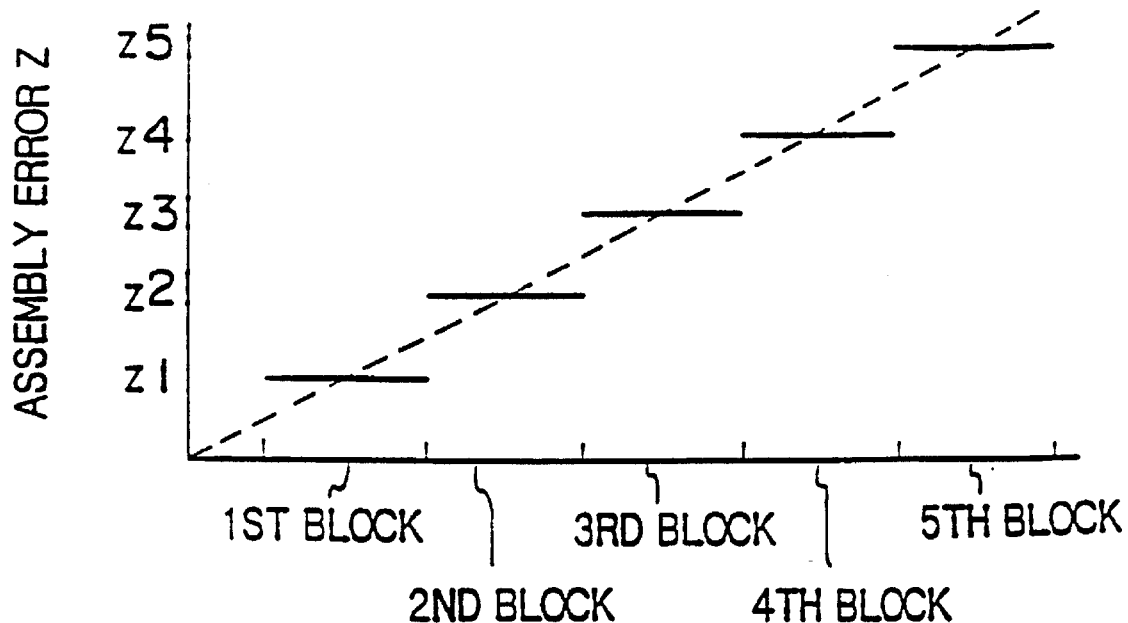
FIGS. 29A and 29B are representations each showing problems arising when the data having been subjected to a filtering operation to remove the DC component completely is used in the prior art.
Figure 29B:
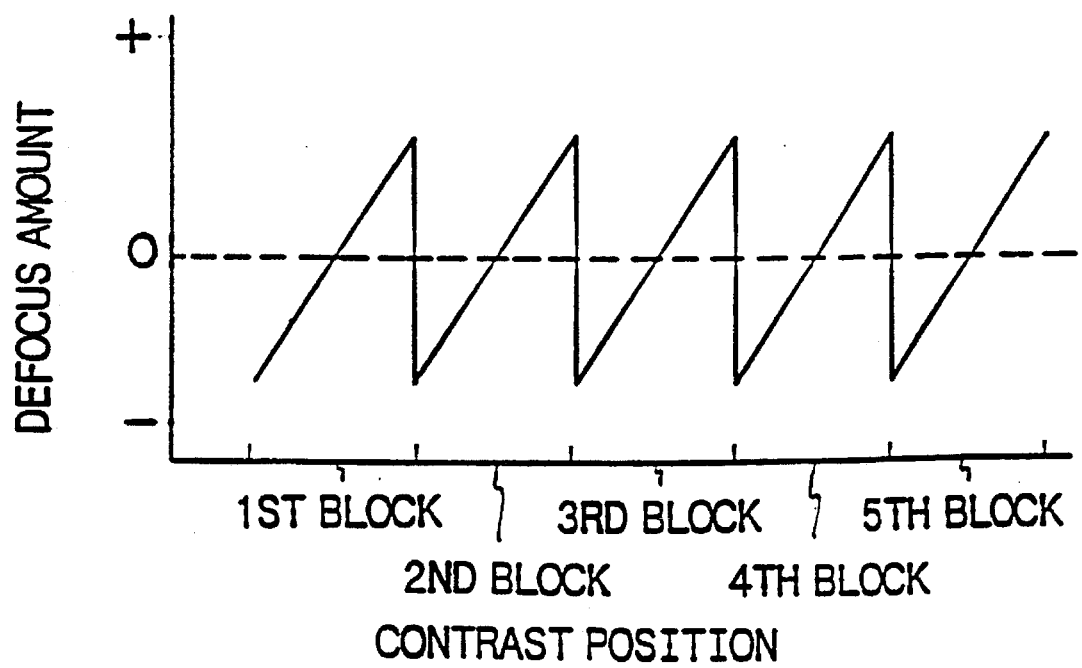
Figure 30A:
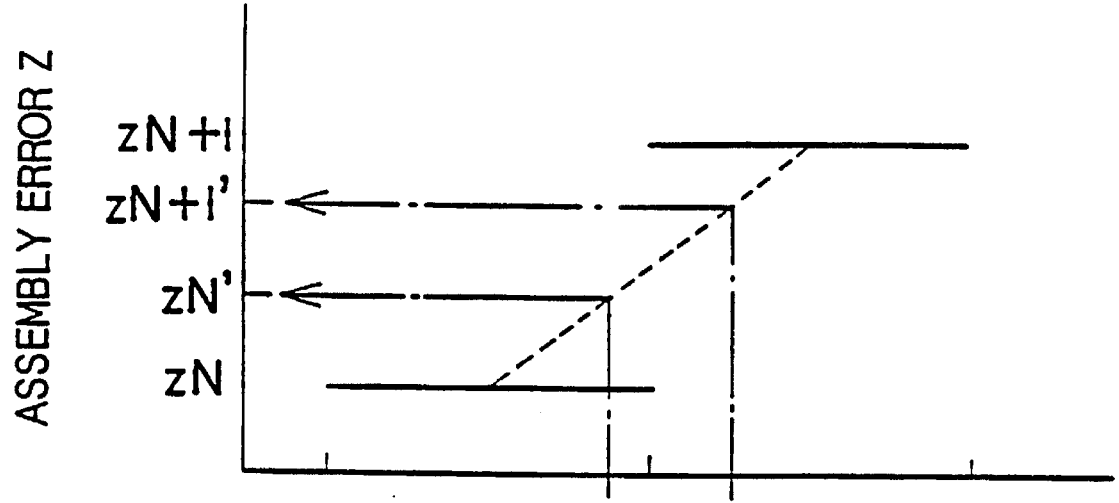
FIGS. 30A and 30B are representations each showing a setting method to set the compensation value for compensation of the assembly error of the present invention.
Figure 30B:
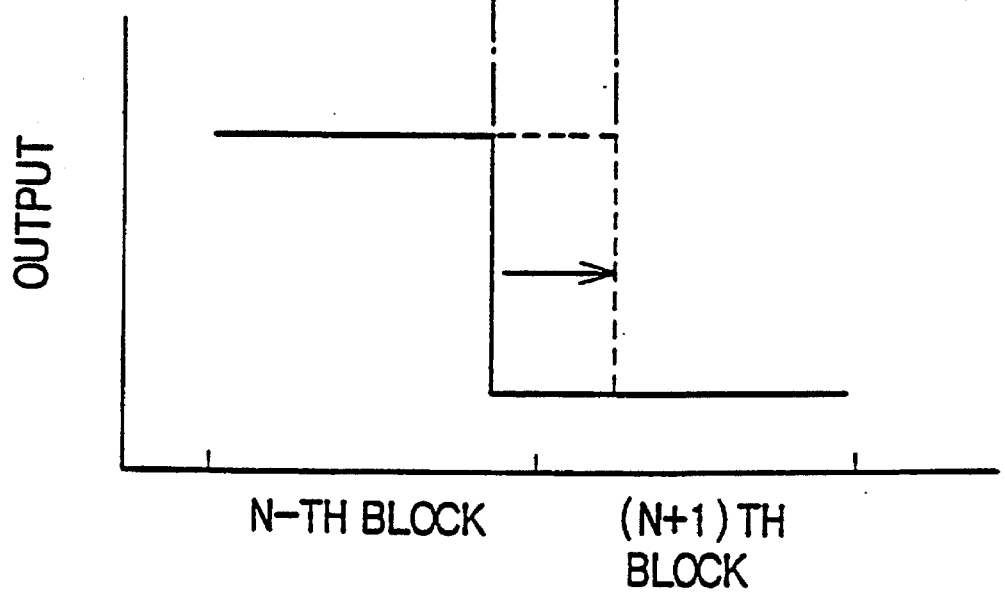

The value used for cycle detection will be now described with reference to FIG. 28. This figure shows an example when the correlations C[l−5], C[l−6], and C[l−7] at the respective shift amounts distanced by 5, 6 and 7 shifts in the negative direction from the central shift number 1 are used. The absolute value of the difference between C[l−5] and C[l−6] is represented by me6 while the distance between the position where the extension line connecting these correlations intersects with a horizontal axis representing C[L]=0 and the shift amount l−5 by mz6. Similarly, the absolute value of the difference between C[l−6] and C[l−7] is represented by me7 and the distance between the position where the extension line connecting these correlations intersects with a horizontal axis representing C[L]=0 and the position of shift amount l−6 by mz7.

The sign for mz6 and mz7 is a plus mark for a direction toward the central shift number 1 and a minus mark for a direction away from the central shift number 1. Similarly, when the correlations C[l+5], C[l+6], and C[l+7] at the respective shift amounts distanced by 5, 6 and 7 shifts in the plus direction from the central shift number 1 are used, the absolute value of the difference between C[l+5] and C[l+6] is represented by pe6 while the distance between the position where the extension line connecting these correlations intersects with a horizontal axis representing C[L]=0 and the position of shift amount l+5 by pz6. Similarly, the absolute value of the difference between C[l+6] and C[l+7] is represented by pe7 while the distance between the position where the extension line connecting these correlations intersects with a horizontal axis representing C[L]=0 and the shift amount l+6 by pz7.

In this case also, the sign for pz6 and pz7 is a plus mark for a direction toward the central shift number 1 and a minus mark for a direction away from the central shift number 1. When the correlations at the respective shift amounts distanced by 3, 4 and 5 shifts from the central shift number 1 are used, me4, mz4, me5, mz5, pe4, pz4, pe5 and pz5 are calculated. The cycle detection operation will be now described with reference to FIG. 10.

As explained above, the data for cyclic detection includes the above-described absolute value of the difference between two correlations and distance between the positions of intersection and shift amount concerned. This data differs between the cyclic detections using the fourth and third filtered data with finer block division and the fifth filtered data with rough block division. In Step 1001, judgement is made whether or not the fifth filtered data is used. The program proceeds to Step 1008 when the fifth filtered data is used and to Step 1002 in other cases, namely when the fourth and third filtered data are used.

In Step 1002, the correlation amounts (Cm5 and Cm6) and (Cp5 and Cp6) are calculated at the 5th and 6th shift amount respectively in the minus and plus directions from the central shift number 1 of the three-point interpolation at which a reliable displacement Ls[bl] was obtained in Step 804 of FIG. 8.

In Step 1003, me6, pe6, mz6, and pz6 are calculated by equation (42).

$$me6=|Cm6-Cm5|, \ mz6=Cm5/(Cm6-Cm5)$$

$$pe6=|Cp6-Cp5|, \ pz6=Cp5/(Cp6-Cp5) \tag{42}$$

In Step 1004, me6, pe6, mz6 and pz6 obtained in Step 1003 are checked to determine if they satisfy the condition expressed by equation (43).

$$(me6 >50) \text{ and } (-1.5 \leq mz6<1.5)$$

or $$(pe6>50) \text{ and } (-1.5 \leq pz6<1.5) \tag{43}$$

When this condition is satisfied, the object is judged to have a cyclic pattern (Step 1014). If not, the program proceeds to Step 1005.

In Step 1005, the correlation amounts (Cm7) and (Cp7) are calculated at the 7th shift amount respectively in the minus and plus directions from the central shift number 1 of the three-point interpolation at which a reliable displacement Ls[bl] was obtained in Step 804 of FIG. 8.

In Step 1006, me7, pe7, mz7 and pz7 are calculated by equation (44).

$$me7=|Cm7-Cm6|, \ mz7=Cm6/(Cm7-Cm6)$$

$$pe7=|Cp7-Cp6|, \ pz7=Cp6/(Cp7-Cp6) \tag{44}$$

In Step 1007, me7, pe7, mz7 and pz7 obtained in Step 1006 are checked to determine if they satisfy the condition expressed by equation (45).

$$(me7>50) \text{ and } (-3<mz7<1.5)$$

or $$(pe7>50) \text{ and } (-3<pz7<1.5) \tag{45}$$

When this condition is satisfied, the object is judged to have a cyclic pattern (Step 1014). If not, the object pattern is judged to be non-cyclic (Step 1015).

In Step 1008, the correlation amounts (Cm3 and Cm4) and (Cp3 and Cp4)) are calculated at the 3rd and 4th shift amounts respectively in the minus and plus directions from the central shift number 1 of the three-point interpolation at which the reliable displacement Ls[bl] was obtained in Step 804 of FIG. 8.

In Step 1009, me4, pe4, mz4 and pz4 are calculated by equation (46).

$$me4=|Cm4-Cm3|, \ mz4=Cm3/(Cm4-Cm3)$$

$$pe4=|Cp4-Cp3|, \ pz4=Cp3/(Cp4-Cp3) \tag{46}$$

In Step 1010, me4, pe4, mz4 and pz4 obtained in Step 1009 are checked to determine if they satisfy the condition expressed by equation (47).

$$(me4>50) \text{ and } (-1.5 \leq mz4<1.5)$$

or $$(pe4>50) \text{ and } (-1.5 \leq pz4<1.5) \tag{47}$$

When this condition is satisfied, the object is judged to have a cyclic pattern (Step 1014). If not, the program proceeds to Step 1011.

In Step 1011, the correlation amounts (Cm5) and (Cp5) are calculated at the 5th shift amount respectively in the minus and plus directions from the central shift number 1 of the three-point interpolation at which a reliable displacement Ls[bl] was obtained in Step 804 of FIG. 8.

In Step 1012, me5, pe5, mz5 and pz5 are calculated by equation (48).

$$me5=|Cm5-Cm4|, \ mz5=Cm4/(Cm5-Cm4)$$

$$pe5=|Cp5-Cp4|, \ pz5=Cp4/(Cp5-Cp4) \tag{48}$$

In Step 1013, me5, pe5, mz5 and pz5 obtained in Step 1012 are checked to determine if they satisfy the condition expressed by equation (49).

$$(me5>50) \text{ and } (-3<mz5<1.5)$$

or $$(pe5>50) \text{ and } (-3<pz5<1.5) \tag{49}$$

When this condition is satisfied, the object is judged to have a cyclic pattern (Step 1014). If not, the object is judged to have a non-cyclic pattern (Step 1015).

According to the cycle detection method of this embodiment, calculation of the correlation over the entire shift range is not necessary, though necessary in the prior art, thereby reducing the calculation time.

Setting of the threshold in Steps 208, 216, 223, 231, and 236 of FIGS. 2A, 2B and 3 will be now described with reference to FIG. 6. The threshold value to be set here includes SlpSth for judgment of E[bl] calculated by the above equation (39) and CxSth for judgment of Cexb calculated by equation (40). These threshold values vary as follows depending on the filtered data used for calculation, accumulation period of electric charge, and under way of the overlap servo.

(1) First, third, and fourth filtered data
 (1) Cexb threshold—CxSth=0.25
 (2) Slope threshold
 *At either lens stop or during scanning—SlpSth=50
 *During overlap servo—SlpSth=200
 *At the longest accumulation period—Set by equation (50). In this equation, DMax is the maximum value among the charge accumulation signal and the value which SlpSth can take ranges from 50 to 98.

$$SlpSth=50+(96-DMax) +tm \tag{50}$$

(2) Second and fifth filtered data
 (1) Cexb threshold—CxSth=0.4
 (2) Slope threshold
 *At either lens stop or during scanning—SlpSth=50
 *During overlap servo—SlpSth=200
 *At the longest accumulation period—Set by equation (51). In this equation, DMax is the maximum value among the charge accumulation signal and the value which SlpSth can take ranges from 50 to 146.

$$SlpSth=50+2\times(96-DMax) \tag{51}$$

By setting a tighter threshold than normal during overlap servo, the slope value E obtained through accumulation and calculation during overlap servo does not exceed the tight threshold SlpSth when the object contrast is low. Therefore, the defocus amount calculated through accumulation and calculation at the time of lens stop is not changed to obtain the target defocus amount of lens drive. As a result, the lens is driven by an amount corresponding to this defocus amount and stopped.

In this way, accumulation and calculation are made in the lens stop condition after the lens has stopped, which is equivalent practically to the intermittent servo, preventing unstable lens drive. When the object is dark, the maximum value DMax of the charge accumulation signal may not reach WMax in certain cases even when the accumulation time It is set to the longest time Itmax. In such a case, the calculated defocus amount may suffer poor accuracy, resulting in extremely unstable lens drive because of sudden degradation of the signal/noise ratio.

The slope threshold SlpSth is allowed to vary on the basis of equations (50) and (51) so that SlpSth rises (becomes tighter) with decreasing DMax when the accumulation period It has been set to the longest period Itmax. Since the above practice allows a lower luminance limit for focus adjustment at which detection of the focus condition is possible to shift to the high luminance side, variation of slope threshold SlpSth allows focus condition detection to be disabled so that an extremely unstable lens drive is avoided. If SlpSth is fixed, detection of the focus condition can be possible when the accuracy of the defocus amount determined is low because the maximum value DMax of the charge accumulation signal has not reached WMax even if the accumulation time It has been set to the longest period Itmax, resulting in the extremely unstable lens drive.

The threshold setting operation will be now described with reference to FIG. 6.

In Step 601, SlpSth is set to 50. Normally, SlpSth takes this value and remains constant regardless of any filtering operation.

In Step 602, judgment is made whether or not the data used for calculation are the second filtered data. If so, the program proceeds to Step 611. If not, the program proceeds to Step 603.

In Step 603, judgment is made whether or not the data used for calculation are the fifth filtered data. If so, the program proceeds to Step 611. If not, the program proceeds to Step 604.

In Step 604, the threshold CxSth of Cexb is set relatively tight (0.25 in FIG. 6, for example) because the data for calculation have been judged to be any one of the fourth, third, and first filtered data in Steps 602 and 603 and, these kinds of filtered data has been divided into 12 small blocks.

In Step 605, judgment is made whether or not the accumulation period is the longest period Itmax. If not, the program proceeds to Step 618. If so, the program proceeds to Step 606.

In Step 606, SlpSth is changed on the basis of equation (50).

In Step 607, judgment is made whether or not SlpSth determined in Step 606 is smaller than 50. SlpSth smaller than 50 is too loose to be the threshold and thus changed to 50 (Step 608), and the program proceeds to Step 618. If SlpSth is 50 or larger, the program proceeds to Step 609.

In Step 609, judgment is made whether or not SlpSth determined in Step 606 is larger than 98. SlpSth larger than 98 is too tight to be the threshold and thus changed to 98 (Step 610), and the program proceeds to Step 618. If SlpSth is 98 or smaller, the program proceeds to Step 618 because SlpSth determined in Step 606 is considered to be within the appropriate range.

In Step 611, the threshold CxSth of Cexb is set relatively loose (0.4 in FIG. 6, for example) because the data for calculation have been judged to be any one of the second and fifth filtered data in Steps 602 and 603 and, these kinds of filtered data has been divided into 4 larger blocks.

In Step 612, judgment is made whether or not the accumulation period It is the longest period Itmax. If not, the program proceeds to Step 618. If so, the program proceeds to Step 613.

In Step 613, SlpSth is changed on the basis of equation (51).

In Step 614, judgment is made whether or not SlpSth determined in Step 613 is smaller than 50. SlpSth smaller than 50 is too loose to be the threshold and thus changed to 50 (Step 615), and the program proceeds to Step 618. If SlpSth is larger than 50, the program proceeds to Step 616.

In Step 616, judgment is made whether or not SlpSth determined in Step 613 is larger than 146. SlpSth larger than 146 is too tight to be the threshold and thus changed to 146 (Step 617), and the program proceeds to Step 618. If SlpSth is smaller than 146, the program proceeds to Step 618 because SlpSth set in Step 613 is considered to be within the appropriate range.

In Step 618, judgment is made on whether or not overlap servo described above is under way. If so, SlpSth should better be relatively tight and is changed to 200 (Step 619).

Judgment on the imbalance of the data in Step 214 of FIG. 2B will be now described. The value used for judgment is Blnc[bl] described already concerning three-point interpolation with reference to FIG. 9. Blnc[bl]=1 indicates that there is a high possibility of imbalance while Blnc[bl]=0 indicates there is less possibility of imbalance.

Blnc[bl] is set to 1 when (1) Cexb has exceeded CxSth and judged unreliable though the slope E[bl] has exceeded the threshold SlpSth as described with reference to FIG. 9 and (2) the minimum value Cex calculated through interpolation is 240 or less. Firstly, the fact that the slope E[bl] has exceeded the threshold SlpSth means that the object has sufficient contrast. Secondly, Cexb exceeding CxSth means that the degree of coincidence of patterns of a pair of the fourth filtered data is poor. Thirdly, the fact that Cex is 240 or less means that one pair of data, though not coincidence with each other well, are highly likely not to be separate. Accordingly, in such an event, it may be presumed that imbalance of the data has arisen. When (1) there are blocks in which Blnc[bl]=1 as calculated using the fourth filtered data from which the DC component has not been completely removed and (2) detection of the focus condition is disabled for all other blocks, an imbalance of the data is judged to exist and the focus condition detecting operation is made using the third filtered data with the DC component removed completely.

The countermeasures against the pseudo-focus state in Step 213 of FIG. 2 will be now described. The pseudo-focus state occurs when the image is blurred because the lens is substantially displaced from the in-focus state and the high-frequency component of the object pattern is lost and when the pattern becomes similar in different portions of the object because the block is divided into smaller portions. In such an event, the possibility of pattern similarity is reduced substantially by dividing the block into larger portions.

When the object has neither a low-contrast pattern nor a fine pattern, that is, when the defocus amount can be determined through calculation with the fourth filtered data for only one block, the defocus amount is determined through calculation with the fifth filtered data for division of the block into larger portions. Comparison is made between the sole defocus amount obtained with the fourth filtered data and that obtained with the fifth filtered data, and judgment is made whether the sole defocus amount obtained with the fourth filtered data is valid or invalid or should be replaced by the defocus amount obtained with the fifth filtered data. The above measure to counter the pseudo-focus state will be now described with reference to FIG. 11.

In Step 1111, the sole defocus amount calculated with the fourth filtered data is stored as Dfz in the memory.

In Step 1112–1115, the defocus amount is calculated using the fifth filtered data similarly to Steps 215–218 of FIG. 2B.

In Step 1116, judgment is made whether or not the defocus amount has been calculated using the fifth filtered data. The program proceeds to Step 1119 if the above defocus amount is not obtained and to Step 1117 if it is obtained.

In Step 1117, each of the defocus amounts Df[13]–Df[16] determined with the fifth filtered data is compared with Dfz.

In Step 1118, judgment is made whether or not there is at least one Df satisfying the following condition among Df[13] to Df[16]. Is the absolute value of the difference between Df and Dfz within the predetermined range? If so, the program proceeds to Step 1119 and to Step 1120 if not.

In Step 1119, the pseudo-focus state is judged not to occur with the sole defocus amount obtained with the fourth filtered data, and then the defocus amounts Df[13]–Df[16] obtained with the fifth filtered data are canceled and Dfz is employed.

In Step 1120, the pseudo-focus state is judged to occur with a high degree of probability when the sole defocus amount obtained with the fourth filtered data is used. The defocus amounts Df[13]–Df[16] are employed while Dfz is canceled.

Figure 4:
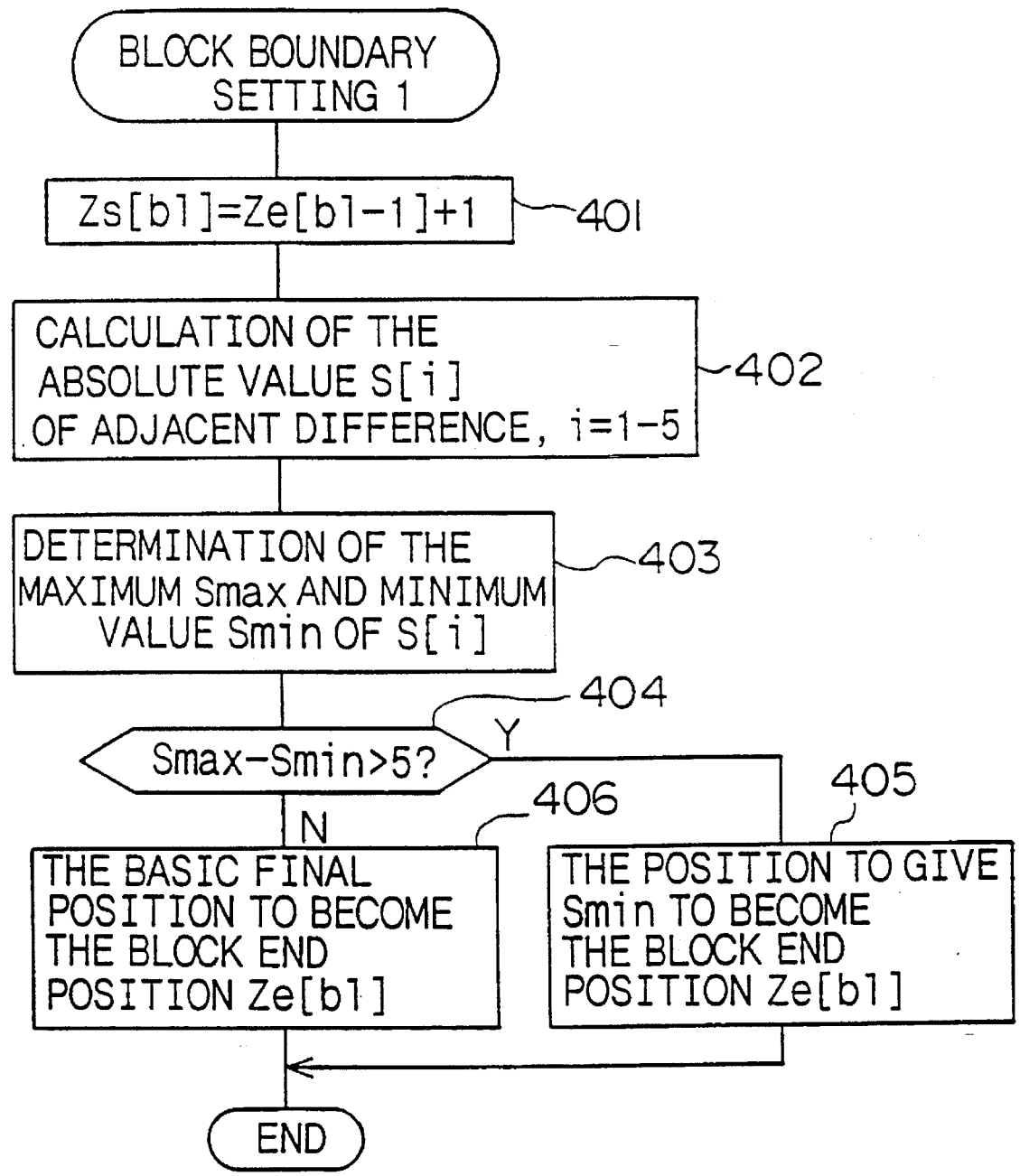
FIG. 4 is a flow chart showing a block boundary setting operation 1 of the defocus amount calculation algorithm of the embodiment of the present invention.
Figure 6:
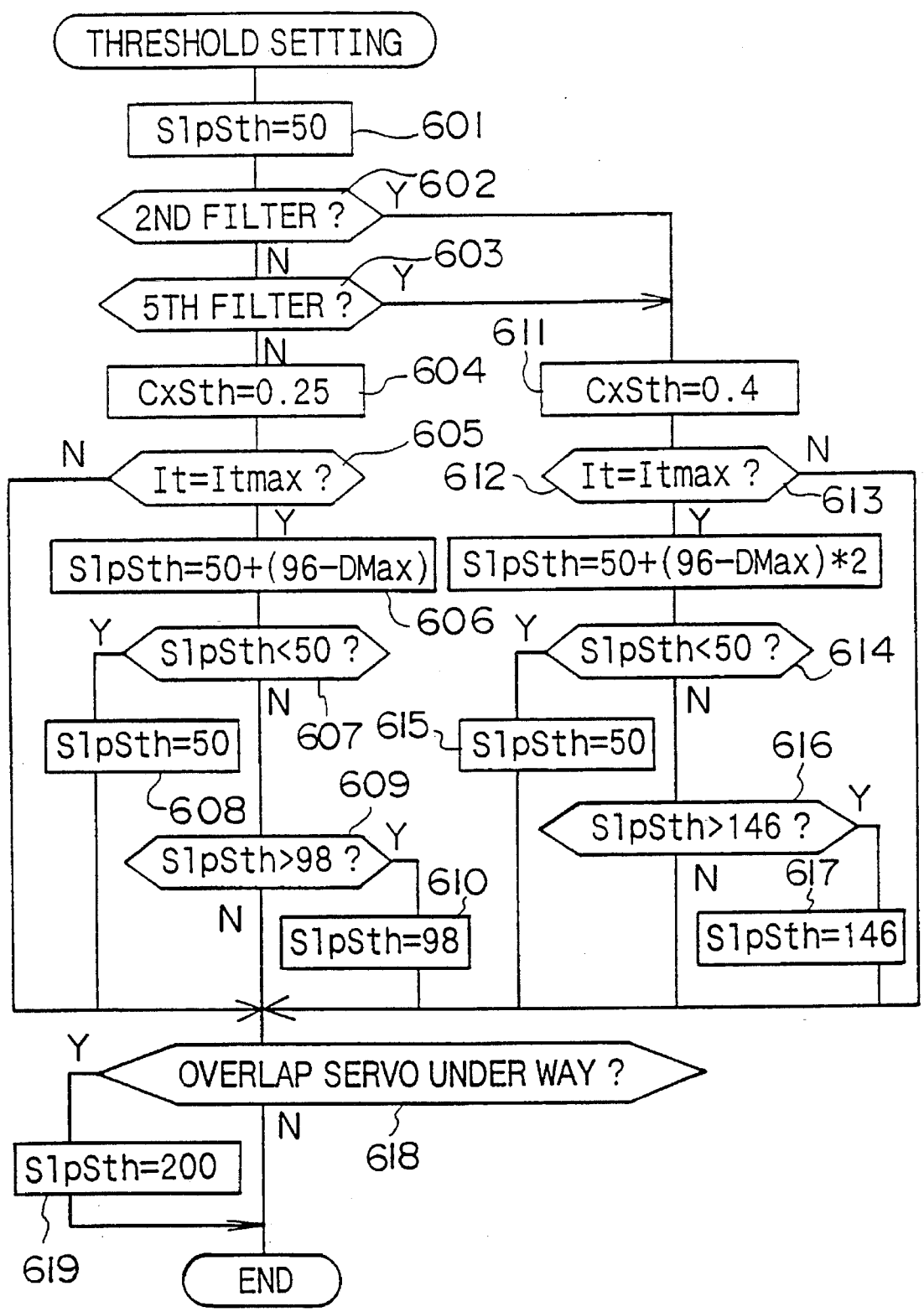
FIG. 6 is a flow chart showing a threshold setting operation of the defocus amount calculation algorithm of the embodiment of the present invention.
Figure 9:
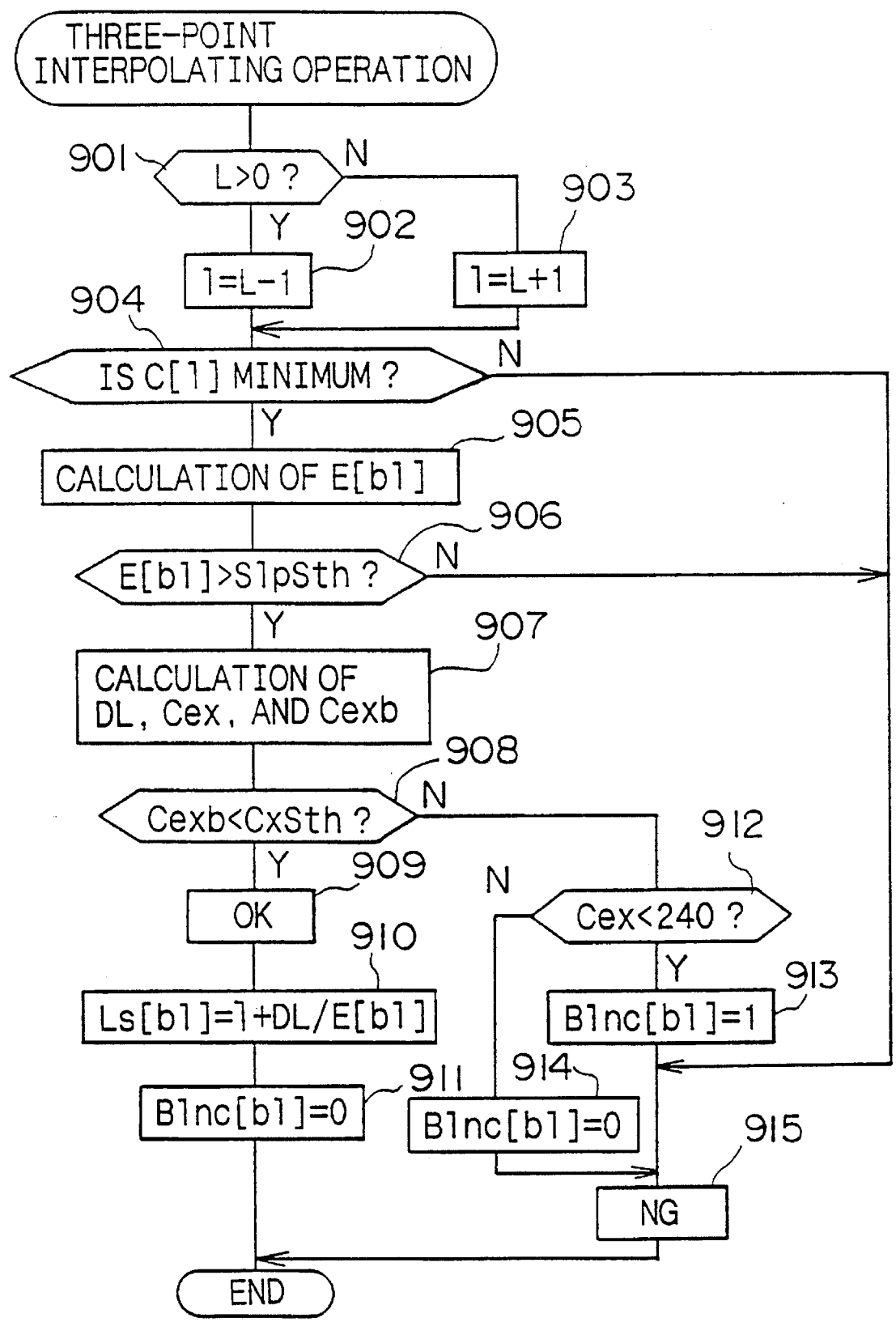
FIG. 9 is a flow chart showing a three-point interpolating operation of the focus condition detecting operation of the embodiment of the present invention.
Figure 10:
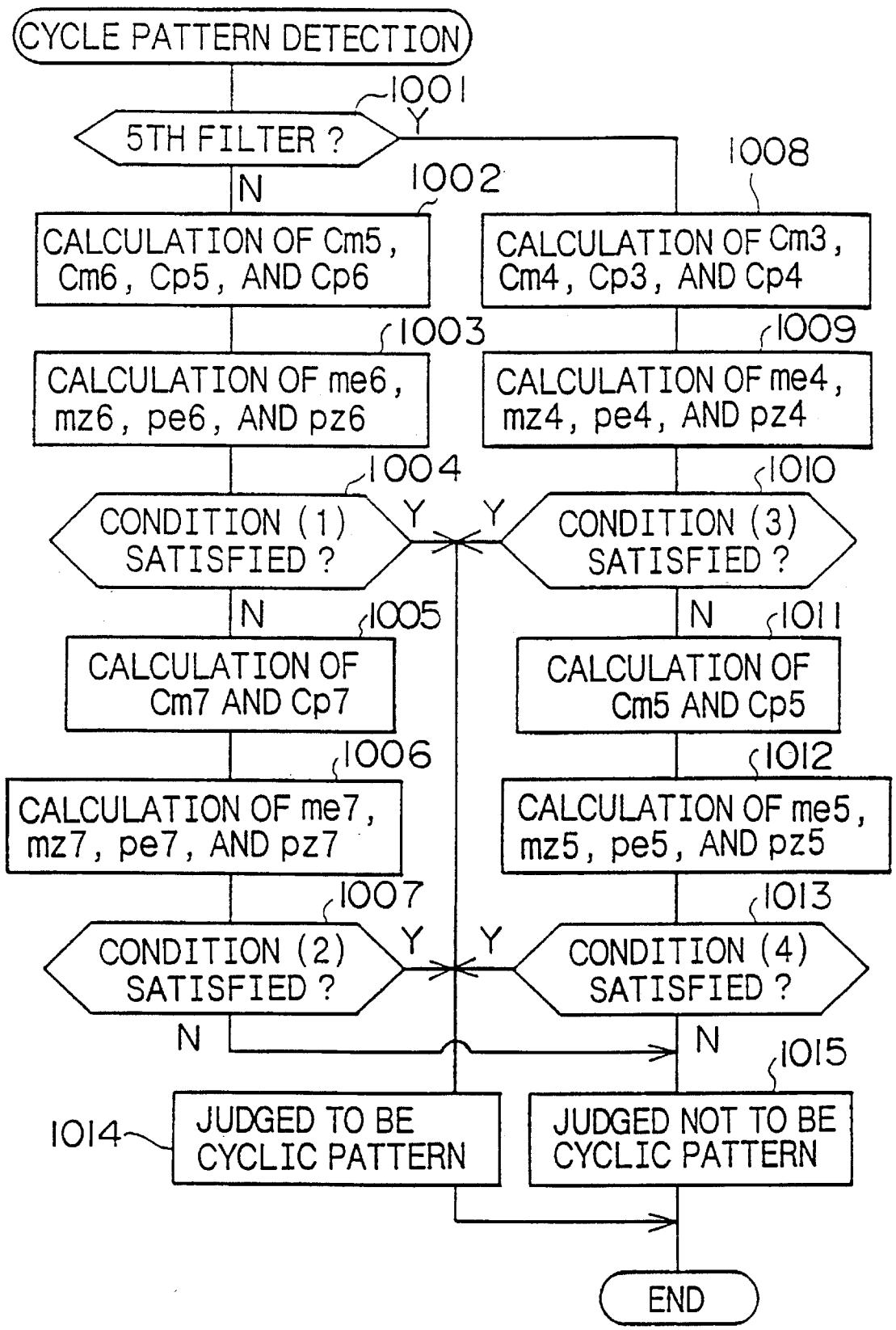
FIG. 10 is a flow chart showing a cyclic detection operation of the focus condition detecting operation of the embodiment of the present invention.
Figure 13:
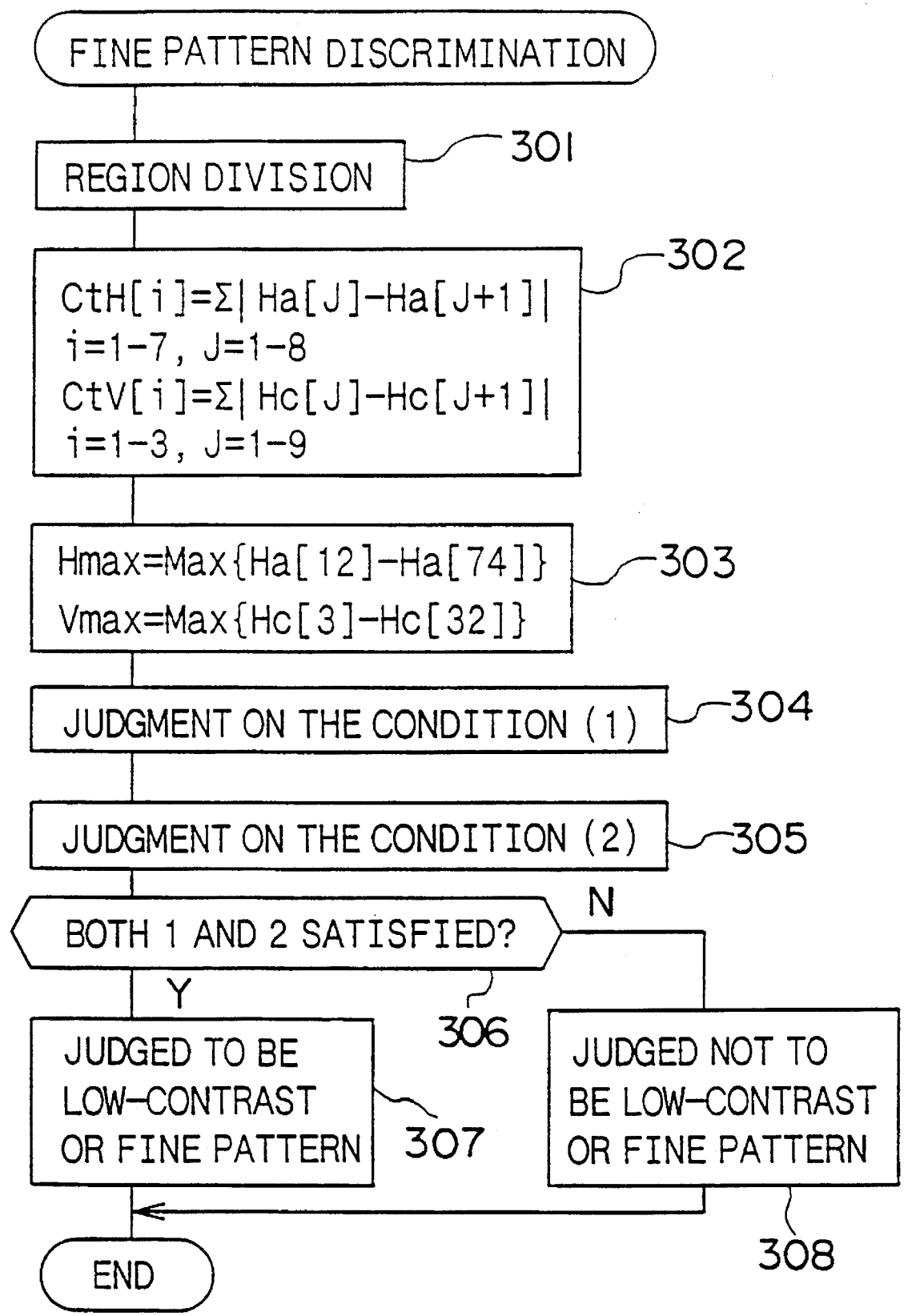
FIG. 13 is a flow chart showing a fine pattern discrimination operation of the defocus amount calculation algorithm of the embodiment of the present invention.

The accumulation control section 3a of FIG. 1 corresponds to the operation of Steps 1202, 1206 and 1211 of FIG. 12, the object discrimination section 3b to the operation of FIG. 13, the focus condition detecting section 3c to the operation of FIGS. 5, 7, 8, 9 and 11 and the filtering operation of Steps 202, 205, 215, 220, 227 and 235 of FIGS. 2A, 2B and 3, the block forming section 3d to the operation of FIGS. 4 and 14, the compensation setting section 3f to the operation of Steps 209, 217, 224, 232 and 237 of FIGS. 2A, 2B and 3, the threshold setting section 3g to the operation of FIG. 6, the cycle detection section 3h to the operation of FIG. 10, the imbalance detection section 3j to the operation of Steps 906, 908, 912, 913, 914 and 911 of FIG. 9, and the lens drive control section 3k to the operation of Steps 1210 and 1214 of FIG. 12.

I claim:

1. Focus condition detecting device comprising:

an image sensor having a plurality of photoelectric elements and outputting an output signal train representing the image of an object;

an optical system forming the object image on said image sensor;

an error storage device that stores a plurality of errors corresponding respectively to discrete positions on said image sensor;

a compensation amount setting device that calculates a gravity center position of the contrast of said object image on said image sensor on the basis of said output signal train and calculates a compensation amount corresponding to said gravity center position on the basis of at least two errors among said plurality of errors, each of said two errors being positioned on a respective side of said gravity center position; and an operation device that detects the focus condition of a photographing lens on the basis of said output signal train and said compensation amount.

2. Focus condition detecting device according to claim 1, wherein said compensation amount setting device calculates said compensation amount on the basis of a linear line determined by said two errors.

3. Focus condition detecting device according to claim 1, wherein said compensation amount setting device calculates said compensation amount on the basis of a quadratic curve determined by said two errors.

4. Focus condition detecting device comprising:

an image sensor having a plurality of photoelectric elements and outputting an output signal train representing the image of an object;

an optical system forming the object image on said image sensor;

a division device that divides said output signal train into a plurality of ranges;

an error storage device that stores a plurality of errors corresponding respectively to discrete positions on said image sensor;

a compensation amount setting device that calculates a gravity center position of the contrast of said object image on said image sensor for each of said plurality of ranges on the basis of said output signal train and calculates a compensation amount corresponding to each said gravity center position on the basis of at least two errors selected on the basis of each said gravity position among said plurality of errors, each of said two errors being positioned on a respective side of said gravity center position; and an operation device that detects the focus condition of a photographing lens in each of said plurality of ranges on the basis of said output signal train and compensation amount for each of said plurality of ranges.

5. Focus condition detecting device according to claim 4, wherein said compensation amount setting device calculates said compensation amount on the basis of a linear line determined by said two errors.

6. Focus condition detecting device according to claim 4, wherein said compensation amount setting device calculates said compensation amount on the basis of a quadratic curve determined by said two errors.

7. Focus condition detecting device comprising:

an image sensor having a plurality of photoelectric elements and outputting an output signal train representing the image of an object;

an optical system forming the object image on said image sensor;

a division device that divides said output signal train into a plurality of ranges;

an error storage device that stores a plurality of errors corresponding respectively to discrete positions on said image sensor;

a compensation amount setting device that calculates a compensation amount corresponding to a gravity center position on said image sensor on the basis of at least two errors, each corresponding to the Nth area and the (N+1)th area, said Nth area and said (N+1)th area being divided by said division device and a contrast of the image of an object being positioned in vicinity of a boundary of said Nth area and said (N+1)th area; and an operation device that detects the focus condition of a photographing lens in each of said plurality of ranges on the basis of said output signal train and compensation amount for each of said plurality of ranges.

8. A focus condition detection device according to claim 7, wherein said compensation amount setting device calculates said compensation amount on the basis of a linear line determined by said errors for said Nth area and said (N+1)th area.

9. A focus condition detection device according to claim 7, wherein said compensation amount setting device calculates said compensation amount on the basis of a quadratic curve determined by said errors for said Nth area and said (N+1)th area.

* * * * *